United States Patent
Maeda et al.

(10) Patent No.: US 9,565,713 B2
(45) Date of Patent: Feb. 7, 2017

(54) MOBILE COMMUNICATION SYSTEM

(75) Inventors: Miho Maeda, Tokyo (JP); Mitsuru Mochizuki, Tokyo (JP); Yasushi Iwane, Tokyo (JP); Yuji Kakehi, Tokyo (JP); Hitoshi Kimura, Tokyo (JP); Taisei Suemitsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/576,963

(22) PCT Filed: Feb. 9, 2011

(86) PCT No.: PCT/JP2011/052734
§ 371 (c)(1),
(2), (4) Date: Aug. 3, 2012

(87) PCT Pub. No.: WO2011/099513
PCT Pub. Date: Aug. 18, 2011

(65) Prior Publication Data
US 2012/0300686 A1 Nov. 29, 2012

(30) Foreign Application Priority Data
Feb. 12, 2010 (JP) .................. 2010-028714

(51) Int. Cl.
*H04W 76/04* (2009.01)
*H04W 52/02* (2009.01)
(Continued)

(52) U.S. Cl.
CPC ........... *H04W 76/046* (2013.01); *H04W 24/02* (2013.01); *H04W 52/0206* (2013.01);
(Continued)

(58) Field of Classification Search
CPC ............ H04W 52/24–52/245; H04W 52/0206; Y02B 60/50
(Continued)

(56) References Cited

U.S. PATENT DOCUMENTS 7,738,907 B2 * 6/2010 Xiao .................. H04W 52/265
455/127.1
2005/0250499 A1 * 11/2005 Lee .................... H04W 36/0055
455/437
(Continued)

FOREIGN PATENT DOCUMENTS

CN 101578909 A 11/2009
JP 2007-60212 3/2007
(Continued)

OTHER PUBLICATIONS

3GPP TS 36.300 V9.1.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2," Total 165 Pages, (Sep. 2009).
(Continued)

*Primary Examiner* — Mehmood B Khan
(74) *Attorney, Agent, or Firm* — Oblon, McClelland, Maier & Neustadt, L.L.P.

(57) ABSTRACT

A mobile communication system capable of reducing energy consumption of a network node in a local area range. When judging that there is a shift trigger, a local eNB shifts from a normal operation to an energy saving operation. In the energy saving operation, the local eNB stops the operation of transmitting at least a part of downlink transmission signals to be transmitted to a user equipment (UE) and performs the operation of receiving an uplink transmission signal transmitted from the UE. When judging that it has received the uplink transmission signal (RACH) in the
(Continued)

energy saving operation, the local eNB shifts to the normal operation.

6 Claims, 24 Drawing Sheets

(51) Int. Cl.
    *H04W 24/02*     (2009.01)
    *H04W 72/04*     (2009.01)
    *H04W 88/02*     (2009.01)
    *H04W 88/12*     (2009.01)

(52) U.S. Cl.
    CPC ........ *H04W 72/0413* (2013.01); *H04W 88/02* (2013.01); *H04W 88/12* (2013.01); *Y02B 60/50* (2013.01)

(58) Field of Classification Search
    USPC ........ 455/434, 13.4, 561, 574; 370/311, 318
    See application file for complete search history.

(56) References Cited

U.S. PATENT DOCUMENTS

| | | | |
|---|---|---|---|
| 2008/0298275 A1* | 12/2008 | De Sousa | H04W 16/18 370/255 |
| 2009/0201884 A1* | 8/2009 | Chaponniere | H04W 92/20 370/332 |
| 2009/0252073 A1 | 10/2009 | Kim et al. | |
| 2009/0285143 A1 | 11/2009 | Kwun et al. | |
| 2010/0056153 A1* | 3/2010 | Attar | H04B 17/382 455/436 |
| 2010/0067421 A1* | 3/2010 | Gorokhov | H04W 52/0206 370/311 |
| 2010/0093363 A1* | 4/2010 | Malladi | H04B 17/345 455/452.2 |
| 2010/0197306 A1* | 8/2010 | Lopes | H04W 16/10 455/435.1 |
| 2010/0202391 A1* | 8/2010 | Palanki | H04W 72/0426 370/329 |
| 2010/0248736 A1* | 9/2010 | Hulkkonen | H04W 16/14 455/452.2 |
| 2011/0003559 A1* | 1/2011 | Morita | H04J 11/0056 455/67.14 |
| 2011/0003591 A1* | 1/2011 | Venkatachalam | H04L 12/66 455/434 |
| 2011/0128865 A1* | 6/2011 | Doppler | H04W 76/048 370/252 |
| 2011/0134759 A1* | 6/2011 | Kim | H04W 52/146 370/242 |
| 2011/0244792 A1* | 10/2011 | Park | H04W 52/0216 455/39 |
| 2011/0280284 A1* | 11/2011 | Nakao | H04J 11/0053 375/140 |
| 2012/0015649 A1* | 1/2012 | Li | H04W 36/0061 455/434 |
| 2012/0106423 A1* | 5/2012 | Nylander | H04W 52/0241 370/311 |

FOREIGN PATENT DOCUMENTS

| | | |
|---|---|---|
| JP | 2008-278264 | 11/2008 |
| JP | 2009 182619 | 8/2009 |
| JP | 2011-527147 | 10/2011 |
| WO | WO 2010/002692 A1 | 1/2010 |
| WO | WO 2010/005217 A2 | 1/2010 |
| WO | WO 2010/016123 A1 | 2/2010 |

OTHER PUBLICATIONS

3GPP TSG-RAN WG1 Meeting #49bis R1-072963, "Signaling of MBSFN subframe allocation in D-BCH," Nokia Siemens Networks, Nokia, Huawei, Total 5 Pages, (Jun. 25-29, 2007).
3GPP TS 36.304 V9.0.0, "3$^{rd}$ Generation Partnership project; Technical Specification Group Radio Access Network; Evolved Universal Terrestrial Radio Access (E-UTRA); User Equipment (UE) procedures in idle mode," Total 30 Pages, (Sep. 2009).
3GPP TSG-SA1 #42 S1-083461, "LS on HNB/HeNB Open Access Mode," 3GPP SA WG1, Total 2 Pages, (Oct. 13-17, 2008).
3GPP TSG-RAN WG 2 meeting #62 R2-082899, "LS on CSG cell identification," RAN2, Total 2 Pages, (May 5-9, 2008).
3GPP TR 36.814 V1.1.1, "3$^{rd}$ Generation Partnership Project; Technical Specification Group Radio Access Network; Further Advancements for E-UTRA Physical Layer Aspects," Total 39 Pages, (Jun. 2009).
3GPP TR 36.912 V9.0.0, "3$^{rd}$ Generation Partnership Project; Technical Specification Group Radio Access Network; Feasibility study for Further Advancements for E-UTRA (LTE-Advanced)," Total 256 Pages, (Sep. 2009).
3GPP TSG-RAN3 Meeting #66 R3-093104, "RNL-based energy saving solution," Ericsson, Total 30 Pages, (Nov. 9-13, 2009).
3GPP TSG-RAN WG3 #66 R3-093103, "LTE energy saving solution proposal following discussions at RAN3#65 bis," Ericsson, Total 2 Pages, (Nov. 9-13, 2009).
3GPP TSG RAN #44 RP-090665, "Revised SID on LTE-Advanced," Qualcomm, Nokia, Nokia Siemens Networks, T-Mobile, Telecom Italia, Orange, Alcatel Lucent, Softbank Mobile, KDDI, Samsung, Panasonic, Huawei, Total 5 Pages, (May 26-29, 2009).
3GPP TSG-RAN WG3 Meeting #66 R3-093387, "Automatic PRACH informatiion exchange over X2 for SON," Samsung, CATT, Motorola, ZTE, CMCC, ETRI, Ericsson, CATR, Total 11 Pages, (Nov. 9-13, 2009).
3GPP TS 36.331 V9.0.0, "3$^{rd}$ Generation Partnership Project; Technical Specification Group Radio Access Network; Technical Specification Group Radio Access Network; Evolved Universal Terrestrial Radio Access (E-UTRA) Radio Resource Control (RRC) Protocol specification," Total 213 Pages, (Sep. 2009).
3GPP TR 36.814 V1.5.0, "3$^{rd}$ Generation Partnership Project; Technical Specification Group Radio Access Network; Further Advancements for E-UTRA Physical Layer Aspects," Total 53 Pages, (Nov. 2009).
3GPP TS 36.321 V9.1.0, "3$^{rd}$ Generation Partnership Project; Technical Specification Group Radio Access Network; Evolved Universal Terrestrial Radio Access (E-UTRA) Medium Access Control (MAC) protocol specification," Total 48 Pages, (Dec. 2009).
3GPP TS 36.213 V9.0.1, "3$^{rd}$ Generation Partnership Project; Technical Specification Group Radio Access Network; Evolved Universal Terrestrial Radio Access (E-UTRA); Physical layer procedurs," Total 79 Pages, (Dec. 2009).
3GPP TSG-RAN WG1 Meeting #59 R1-094839, "HeNB Interference Coordination," Motorola, Total 4 Pages, (Nov. 8-14, 2009).
International Preliminary Report on Patentability Issued Mar. 7, 2011 in PCT/JP11/52734 Filed Feb. 9, 2011 (with English translation).
International Search Report Issued Mar. 15, 2011 in PCT/JP11/52734 Filed Feb. 9, 2011.
Extended Search Report issued May 27, 2014 in European Patent Application No. 11742256.8.
Chinese OA dated Sep. 24, 2014, in CN Application No. 201180009080.1, (with partial English translation).
JP Office Action, issued Dec. 2, 2014 in JP Application No. 2011-553863 (with partial English translation).
Australian Office Action issued Apr. 30, 2015 in Patent Application No. 2011215256.
Office Action issued Mar. 3, 2015 in Japanese Patent Application No. 2011-553863 (with partial English language translation).
Russian Office Action issued Feb. 2, 2015 in Patent Application No. 2012139020 with Partial English Translation.
Office Action issued Aug. 24, 2015 in Chinese Patent Application No. 201180009080.1 (with partial English translation).
Office Action issued Feb. 26, 2016 in Chinese Patent Application No. 201180009080.1 (with partial English translation).
Office Action issued Aug. 9, 2016 in Japanese Patent Application No. 2015-173685 (with English-language Translation).

(56) References Cited

OTHER PUBLICATIONS

Office Action issued Dec. 6, 2016 in Korean Patent Application No. 10-2012-7020464 (with English-language Translation).

\* cited by examiner

F I G . 1
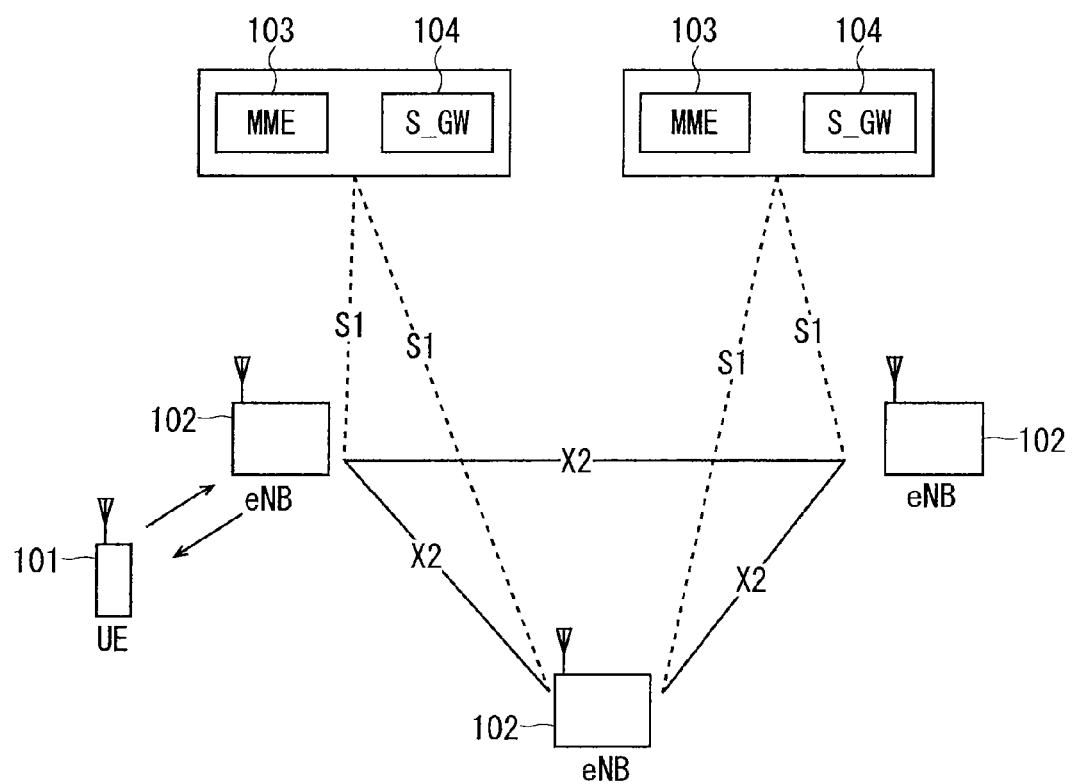

F I G. 2
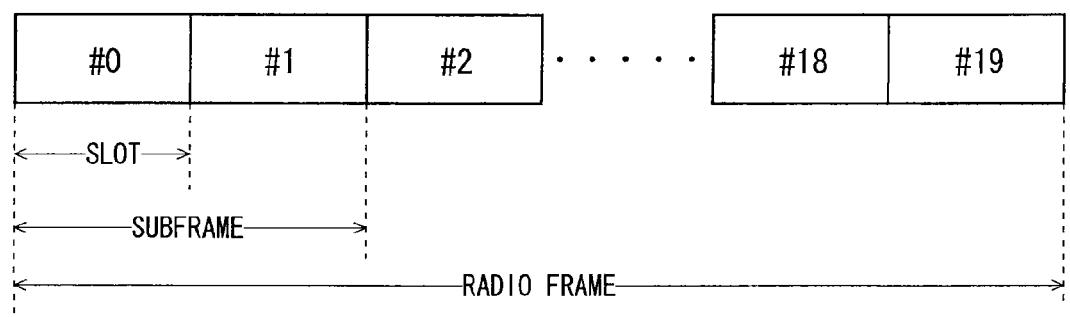

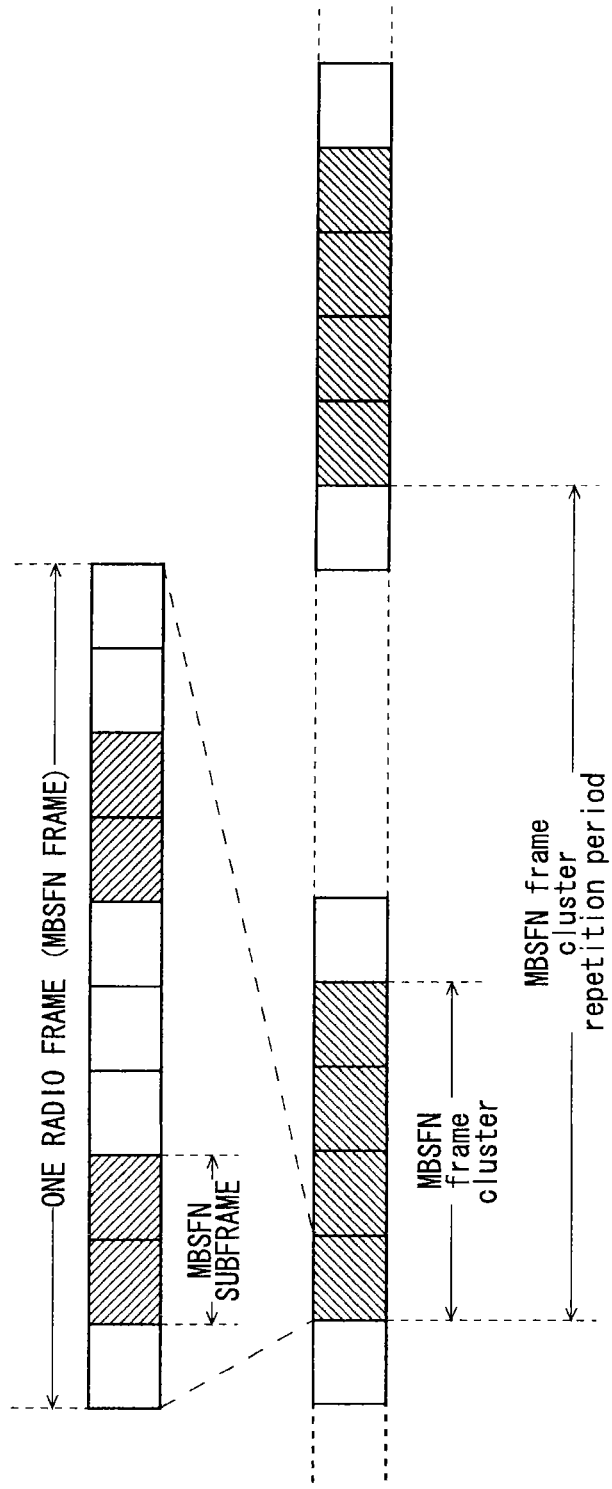
F I G . 3

F I G. 5
(A)
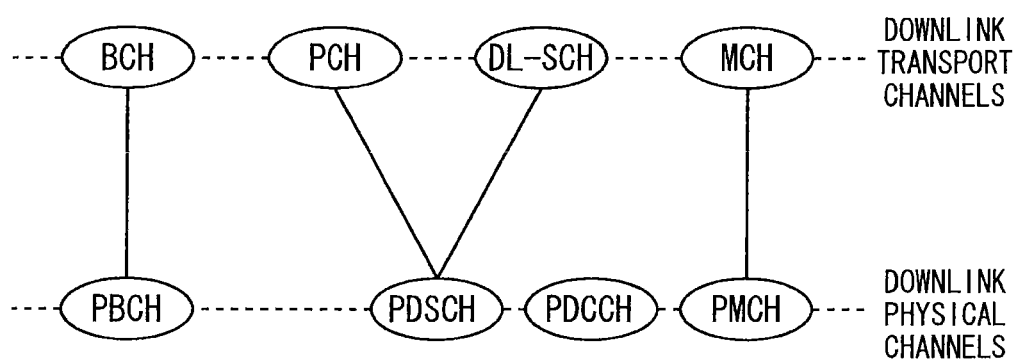
(B)
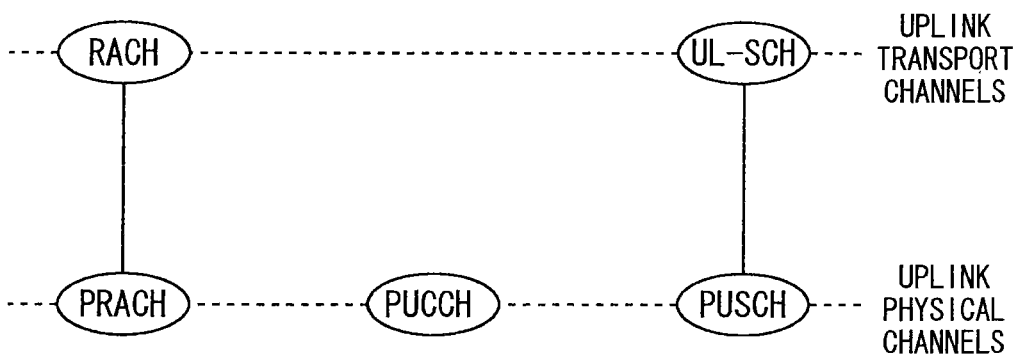

F I G. 6
(A)
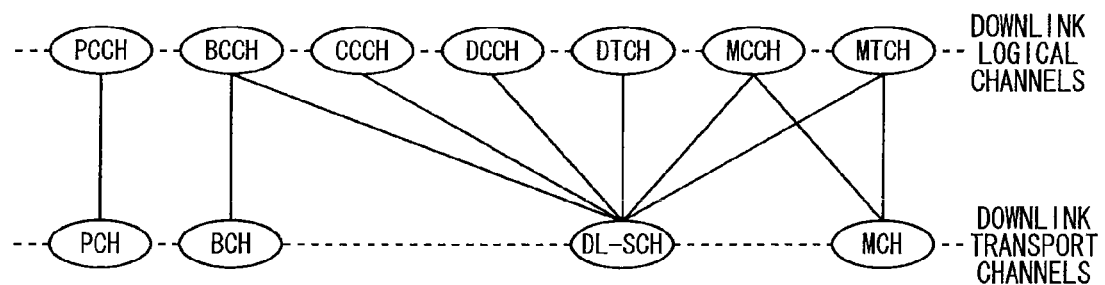
(B)
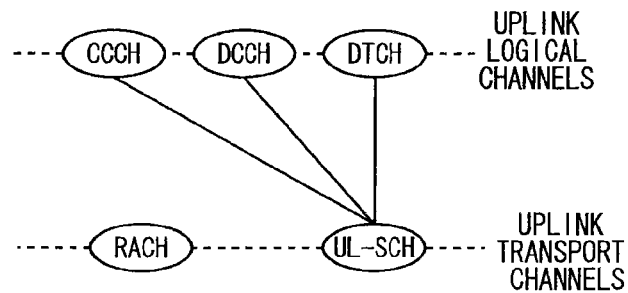

F I G. 1 0
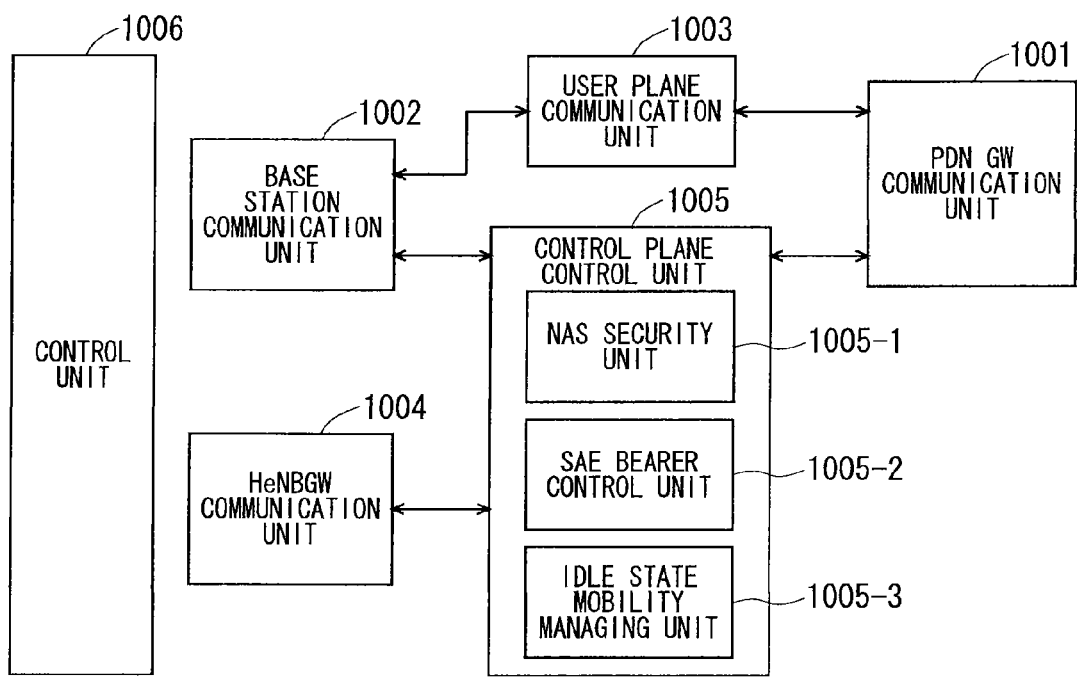

F I G. 1 2
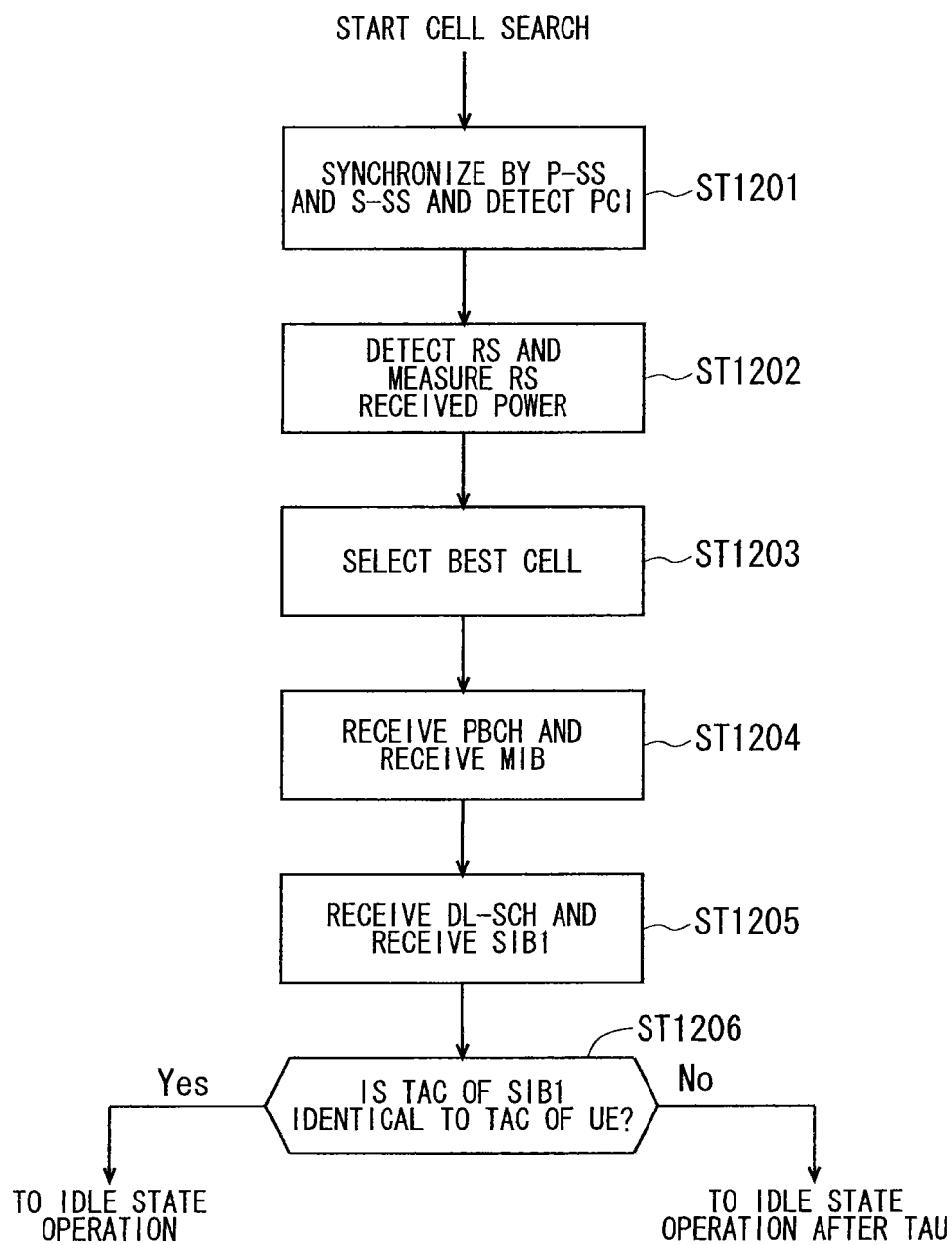

F I G . 1 5
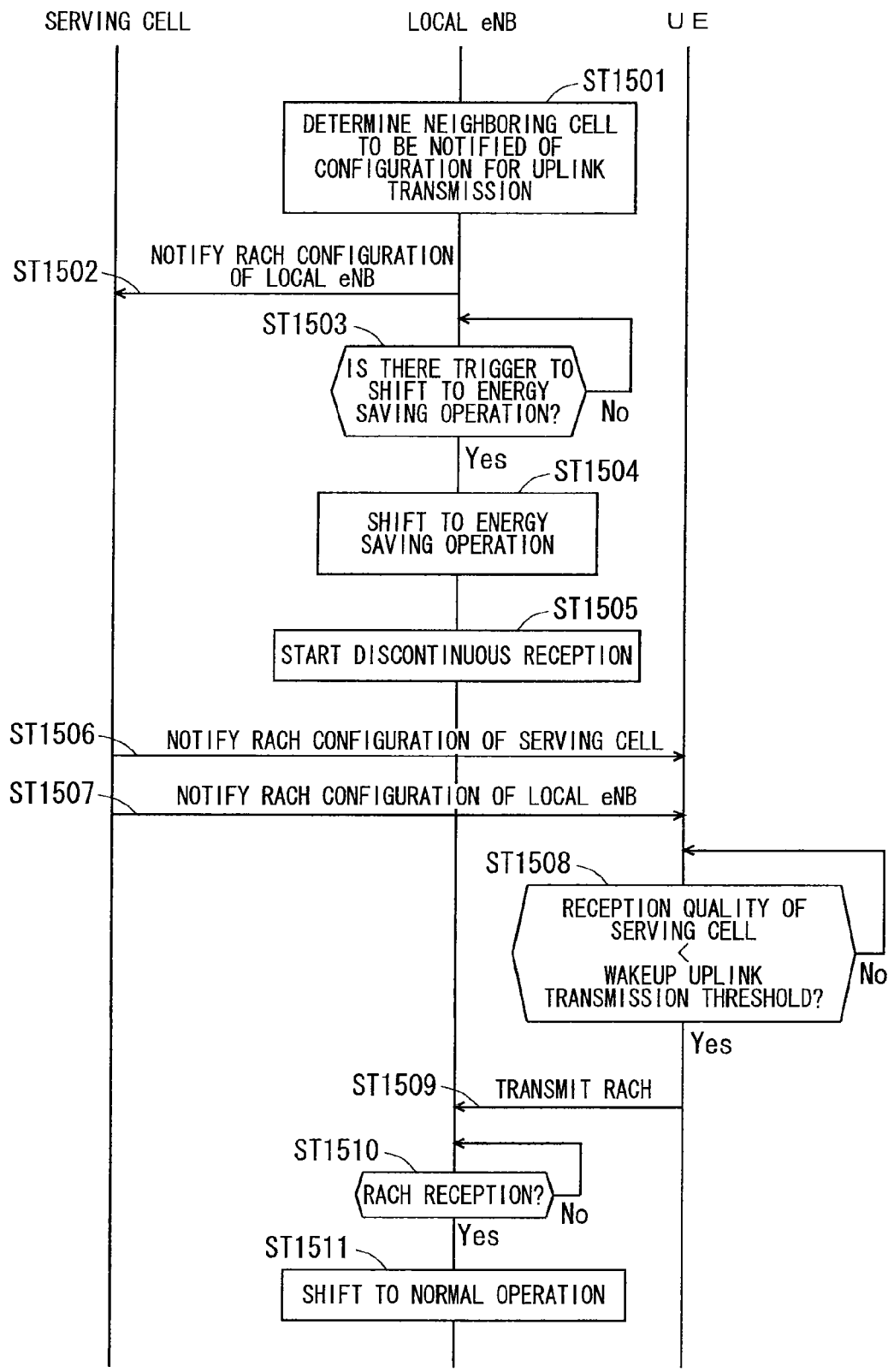

F I G . 1 6
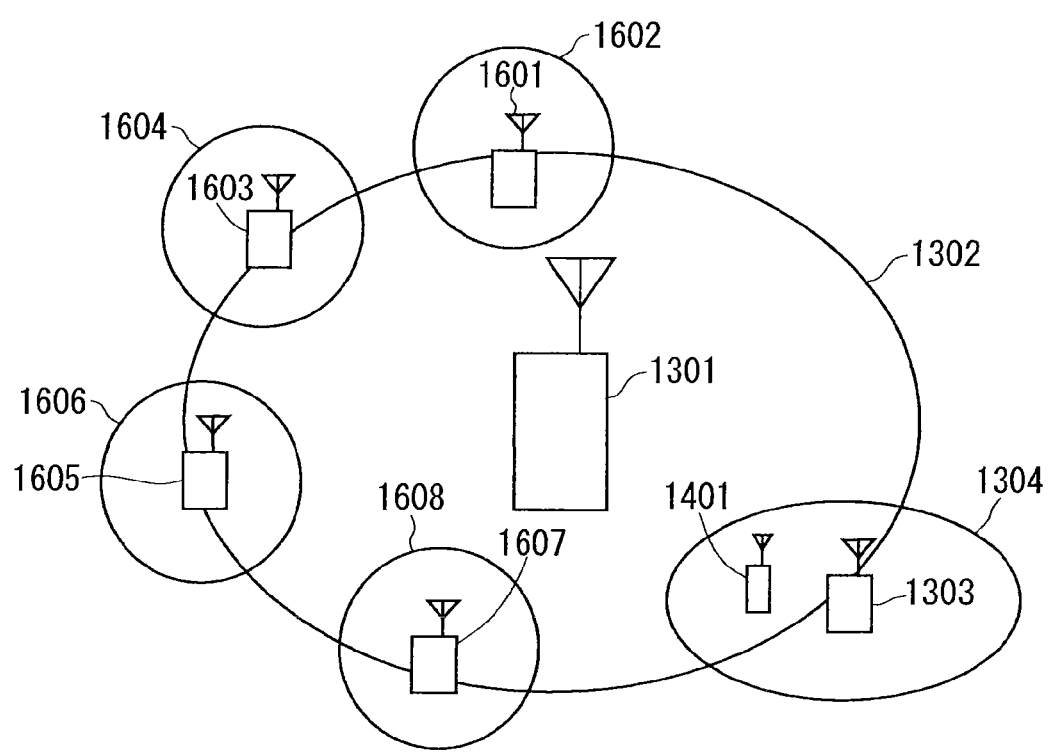

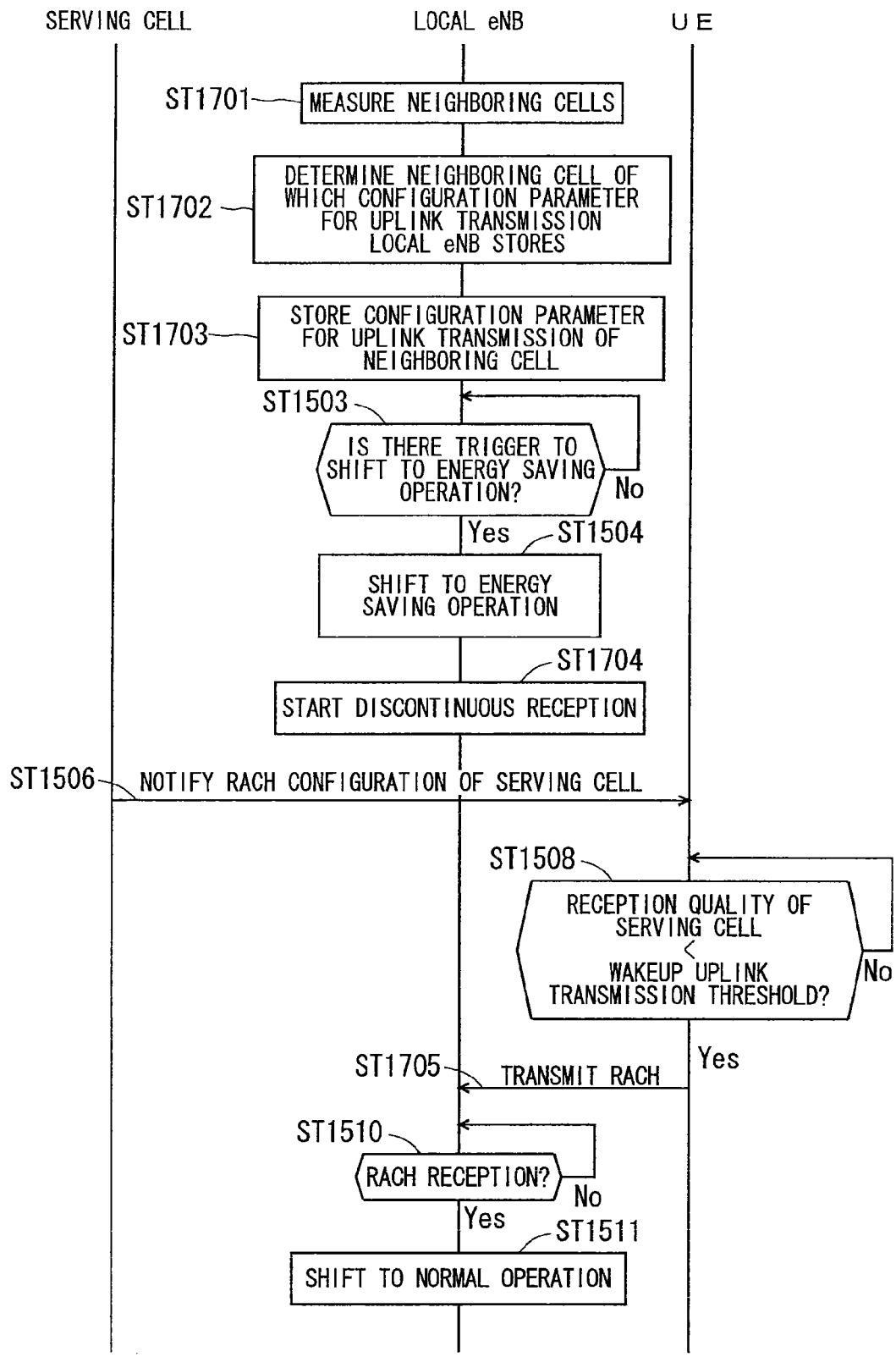

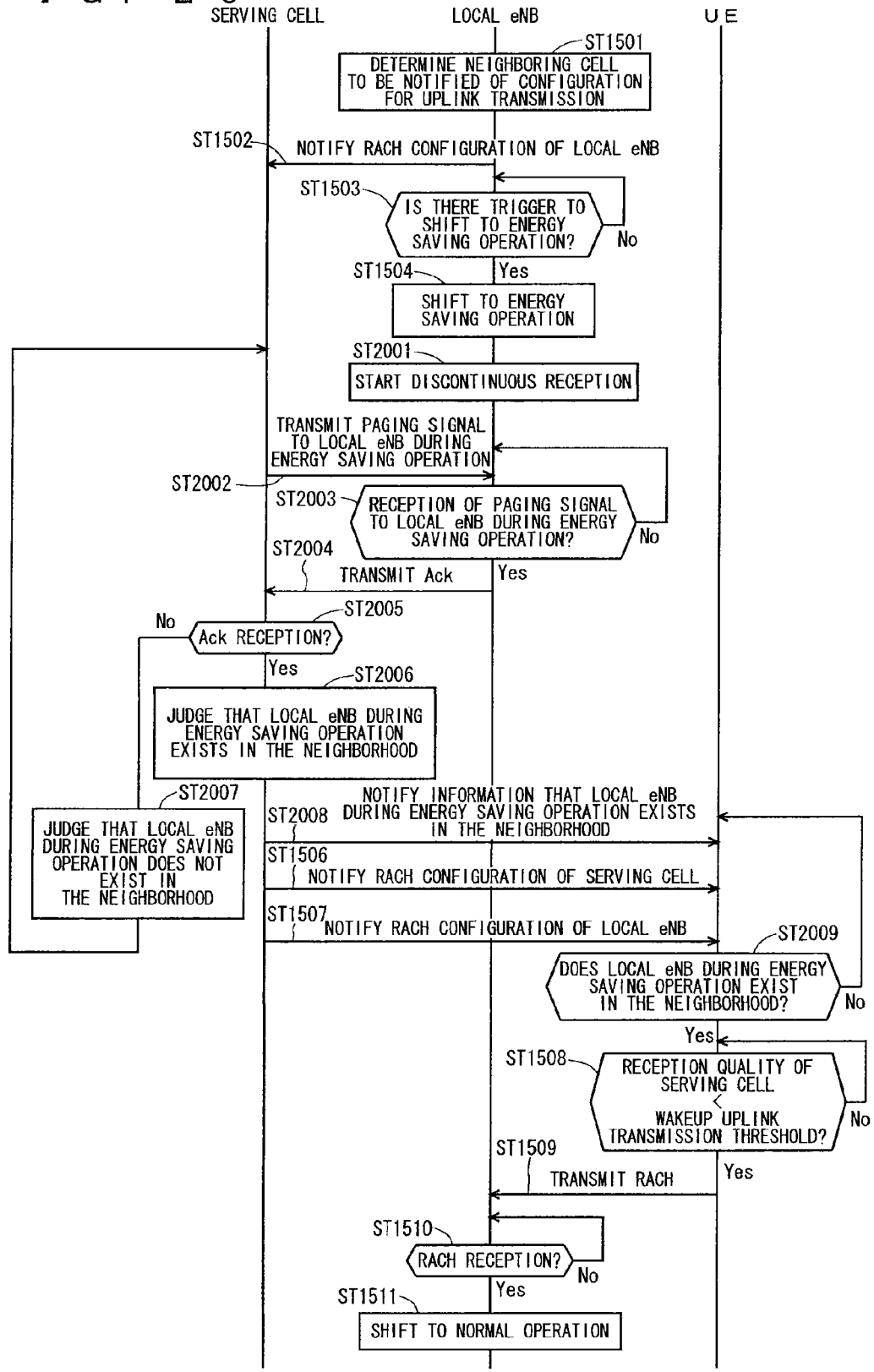

F I G . 2 1
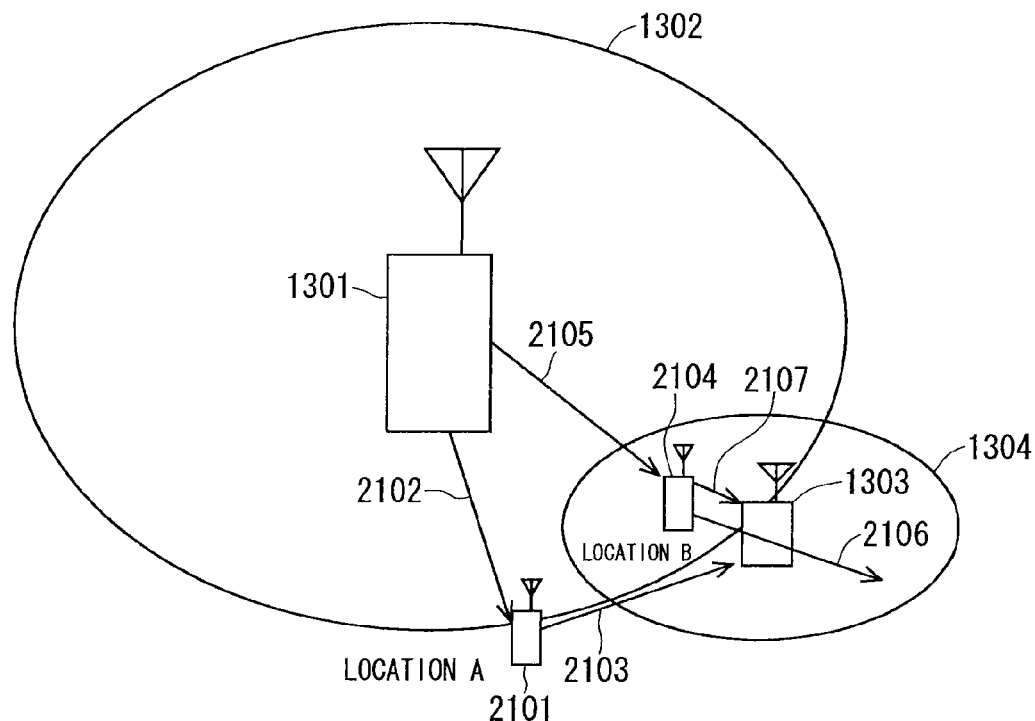
F I G . 2 2
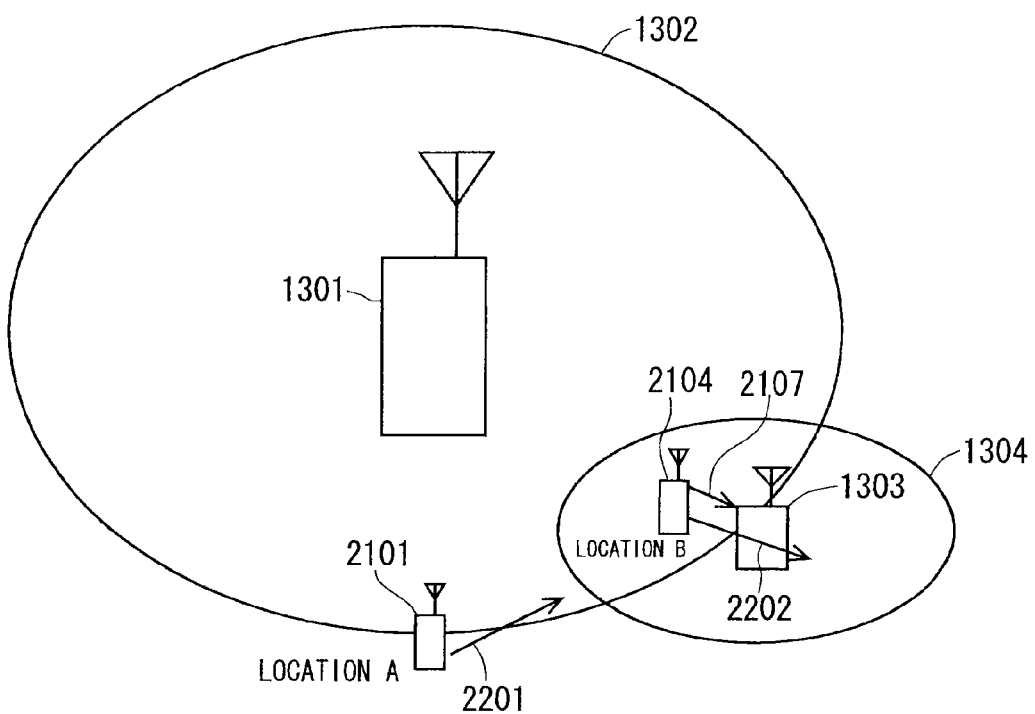

(1) | 1, 2, 7, 8, 9 |

(2)

| RANGE | PRESENCE/ABSENCE |
|---|---|
| EQUAL TO OR LARGER THAN ZERO AND SMALLER THAN THREE | PRESENCE |
| EQUAL TO OR LARGER THAN THREE AND SMALLER THAN SIX | ABSENCE |
| EQUAL TO OR LARGER THAN SIX | PRESENCE |

MOBILE COMMUNICATION SYSTEM

TECHNICAL FIELD

The present invention relates to a mobile communication system in which a base station performs radio communication with a plurality of user equipments.

BACKGROUND ART

Commercial service of a wideband code division multiple access (W-CDMA) system among so-called third-generation communication systems has been offered in Japan since 2001. In addition, high speed downlink packet access (HSDPA) service for achieving higher-speed data transmission using a downlink has been offered by adding a channel for packet transmission (high speed-downlink shared channel (HS-DSCH)) to the downlink (dedicated data channel, dedicated control channel). Further, in order to increase the speed of data transmission in an uplink direction, service of a high speed uplink packet access (HSUPA) system has been offered. W-CDMA is a communication system defined by the 3rd generation partnership project (3GPP) that is the standard organization regarding the mobile communication system, where the specifications of Release 8 version are produced.

Further, 3GPP is studying new communication systems referred to as long term evolution (LTE) regarding radio areas and system architecture evolution (SAE) regarding the overall system configuration including a core network (merely referred to as network as well) as communication systems independent of W-CDMA.

In the LTE, an access scheme, a radio channel configuration and a protocol are totally different from those of the current W-CDMA (HSDPA/HSUPA). For example, as to the access scheme, code division multiple access is used in the W-CDMA, whereas in the LTE, orthogonal frequency division multiplexing (OFDM) is used in a downlink direction and single career frequency division multiple access (SC-FDMA) is used in an uplink direction. In addition, the bandwidth is 5 MHz in the W-CDMA, while in the LTE, the bandwidth can be selected from 1.4 MHz, 3 MHz, 5 MHz, 10 MHz, 15 MHz and 20 MHz for each base station. Further, differently from the W-CDMA, circuit switching is not provided but a packet communication system is only provided in the LTE.

The LTE is defined as a radio access network independent of the W-CDMA network because its communication system is configured with a new core network different from a core network (general packet radio service: GPRS) of the W-CDMA. Therefore, for differentiation from the W-CDMA communication system, a base station that communicates with a user equipment (UE) and a radio network controller that transmits/receives control data and user data to/from a plurality of base stations are referred to as an E-UTRAN NodeB (eNB) and an evolved packet core (EPC) or access gateway (aGW), respectively, in the LTE communication system. Unicast service and evolved multimedia broadcast multicast service (E-MBMS service) are provided in this LTE communication system. The E-MBMS service is broadcast multimedia service, which is merely referred to as MBMS in some cases. Bulk broadcast contents such as news, weather forecast and mobile broadcast are transmitted to a plurality of user equipments. This is also referred to as point to multipoint service.

Non-Patent Document 1 (Chapter 4.6.1) describes current decisions by 3GPP regarding an overall architecture in the LTE system. The overall architecture is described with reference to FIG. 1. FIG. 1 is a diagram illustrating the configuration of the LTE communication system. With reference to FIG. 1, the evolved universal terrestrial radio access (E-UTRAN) is composed of one or a plurality of base stations 102, provided that a control protocol for a user equipment 101 such as a radio resource control (RRC) and user planes such as a packet data convergence protocol (PDCP), radio link control (RLC), medium access control (MAC) and physical layer (PHY) are terminated in a base station 102.

The base stations 102 perform scheduling and transmission of paging signal (also referred to as paging messages) notified from a mobility management entity (MME) 103. The base stations 102 are connected to each other by means of an X2 interface. In addition, the base stations 102 are connected to an evolved packet core (EPC) by means of an S1 interface. More specifically, the base station 102 is connected to the mobility management entity (MME) 103 by means of an S1_MME interface and connected to a serving gateway (S-GW) 104 by means of an S1_U interface.

The MME 103 distributes the paging signal to a plurality of or a single base station 102. In addition, the MME 103 performs mobility control of an idle state. When the user equipment is in the idle state and an active state, the MME 103 manages a list of tracking areas.

The S-GW 104 transmits/receives user data to/from one or a plurality of base stations 102. The S-GW 104 serves as a local mobility anchor point in handover between base stations. Moreover, a PDN gateway (P-GW) is provided in the EPC, which performs per-user packet filtering and UE-ID address allocation.

The control protocol RRC between the user equipment 101 and the base station 102 performs broadcast, paging, RRC connection management and the like. The states of the base station and the user equipment in RRC are classified into RRC_Idle and RRC_CONNECTED. In RRC_IDLE, public land mobile network (PLMN) selection, system information (SI) broadcast, paging, cell reselection, mobility and the like are performed. In RRC_CONNECTED, the user equipment has RRC connection, is capable of transmitting/receiving data to/from a network, and performs, for example, handover (HO) and measurement of a neighbor cell. RRC_IDLE is merely referred to as IDLE or idle state as well. RRC_CONNECTED is merely referred to as CONNECTED or connected state as well.

The current decisions by 3GPP regarding the frame configuration in the LTE system described in Non-Patent Document 1 (Chapter 5) are described with reference to FIG. 2. FIG. 2 is a diagram illustrating the configuration of a radio frame used in the LTE communication system. With reference to FIG. 2, one radio frame is 10 ms. The radio frame is divided into ten equally sized subframes. The subframe is divided into two equally sized slots. The first and sixth subframes contain a downlink synchronization signal (SS) per each radio frame. The synchronization signals are classified into a primary synchronization signal (P-SS) and a secondary synchronization signal (S-SS). Multiplexing of channels for multimedia broadcast multicast service single frequency network (MBSFN) and for non-MBSFN is performed on a per-subframe basis. Hereinafter, a subframe for MBSFN transmission is referred to as an MBSFN subframe.

Non-Patent Document 2 describes a signaling example when MBSFN subframes are allocated. FIG. 3 is a diagram illustrating the configuration of the MBSFN frame. With reference to FIG. 3, the MBSFN subframes are allocated for each MBSFN frame. An MBSFN frame cluster is scheduled. A repetition period of the MBSFN frame cluster is allocated.

Non-Patent Document 1 (Chapter 5) describes the current decisions by 3GPP regarding the channel configuration in the LTE system. It is assumed that the same channel configuration is used in a closed subscriber group cell (CSG cell) as that of a non-CSG cell. Physical channels are described with reference to FIG. 4. FIG. 4 is a diagram illustrating physical channels used in the LTE communication system. With reference to FIG. 4, a physical broadcast channel (PBCH) 401 is a downlink channel transmitted from the base station 102 to the user equipment 101. A BCH transport block is mapped to four subframes within a 40 ms interval. There is no explicit signaling indicating 40 ms timing. A physical control format indicator channel (PCFICH) 402 is transmitted from the base station 102 to the user equipment 101. The PCFICH notifies the number of OFDM symbols used for PDCCHs from the base station 102 to the user equipment 101. The PCFICH is transmitted in each subframe.

A physical downlink control channel (PDCCH) 403 is a downlink channel transmitted from the base station 102 to the user equipment 101. The PDCCH notifies the resource allocation, HARQ information related to DL-SCH (downlink shared channel that is one of the transport channels shown in FIG. 5 described below) and the PCH (paging channel that is one of the transport channels shown in FIG. 5). The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) 404 is a downlink channel transmitted from the base station 102 to the user equipment 101. A DL-SCH (downlink shared channel) that is a transport channel and a PCH that is a transport channel are mapped to the PDSCH. A physical multicast channel (PMCH) 405 is a downlink channel transmitted from the base station 102 to the user equipment 101. A multicast channel (MCH) that is a transport channel is mapped to the PMCH.

A physical uplink control channel (PUCCH) 406 is an uplink channel transmitted from the user equipment 101 to the base station 102. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR). A physical uplink shared channel (PUSCH) 407 is an uplink channel transmitted from the user equipment 101 to the base station 102. A UL-SCH (uplink shared channel that is one of the transport channels shown in FIG. 5) is mapped to the PUSCH.

A physical hybrid ARQ indicator channel (PHICH) 408 is a downlink channel transmitted from the base station 102 to the user equipment 101. The PHICH carries Ack/Nack that is a response to uplink transmission. A physical random access channel (PRACH) 409 is an uplink channel transmitted from the user equipment 101 to the base station 102. The PRACH carries a random access preamble.

A downlink reference signal which is a known symbol in a mobile communication system is inserted in the first, third and last OFDM symbols of each slot. The physical layer measurement objects of a user equipment include reference symbol received power (RSRP).

The transport channel described in Non-Patent Document 1 (Chapter 5) is described with reference to FIG. 5. FIG. 5 is a diagram illustrating transport channels used in the LTE communication system. Part (A) of FIG. 5 shows mapping between a downlink transport channel and a downlink physical channel. Part (B) of FIG. 5 shows mapping between an uplink transport channel and an uplink physical channel. A broadcast channel (BCH) is broadcast to the entire base station (cell) regarding the downlink transport channel. The BCH is mapped to the physical broadcast channel (PBCH).

Retransmission control according to a hybrid ARQ (HARQ) is applied to a downlink shared channel (DL-SCH). The DL-SCH enables broadcast to the entire base station (cell). The DL-SCH supports dynamic or semi-static resource allocation. The semi-static resource allocation is also referred to as persistent scheduling. The DL-SCH supports discontinuous reception (DRX) of a user equipment for enabling the user equipment to save power. The DL-SCH is mapped to the physical downlink shared channel (PDSCH).

The paging channel (PCH) supports DRX of the user equipment for enabling the user equipment to save power. Broadcast to the entire base station (cell) is required for the PCH. The PCH is mapped to physical resources such as the physical downlink shared channel (PDSCH) that can be used dynamically for traffic or physical resources such as the physical downlink control channel (PDCCH) of the other control channel. The multicast channel (MCH) is used for broadcast to the entire base station (cell). The MCH supports SFN combining of MBMS service (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH). The UL-SCH supports dynamic or semi-static resource allocation. The UL-SCH is mapped to the physical uplink shared channel (PUSCH). A random access channel (RACH) shown in part (B) of FIG. 5 is limited to control information. The RACH involves a collision risk. The RACH is mapped to the physical random access channel (PRACH).

The HARQ is described. The HARQ is the technique for improving the communication quality of a channel by combination of automatic repeat request and forward error correction. The HARQ has an advantage that error correction functions effectively by retransmission even for a channel whose communication quality changes. In particular, it is also possible to achieve further quality improvement in retransmission through combination of the reception results of the first transmission and the reception results of the retransmission.

An example of the retransmission method is described. In a case where the receiver fails to successfully decode the received data, in other words, in a case where a cyclic redundancy check (CRC) error occurs (CRC=NG), the receiver transmits "Nack" to the transmitter. The transmitter that has received "Nack" retransmits the data. In a case where the receiver successfully decodes the received data, in other words, in a case where a CRC error does not occur (CRC=OK), the receiver transmits "AcK" to the transmitter. The transmitter that has received "Ack" transmits the next data.

Examples of the HARQ system include chase combining. In chase combining, the same data sequence is transmitted in the first transmission and retransmission, which is the system for improving gains by combining the data sequence of the first transmission and the data sequence of the retransmission in retransmission. This is based on the idea that correct data is partially included even if the data of the first transmission contains an error, and highly accurate data transmission is enabled by combining the correct portions of the first transmission data and the retransmission data. Another example of the HARQ system is incremental redundancy (IR). The IR is aimed to increase redundancy, where a parity bit is transmitted in retransmission to increase the redundancy by combining the first transmission and retransmission, to thereby improve the quality by an error correction function.

A logical channel (hereinafter, referred to as "logical channel" in some cases) described in Non-Patent Document 1 (Chapter 6) is described with reference to FIG. 6. FIG. 6 is a diagram illustrating logical channels used in an LTE communication system. Part (A1 of FIG. 6 shows mapping between a downlink logical channel and a downlink transport channel. Part (B) of FIG. 6 shows mapping between an uplink logical channel and an uplink transport channel. A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting paging signals. The PCCH is used when the network does not know the cell location of a user equipment. The PCCH that is a logical channel is mapped to the paging channel (PCH) that is a transport channel. A common control channel (CCCH) is a channel for transmission control information between user equipments and a base station. The CCCH is used in a case where the user equipments have no RRC connection with the network. In a downlink direction, the CCCH is mapped to the downlink shared channel (DL-SCH) that is a transport channel. In an uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a user equipment. The MCCH is used only by a user equipment during reception of the MBMS. The MCCH is mapped to the downlink shared channel (DL-SCH) or multicast channel (MCH) that is a transport channel.

A dedicated control channel (DCCH) is a channel that transmits dedicated control information between a user equipment and a network. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of user information to a dedicated user equipment. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a user equipment. The MTCH is a channel used only by a user equipment during reception of the MBMS. The MTCH is mapped to the downlink shared channel (DL-SCH) or multicast channel (MCH).

GCI represents a global cell identity. A closed subscriber group cell (CSG cell) is introduced in the LTE and universal mobile telecommunication system (UMTS). The CSG is described below (see Chapter 3.1 of Non-Patent Document 3). The closed subscriber group (CSG) is a cell (cell for specific subscribers) in which subscribers who are allowed to use are specified by an operator. The specified subscribers are allowed to access one or more E-UTRAN cells of a public land mobile network (PLMN). One or more E-UTRAN cells in which the specified subscribers are allowed access are referred to as "CSG cell(s)". Note that access is limited in the PLMN. The CSG cell is part of the PLMN that broadcasts a specific CSG identity (CSG ID, CSG-ID). The authorized members of the subscriber group who have registered in advance access the CSG cells using the CSG-ID that is the access permission information.

The CSG-ID is broadcast by the CSG cell or cells. A plurality of CSG-IDs exist in a mobile communication system. The CSG-IDs are used by user equipments (UEs) for making access from CSG-related members easier. The locations of user equipments are traced based on an area composed of one or more cells. The locations are traced for enabling tracing of the locations of user equipments and calling (calling of user equipments) even in an idle state. An area for tracing locations of user equipments is referred to as a tracking area. A CSG whitelist is a list stored in a universal subscriber identity module (USIM) in which all CSG IDs of the CSG cells to which the subscribers belong are recorded. The CSG whitelist is also referred to as an allowed CSG ID list in some cases.

A "suitable cell" is described below (see Chapter 4. 3 of Non-Patent Document 3). The "suitable cell" is a cell on which a UE camps to obtain normal service. Such a cell shall fulfill the following conditions.

(1) The cell is part of the selected PLMN or the registered PLMN, or part of the PLMN of an "equivalent PLMN list".

(2) According to the latest information provided by a non-access stratum (NAS), the cell shall further fulfill the following conditions:

(a) the cell is not a barred cell;

(b) the cell is part of at least one tracking area (TA), not part of the list of "forbidden LAs for roaming", where the cell needs to fulfill (1) above;

(c) the cell shall fulfill the cell selection criteria; and (d) for a cell specified as CSG cell by system information (SI), the CSG-ID is part of a "CSG whitelist" of the UE (contained in the CSG whitelist of the UE).

An "acceptable cell" is described below (see Chapter 4.3 of Non-Patent Document 3). This is the cell on which a UE camps to obtain limited service (emergency calls). Such a cell shall fulfill all the following requirements. That is, the minimum required set for initiating an emergency call in an E-UTRAN network are as follows: (1) the cell is not a barred cell; and (2) the cell fulfills the cell selection criteria.

Camping on a cell represents the state where a UE has completed the cell selection/reselection process and the UE has selected a cell for monitoring the system information and paging information.

3GPP is studying base stations referred to as Home-NodeB (Home-NB; HNB) and Home-eNodeB (Home-eNB; HeNB). HNB/HeNB is a base station for, for example, household, corporation or commercial access service in UTRAN/E-UTRAN. Non-Patent Document 4 discloses three different modes of the access to the HeNB and HNB. Specifically, those are an open access mode, a closed access mode and a hybrid access mode.

The respective modes have the following characteristics. In the open access mode, the HeNB and HNB are operated as a normal cell of a normal operator. In the closed access mode, the HeNB and HNB are operated as a CSG cell. The CSG cell is a cell where only CSG members are allowed access. In the hybrid access mode, non-CSG members are allowed access at the same time. In other words, a cell in the hybrid access mode (also referred to as hybrid cell) is the cell that supports both the open access mode and the closed access mode.

3GPP discusses that all physical cell identities (PCIs) are split (referred to as PCI-split) into ones reserved for CSG cells and the others reserved for non-CSG cells (see Non-Patent Document 5). Further, 3GPP discusses that the PCI split information is broadcast in the system information from the base station to the user equipments being served thereby. Non-Patent Document 5 discloses the basic operation of a user equipment using PCI split. The user equipment that does not have the PCI split information needs to perform cell search using all PCIs (for example, using all 504 codes). On the other hand, the user equipment that has the PCI split information is capable of performing cell search using the PCI split information.

Further, 3GPP is pursuing specifications standard of long term evolution advanced (LTE-A) as Release 10 (see Non-Patent Document 6 and Non-Patent Document 7).

As to the LTE-A system, it is studied that a relay (relay node (RN)) is supported for achieving a high data rate, high cell-edge throughput, new coverage area or the like. The relay node is wirelessly connected to the radio-access network via a donor cell (Donor eNB; DeNB). The network (NW)-to-relay node link shares the same frequency band with the network-to-UE link within the range of the donor cell. In this case, the UE can also be connected to the donor cell in Release 8. The link between a donor cell and a relay node is referred to as a backhaul link, and the link between the relay node and the UE is referred to as an access link.

As the method of multiplexing backhaul links in frequency division duplex (FDD), the transmission from DeNB to RN in the downlink (DL) frequency band, whereas the transmission from RN to DeNB is done in the uplink (UL) frequency band. As the method of partitioning resources at the relay, the link from DeNB to RN and link from RN to UE are time division multiplexed in a single frequency band, and the link from RN to DeNB and the link from UE to RN are time division multiplexed in a single frequency band as well. This prevents, in the relay, the transmission of the relay from causing interference to the reception of its own relay.

As one of the techniques to be studied in LTE-A, heterogeneous networks (HetNet) are added. 3GPP has decided to handle low-output-power network nodes in a local area range, such as pico eNB (pico cell), node for hotzone cells, HeNB/HNB/CSG cell, relay node, and remote radio head (RRH).

3GPP discusses energy saving of an infrastructure. Currently, energy saving of an infrastructure is discussed as follows. A base station or cell employed as a capacity booster monitors a traffic load, and can be switched off if the state in which a traffic is equal to or smaller than a given threshold continues for a certain period (see Non-Patent Document 8). In a case where the load of an operating base station is high, the base station can request that the base station that has been switched off be switched on (see Non-Patent Document 8). The base station that can be switched off is a cell that provides basic coverage and basic capacity (see Non-Patent Document 9).

Typically, the cells that provide basic coverage and basic capacity are regarded as wide-area eNBs (see Non-Patent Document 10).

PRIOR ART DOCUMENTS

Non-Patent Documents

Non-Patent Document 1: 3GPP TS36.300 V9.1.0 Chapter 4.6.1, Chapter 4.6.2, Chapter 5, Chapter 6, and Chapter 10.7

Non-Patent Document 2: 3GPP R1-072963
Non-Patent Document 3: 3GPP TS36.304 V9.0.0 Chapter 3.1, Chapter 4.3 and Chapter 5.2.4
Non-Patent Document 4: 3GPP S1-083461
Non-Patent Document 5: 3GPP R2-082899
Non-Patent Document 6: 3GPP TR36.814 V1.1.1
Non-Patent Document 7: 3GPP TR36.912 V9.0.0
Non-Patent Document 8: 3GPP R3-093104
Non-Patent Document 9: 3GPP R3-093103
Non-Patent Document 10: 3GPP RP-090665

SUMMARY OF INVENTION

Problem to be Solved by the Invention

As described above, the cells that provide basic coverage and basic capacity are typically regarded as wide-area eNBs. This means that network nodes in a local area range are not taken into consideration in the technology disclosed in Non-Patent Document 8. This leads to a problem that the conventional technology cannot reduce energy consumption of network nodes in a local area range.

An efficient reduction in energy consumption of network nodes in a local area range is an important issue for pursuing energy saving of a system.

An object of the present invention is to provide a mobile communication system capable of reducing energy consumption of network nodes in a local area range.

Means to Solve the Problem

The present invention relates to a mobile communication system including a local base station device and a user equipment device configured to perform radio communication with the local base station device, wherein upon predetermined shift conditions being satisfied, the local base station device shifts from a normal operation state to an energy saving operation state, the local base station device performing a transmission operation for downlink transmission signals to be transmitted to the user equipment device and a reception operation for uplink transmission signals transmitted from the user equipment device in the normal operation state and stopping the transmission operation for at least part of the downlink transmission signals and performing the reception operation in the energy saving operation state.

Effects of the Invention

According to the mobile communication system of the present invention, when the predetermined shift condition is satisfied, the local base station device shifts from the normal operation state to the energy saving operation state, to thereby stop the transmission operation for at least part of the downlink transmission signals to be transmitted to the user equipment device. As a result, energy consumption can be reduced in the local base station device even if the local base station device is, for example, a network node in a local area range. In addition, even in the energy saving operation state, the local base station device performs the reception operation of the uplink transmission signals transmitted from the user equipment device. Accordingly, the local base station device can be configured to shift from the energy saving operation state to the normal operation state when, for example, receiving the uplink transmission signal transmitted from the user equipment device. This enables the local base station device in the energy saving operation state to shift to the normal operation state irrespective of the location and state of the user equipment device.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a diagram illustrating the configuration of an LTE communication system.

FIG. 2 is a diagram illustrating the configuration of a radio frame used in the LTE communication system.

FIG. 3 is a diagram illustrating the configuration of an MBSFN frame.

FIG. 5 is a diagram illustrating transport channels used in the LTE communication system.

FIG. 6 is a diagram illustrating logical channels used in the LTE communication system.

FIG. 10 is a block diagram showing the configuration of an MME (MME unit 73 of FIG. 7) according to the present invention.

FIG. 12 is a flowchart showing an outline from a cell search to an idle state operation performed by a user equipment (UE) in the LTE communication system.

FIG. 15 is a diagram illustrating a sequence example of a mobile communication system in a case where the solution of the first embodiment is used.

FIG. 16 is a location diagram illustrating a problem of a first modification of the first embodiment.

FIG. 17 is a diagram illustrating a sequence example of a mobile communication system in a case where a solution of the first modification of the first embodiment is used.

FIG. 20 is a diagram illustrating a sequence example of a mobile communication system in a case where a solution of a third modification of the first embodiment is used.

FIG. 21 is a location diagram illustrating a problem of a fifth modification of the first embodiment.

FIG. 22 is a conceptual diagram in a case where a solution of the fifth modification of the first embodiment is used.

EMBODIMENTS FOR CARRYING OUT THE INVENTION

First Embodiment

Figure 4:
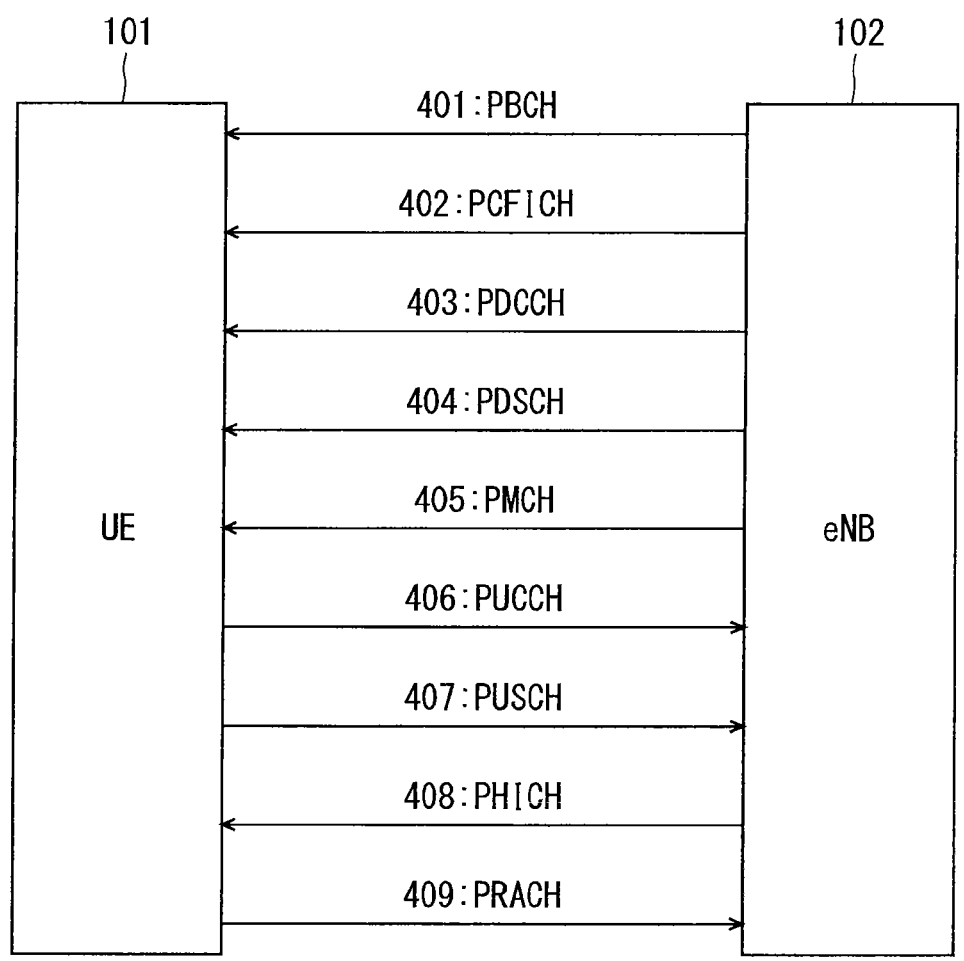
FIG. 4 is a diagram illustrating physical channels used in the LTE communication system.
Figure 7:
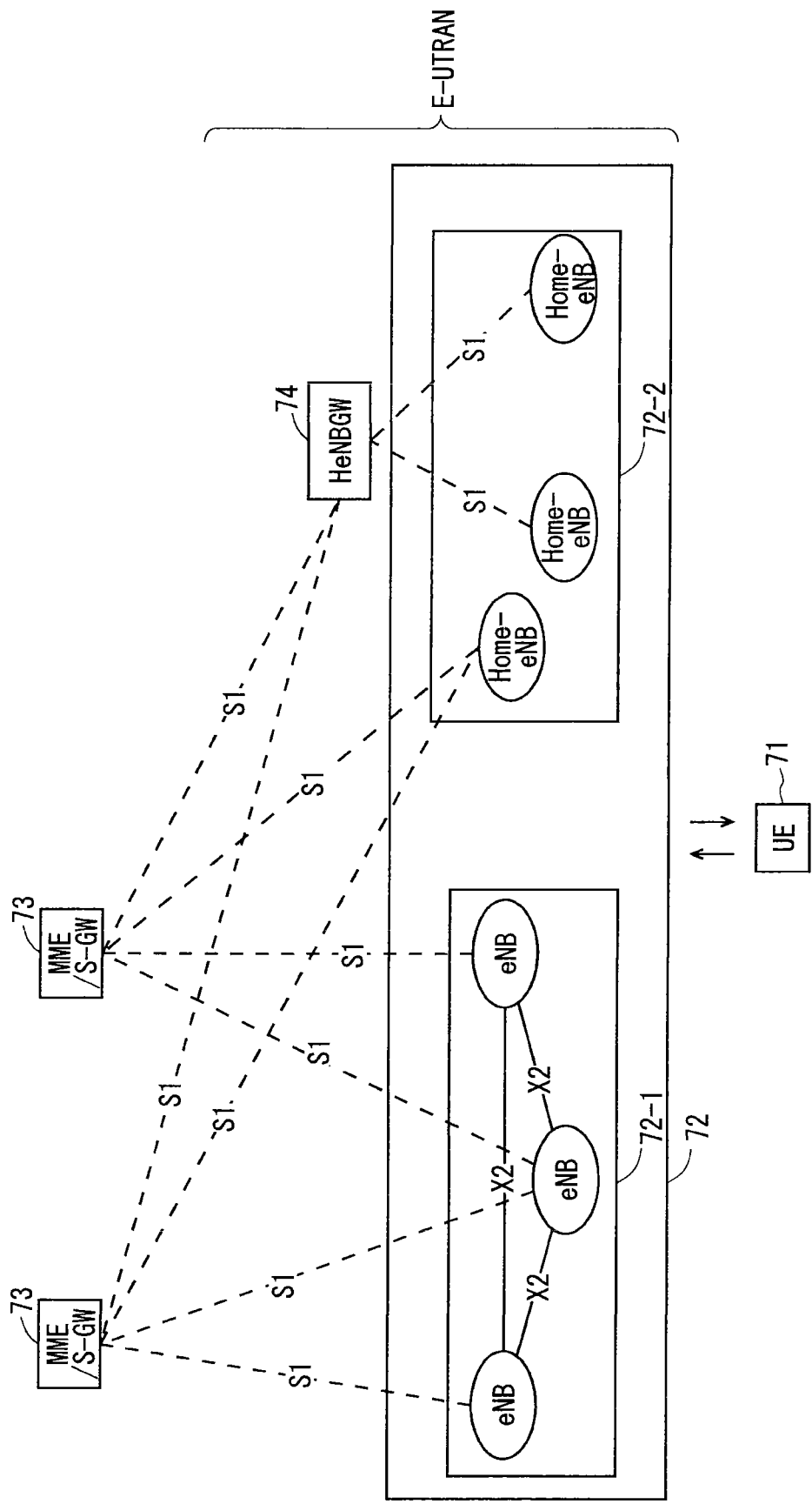
FIG. 7 is a block diagram showing the overall configuration of an LTE mobile communication system currently under discussion of 3GPP.

FIG. 7 is a block diagram showing an overall configuration of an LTE mobile communication system, which is currently under discussion of 3GPP. Currently, 3GPP is studying an overall system configuration including closed subscriber group (CSG) cells (Home-eNodeBs (Home-eNB; HeNB) of E-UTRAN, Home-NB (HNB) of UTRAN) and non-CSG cells (eNodeB (eNB) of E-UTRAN, NodeB (NB) of UTRAN, and BSS of GERAN) and, as to E-UTRAN, is proposing the configuration as shown in FIG. 7 (see Chapter 4.6.1 of Non-Patent Document 1).

FIG. 7 is described. A user equipment device (hereinafter, referred to as "user equipment" or "UE") 71 is capable of performing radio communication with a base station device (hereinafter, referred to as "base station") 72 and transmits/receives signals through radio communication. The base stations 72 are classified into an eNB 72-1 and a Home-eNB 72-2. The eNB 72-1 is connected to an MME/S-GW unit (hereinafter, referred to as an "MME unit") 73 including an MME, S-GW or MME and S-GW through an S1 interface, and control information is communicated between the eNB 72-1 and the MME unit 73. A plurality of MME units 73 may be connected to one eNB 72-1. The eNBs 72-1 are connected to each other by means of an X2 interface, and control information is communicated between the eNBs 72-1.

The Home-eNB 72-2 is connected to the MME unit 73 by means of the S1 interface, and control information is communicated between the Home-eNB 72-2 and the MME unit 73. A plurality of Home-eNBs 72-2 are connected to one MME unit 73. While, the Home-eNBs 72-2 are connected to the MME units 73 through a Home-eNB Gateway (HeNBGW) 74. The Home-eNBs 72-2 are connected to the HeNBGW 74 by means of the S1 interface, and the HeNBGW 74 is connected to the MME units 73 through an S1 interface. One or a plurality of Home-eNBs 72-2 are connected to one HeNBGW 74, and information is communicated therebetween through an S1 interface. The HeNBGW 74 is connected to one or a plurality of MME units 73, and information is communicated therebetween through an S1 interface.

Further, 3GPP is currently studying the configuration below. The X2 interface between the Home-eNBs 72-2 is not supported. The HeNBGW 74 appears to the MME unit 73 as the eNB 72-1. The HeNBGW 74 appears to the Home-eNB 72-2 as the MME unit 73. The interfaces between the Home-eNBs 72-2 and the MME units 73 are the same, which are the S1 interfaces, irrespective of whether or not the Home-eNB 72-2 is connected to the MME unit 73 through the HeNBGW 74. The mobility to the Home-eNB 72-2 or the mobility from the Home-eNB 72-2 that spans the plurality of MME units 73 is not supported. The Home-eNB 72-2 supports a single cell.

Figure 8:
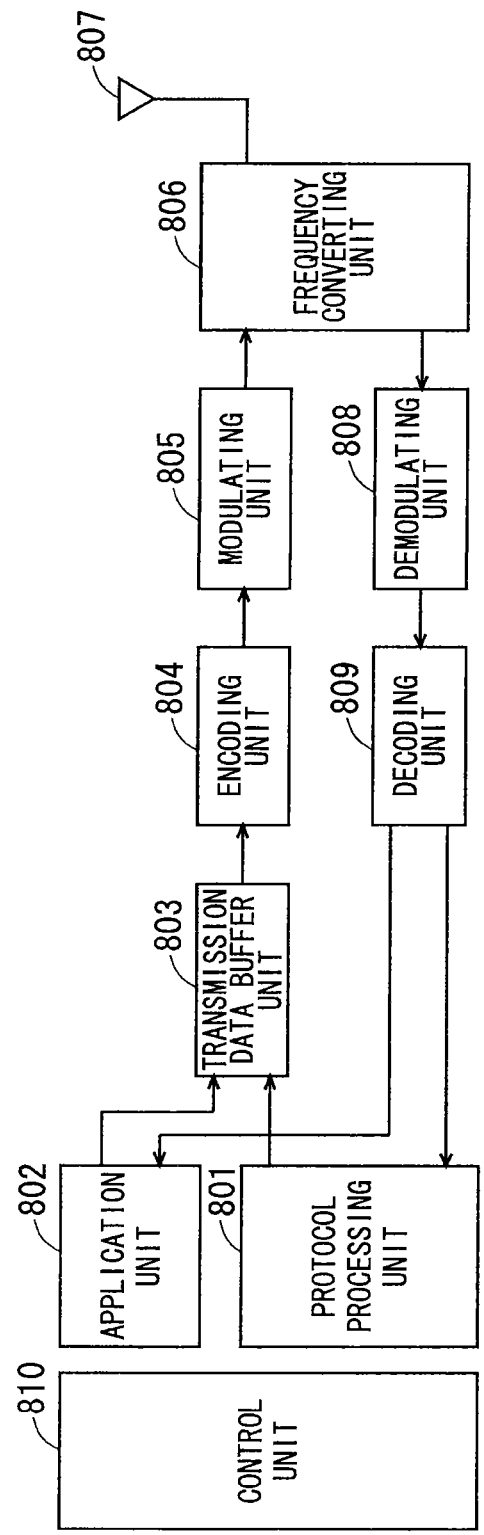
FIG. 8 is a block diagram showing the configuration of a user equipment (user equipment 71 of FIG. 7) according to the present invention.

FIG. 8 is a block diagram showing the configuration of the user equipment (user equipment 71 of FIG. 7) according to the present invention. The transmission process of the user equipment 71 shown in FIG. 8 is described. First, a transmission data buffer unit 803 stores the control data from a protocol processing unit 801 and the user data from an application unit 802. The data stored in the transmission data buffer unit 803 is transmitted to an encoding unit 804 and is subjected to encoding process such as error correction. There may exist the data output from the transmission data buffer unit 803 directly to a modulating unit 805 without encoding process. The data encoded by the encoding unit 804 is modulated by the modulating unit 805. The modulated data is output to a frequency converting unit 806 after being converted into a baseband signal, and then is converted into a radio transmission frequency. After that, a transmission signal is transmitted from an antenna 807 to the base station 72.

The user equipment 71 executes the reception process as follows. The antenna 807 receives the radio signal from the base station 72. The received signal is converted from a radio reception frequency to a baseband signal by the frequency converting unit 806 and is then demodulated by a demodulating unit 808. The demodulated data is transmitted to a decoding unit 809 and is subjected to decoding process such as error correction. Among the pieces of decoded data, the control data is transmitted to the protocol processing unit 801, while the user data is transmitted to the application unit 802. A series of processes of the user equipment 71 is controlled by a control unit 810. This means that, though not shown in FIG. 8, the control unit 810 is connected to the respective units 801 to 809.

Figure 9:
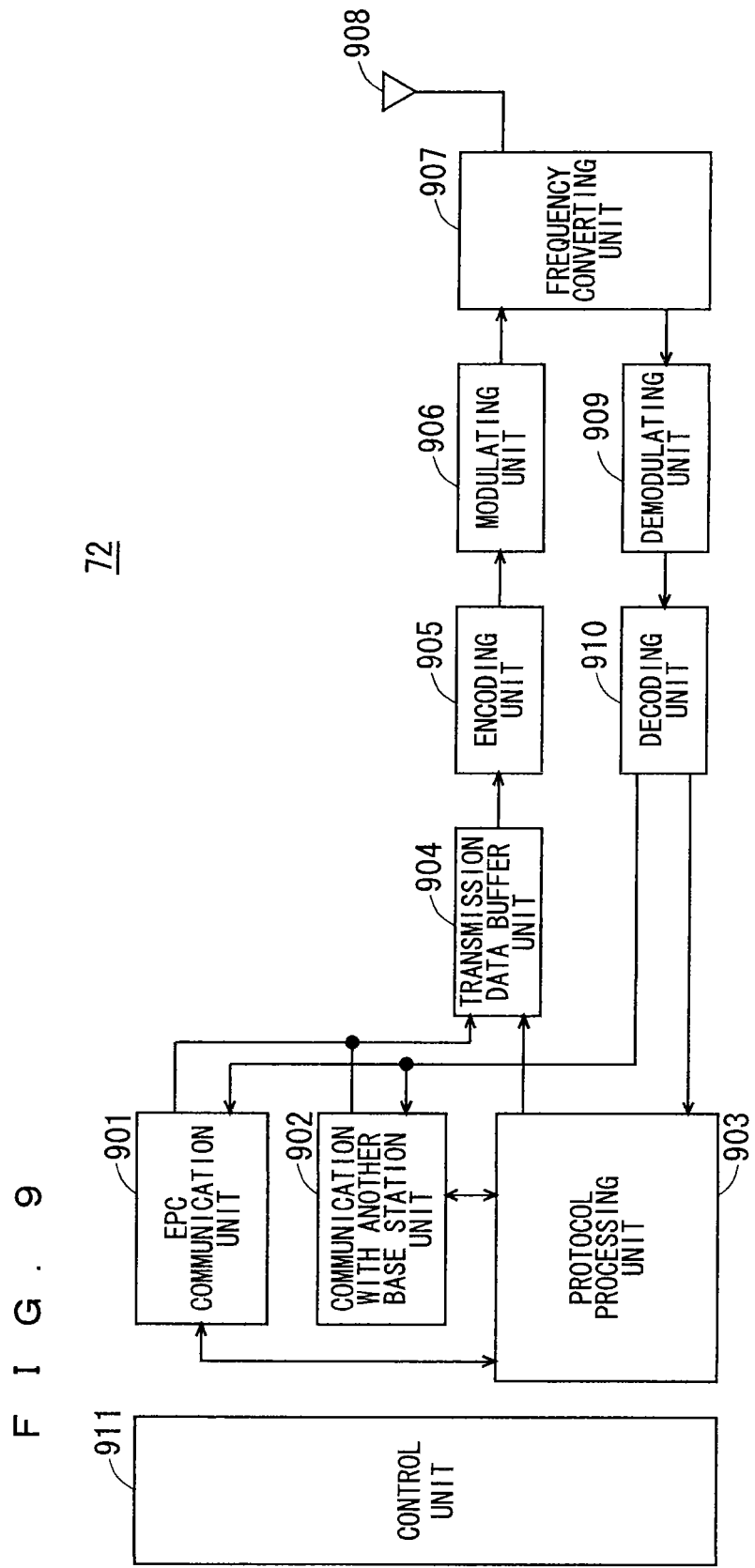
FIG. 9 is a block diagram showing the configuration of a base station (base station 72 of FIG. 7) according to the present invention.

FIG. 9 is a block diagram showing the configuration of the base station (base station 72 of FIG. 7) according to the present invention. The transmission process of the base station 72 shown in FIG. 9 is described. An EPC communication unit 901 performs data transmission/reception between the base station 72 and the EPCs (such as MME unit 73 and HeNBGW 74). The EPC corresponds to a communication device. A communication with another base station unit 902 performs data transmission/reception to/from another base station. The X2 interface between the Home-eNBs 72-2 is not intended to be supported, and accordingly, it is conceivable that the communication with another base station unit 902 may not exist in the Home-eNB 72-2. The EPC communication unit 901 and the communication with another base station unit 902 respectively transmit/receive information to/from a protocol processing unit 903. The control data from the protocol processing unit 903, and the user data and control data from the EPC communication unit 901 and the communication with another base station unit 902 are stored in a transmission data buffer unit 904.

The data stored in the transmission data buffer unit 904 is transmitted to an encoding unit 905 and is then subjected to encoding process such as error correction. There may exist the data output from the transmission data buffer unit 904 directly to a modulating unit 906 without encoding process. The encoded data is modulated by the modulating unit 906. The modulated data is output to a frequency converting unit 907 after being converted into a baseband signal, and is then converted into a radio transmission frequency. After that, a transmission signal is transmitted from an antenna 908 to one or a plurality of user equipments 71.

Meanwhile, the reception process of the base station 72 is executed as follows. A radio signal from one or a plurality of user equipments 71 is received by the antenna 908. The received signal is converted from a radio reception frequency into a baseband signal by the frequency converting unit 907, and is then demodulated by a demodulating unit 909. The demodulated data is transmitted to a decoding unit 910 and is then subjected to decoding process such as error correction. Among the pieces of decoded data, the control data is transmitted to the protocol processing unit 903, EPC communication unit 901, or communication with another base station unit 902, while the user data is transmitted to the EPC communication unit 901 and communication with another base station unit 902. A series of processes by the base station 72 is controlled by a control unit 911. This means that, though not shown in FIG. 9, the control unit 911 is connected to the respective units 901 to 910.

The functions of the Home-eNB 72-2 currently under discussion of 3GPP are described below (see Chapter 4.6.2 of Non-Patent Document 1). The Home-eNB 72-2 has the same function as that of the eNB 72-1. In addition, the Home-eNB 72-2 has the function of discovering a suitable serving HeNBGW 74 in a case of connection to the HeNBGW 74. The Home-eNB 72-2 is connected only to one HeNBGW 74. That is, in a case of the connection to the HeNBGW 74, the Home-eNB 72-2 does not use the Flex function in the S1 interface. When the Home-eNB 72-2 is connected to one HeNBGW 74, it is not simultaneously connected to another HeNBGW 74 or another MME unit 73.

The TAC and PLMN ID of the Home-eNB 72-2 are supported by the HeNBGW 74. When the Home-eNB 72-2 is connected to the HeNBGW 74, selection of the MME unit 73 at "UE attachment" is performed by the HeNBGW 74 instead of the Home-eNB 72-2. The Home-eNB 72-2 may be deployed without network planning. In this case, the Home-eNB 72-2 is moved from one geographical area to another geographical area. Accordingly, the Home-eNB 72-2 in this case is required to be connected to a different HeNBGW 74 depending on its location.

FIG. 10 is a block diagram showing the configuration of the MME (MME unit 73 of FIG. 7) according to the present invention. A PDN GW communication unit 1001 performs data transmission/reception between the MME unit 73 and a PDN GW. A base station communication unit 1002 performs data transmission/reception between the MME unit 73 and the base station 72 by means of the S1 interface. In the case where the data received from the PDN GW is user data, the user data is transmitted from the PDN GW communication unit 1001 to the base station communication unit 1002 through a user plane communication unit 1003 and is then transmitted to one or a plurality of base stations 72. In the case where the data received from the base station 72 is user data, the user data is transmitted from the base station communication unit 1002 to the PDN GW communication unit 1001 through the user plane communication unit 1003 and is then transmitted to the PDN GW.

In the case where the data received from the PDN GW is control data, the control data is transmitted from the PDN GW communication unit 1001 to a control plane control unit 1005. In the case where the data received from the base station 72 is control data, the control data is transmitted from the base station communication unit 1002 to the control plane control unit 1005.

A HeNBGW communication unit 1004 is provided in the case where the HeNBGW 74 is provided, which performs data transmission/reception by means of the interface (IF) between the MME unit 73 and the HeNBGW 74 according to an information type. The control data received from the HeNBGW communication unit 1004 is transmitted from the HeNBGW communication unit 1004 to the control plane control unit 1005. The processing results of the control plane control unit 1005 are transmitted to the PDN GW through the PDN GW communication unit 1001. The processing results of the control plane control unit 1005 are transmitted to one or a plurality of base stations 72 by means of the S1 interface through the base station communication unit 1002, and are transmitted to one or a plurality of HeNBGWs 74 through the HeNBGW communication unit 1004.

The control plane control unit 1005 includes a NAS security unit 1005-1, an SAE bearer control unit 1005-2 and an idle state mobility managing unit 1005-3, and performs overall process for the control plane. The NAS security unit 1005-1 provides, for example, security of a non-access stratum (NAS) message. The SAE bearer control unit 1005-2 manages, for example, a system architecture evolution (SAE) bearer. The idle state mobility managing unit 1005-3 performs, for example, mobility management of an idle state (LTE-IDLE state, which is merely referred to as idle as well), generation and control of paging signaling in an idle state, addition, deletion, update and search of a tracking area (TA) of one or a plurality of user equipments 71 being served thereby, and tracking area list (TA list) management.

The MME unit 73 begins a paging protocol by transmitting a paging message to the cell belonging to a tracking area (TA) in which the UE is registered. The idle state mobility managing unit 1005-3 may manage the CSG of the Home-eNBs 72-2 to be connected to the MME unit 73, CSG-IDs and a whitelist.

In the CSG-ID management, the relationship between a user equipment corresponding to the CSG-ID and the CSG cell is managed (added, deleted, updated or searched). For example, it may be the relationship between one or a plurality of user equipments whose user access registration has been performed with a CSG-ID and the CSG cells belonging to this CSG-ID. In the whitelist management, the relationship between the user equipment and the CSG-ID is managed (added, deleted, updated or searched). For example, one or a plurality of CSG-IDs with which user registration has been performed by a user equipment may be stored in the whitelist. The above-mentioned management related to the CSG may be performed by another part of the MME unit 73. A series of processes by the MME unit 73 is controlled by a control unit 1006. This means that, though not shown in FIG. 10, the control unit 1006 is connected to the respective units 1001 to 1005.

The function of the MME currently under discussion of 3GPP is described below (see Chapter 4.6.2 of Non-Patent Document 1). The MME performs access control for one or a plurality of user equipments being members of closed subscriber groups (CSGs). The MME recognizes the execution of paging optimization as an option.

Figure 11:
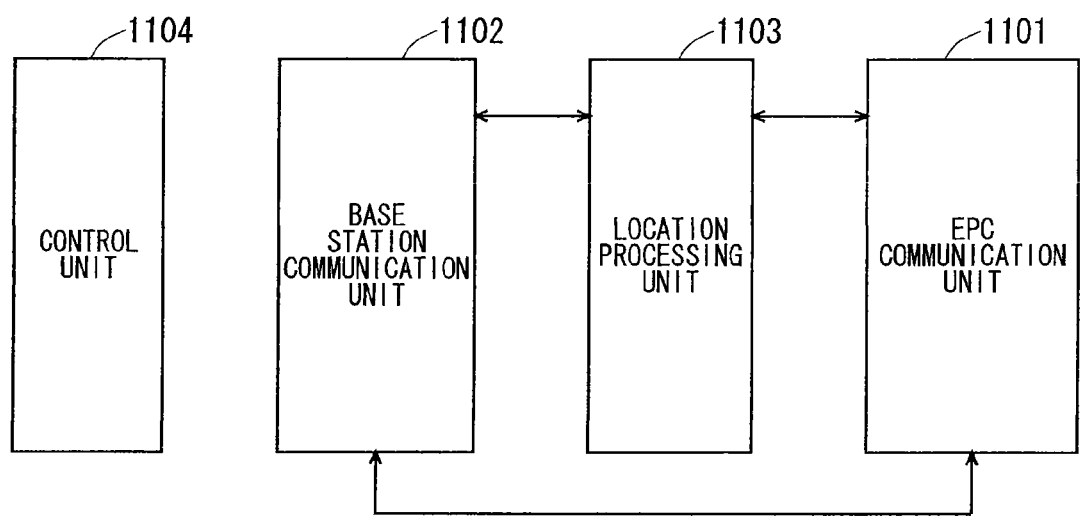
FIG. 11 is a block diagram showing the configuration of a HeNBGW 74 shown in FIG. 7 that is a HeNBGW according to the present invention.

FIG. 11 is a block diagram showing the configuration of the HeNBGW 74 shown in FIG. 7 that is a HeNBGW according to the present invention. An EPC communication unit 1101 performs data transmission/reception between the HeNBGW 74 and the MME unit 73 by means of the S1 interface. A base station communication unit 1102 performs data transmission/reception between the HeNBGW 74 and the Home-eNB 72-2 by means of the S1 interface. A location processing unit 1103 performs the process of transmitting, to a plurality of Home-eNBs 72-2, the registration information or the like among the data transmitted from the MME unit 73 through the EPC communication unit 1101. The data processed by the location processing unit 1103 is transmitted to the base station communication unit 1102 and is transmitted to one or a plurality of Home-eNBs 72-2 through the S1 interface.

The data only caused to pass through (to be transparent) without requiring the process by the location processing unit 1103 is passed from the EPC communication unit 1101 to the base station communication unit 1102, and is transmitted to one or a plurality of Home-eNBs 72-2 through the S1 interface. A series of processes by the HeNBGW 74 is controlled by a control unit 1104. This means that, though not shown in FIG. 11, the control unit 1104 is connected to the respective units 1101 to 1103.

The function of the HeNBGW 74 currently under discussion of 3GPP is described below (see Chapter 4.6.2 of Non-Patent Document 1). The HeNBGW 74 relays an S1 application. The HeNBGW 74 terminates the S1 application that is not associated with the user equipment 71 though it is a part of the procedures toward the Home-eNB 72-2 and towards the MME unit 73. When the HeNBGW 74 is deployed, the procedure that is not associated with the user equipment 71 is communicated between the Home-eNB 72-2 and the HeNBGW 74 and between the HeNBGW 74 and the MME unit 73. The X2 interface is not set between the HeNBGW 74 and another node. The HeNBGW 74 recognizes the execution of paging optimization as an option.

Next, an example of a typical cell search method in a mobile communication system is described. FIG. 12 is a flowchart showing an outline from cell search to idle state operation performed by a user equipment (UE) in the LTE communication system. After starting the cell search, in Step ST1201, the user equipment synchronizes the slot timing and frame timing by a primary synchronization signal (P-SS) and a secondary synchronization signal (S-SS) transmitted from a nearby base station. Synchronization codes, which correspond to physical cell identities (PCIs) assigned per cell one by one, are assigned to the synchronization signals (SSs) including the P-SS and S-SS. The number of PCIs is currently studied in 504 ways, and these 504 ways are used for synchronization, and the PCIs of the synchronized cells are detected (specified).

Next, in Step ST1202, the user equipment detects a reference signal RS of the synchronized cells, which is transmitted from the base station per cell, and measures the received power. The code corresponding to the PCI one by one is used for the reference signal RS, and separation from another cell is enabled by correlation using the code. The code for RS of the cell is derived from the PCI specified in Step ST1201, which makes it possible to detect the RS and measure the RS received power.

Next, in Step ST1203, the user equipment selects the cell having the best RS reception quality (for example, cell having the highest RS received power; best cell) from one or more cells that have been detected up to Step ST1202.

In Step ST1204, next, the user equipment receives the PBCH of the best cell, and obtains the BCCH that is the broadcast information. A master information block (MIB) containing the cell configuration information is mapped on the BCCH over the PBCH. Accordingly, the MIB is obtained by obtaining the BCCH through reception of the PBCH. Examples of the MIB information include the downlink (DL) system bandwidth (also referred to as transmission bandwidth configuration (dl-bandwidth)), transmission antenna number and system frame number (SFN).

In Step ST 1205, next, the user equipment receives the DL-SCH of the cell based on the cell configuration information of the MIB, to thereby obtain a system information block (SIB) 1 of the broadcast information BCCH. The SIB1 contains the information related to the access to the cell, information related to cell selection and scheduling information of other SIB (SIBk; k is an integer equal to or larger than two). In addition, the SIB1 contains a tracking area code (TAC).

In Step ST1206, next, the user equipment compares the TAC of the SIB1 received in Step ST1205 with the TAC that has been already possessed by the user equipment. In a case where they are identical to each other as a result of comparison, the user equipment enters an idle state operation in the cell. In a case where they are different from each other as a result of comparison, the user equipment requires a core network (EPC) (including MME and the like) to change a TA through the cell for performing tracking area update (TAU). The core network updates the TA based on an identification number (such as a UE-ID) of the user equipment transmitted from the user equipment together with a TAU request signal. The core network updates the TA, and then transmits the TAU received signal to the user equipment. The user equipment rewrites (updates) the TAC (or TAC list) of the user equipment with the TAC of the cell. After that, the user equipment enters the idle state operation in the cell.

In the LTE and universal mobile telecommunication system (UMTS), the introduction of a closed subscriber group (CSG) cell is studied. As described above, access is allowed for only one or a plurality of user equipments registered with the CSG cell. The CSG cell and one or a plurality of user equipments registered therewith constitute one CSG. A specific identification number referred to as CSG-ID is added to the thus constituted CSG. Note that one CSG may contain a plurality of CSG cells. After being registered with any one of the CSG cells, the user equipment can access another CSG cell of the CSG to which the CSG cell, with which the user equipment has been registered, belongs.

Alternatively, the Home-eNB in the LTE or the Home-NB in the UMTS is used as the CSG cell in some cases. The user equipment registered with the CSG cell has a whitelist. Specifically, the whitelist is stored in the subscriber identity module (SIM)/USIM. The CSG information of the CSG cell with which the user equipment has been registered is stored in the whitelist. Specific examples of the CSG information include CSG-ID, tracking area identity (TAI) and TAC. Any one of the CSG-ID and TAC is adequate as long as they are associated with each other. Alternatively, GCI is adequate as long as the CSG-ID and TAC are associated with global cell identity (GCI).

As can be seen from the above, the user equipment that does not have a whitelist (including a case where the whitelist is empty in the present invention) is not allowed to access the CSG cell but is allowed to access the non-CSG cell only. On the other hand, the user equipment which has a whitelist is allowed to access the CSG cell of the CSG-ID with which registration has been performed as well as the non-CSG cell.

3GPP discusses that all physical cell identities (PCIs) are split (referred to as PCI-split) into ones reserved for CSG cells and the others reserved for non-CSG cells (see Non-Patent Document 5). Further, 3GPP discusses that the PCI split information is broadcast in the system information from the base station to the user equipments being served thereby. Non-Patent Document 5 discloses the basic operation of a user equipment by PCI split. The user equipment that does not have the PCI split information needs to perform cell search using all PCIs (for example, using all 504 codes). On the other hand, the user equipment that has the PCI split information is capable of performing cell search using the PCI split information.

Further, 3GPP has determined that the PCIs for hybrid cells are not contained in the PCI range for CSG cells (see Chapter 10.7 of Non-Patent Document 1).

The HeNB and HNB are required to support various services. For example, an operator causes the predetermined HeNB and HNB to register user equipments therein and permits only the registered user equipments to access the cells of the HeNB and HNB, which increases radio resources available for the user equipments and enables high-speed communication. In the above-mentioned service, the operator sets a higher accounting fee compared with normal service.

In order to achieve the above-mentioned service, the closed subscriber group (CSG) cell accessible only to the registered (subscribed or member) user equipments is introduced. It is required to deploy a large number of closed subscriber group (CSG) cells in shopping malls, apartment buildings, schools, companies and the like. For example, the CSG cells are required to be deployed for each store in shopping malls, for each room in apartment buildings, for each classroom in schools, and for each section in companies in such a manner that only the users who have registered with the respective CSG cells are permitted to use those CSG cells. The HeNB/HNB is required not only to complement the communication outside the coverage of the macro cell but also to support various services as described above. This leads to a case where the HeNB/HNB is deployed within the coverage of the macro cell.

As one of the techniques to be studied in LTE-A, heterogeneous networks (HetNet) are added. 3GPP handles low-output-power network nodes in a local-area range (local area range nodes, local area nodes and local nodes), such as pico eNB (pico cell), node for hotzone cells, HeNB/HNB/CSG cell, relay node and remote radio head (RRH). Accordingly, it is required to deploy networks in which one or more of the above-mentioned local area range nodes are incorporated in a normal eNB (macro cell). The networks in which one or more of the above-mentioned local area range nodes are incorporated in a normal eNB (macro cell) are referred to as heterogeneous networks, where the interference reduction method, capacity enhancement method and the like are studied.

Currently, 3GPP discusses energy saving of an infrastructure. The following is specifically discussed. A base station or cell employed as a capacity booster monitors a traffic load, and is capable of being switched off if the state in which a traffic falls below a given threshold continues for a certain period (see Non-Patent Document 8). In a case where the load of an operating base station is high, the base station is capable of requesting a base station that has been switched off to be switched on (see Non-Patent Document 8). A base station capable of being switched off is a cell that provides basic coverage and basic capacity (see Non-Patent Document 9).

A problem to be solved in the first embodiment is described below. Non-Patent Document 8 considers the cells that provide basic coverage and basic capacity. Typically, the cells that provide basic coverage and basic capacity are regarded as wide-area eNBs (see Non-Patent Document 10). From the above, network nodes in a local area range are not taken into consideration in Non-Patent Document 8. This leads to a problem that energy consumption of network nodes in a local area range cannot be reduced in a conventional technology.

Hereinafter, a network node in a local area range is referred to as a local eNB for the sake of convenience. Conceivable examples of the wide area eNBs include a normal eNB (macro cell). The local eNB corresponds to a local base station device. The local eNB being a local base station device has relatively small output power. A wide-area eNB being a wide-area base station device, for example, normal eNB (macro cell) has relatively large output power. In other words, the output power of a local eNB is smaller than the output power of a wide-area eNB.

Non-Patent Document 8 defines that energy consumption is reduced by means of an X2 interface. On the other hand, as described above, the HeNB being one of local eNBs does not support an X2 interface (see Chapter 4.6.1 of Non-Patent Document 1). This leads to a problem that energy consumption of a HeNB cannot be reduced in the method disclosed in Non-Patent Document 8.

Figure 13:
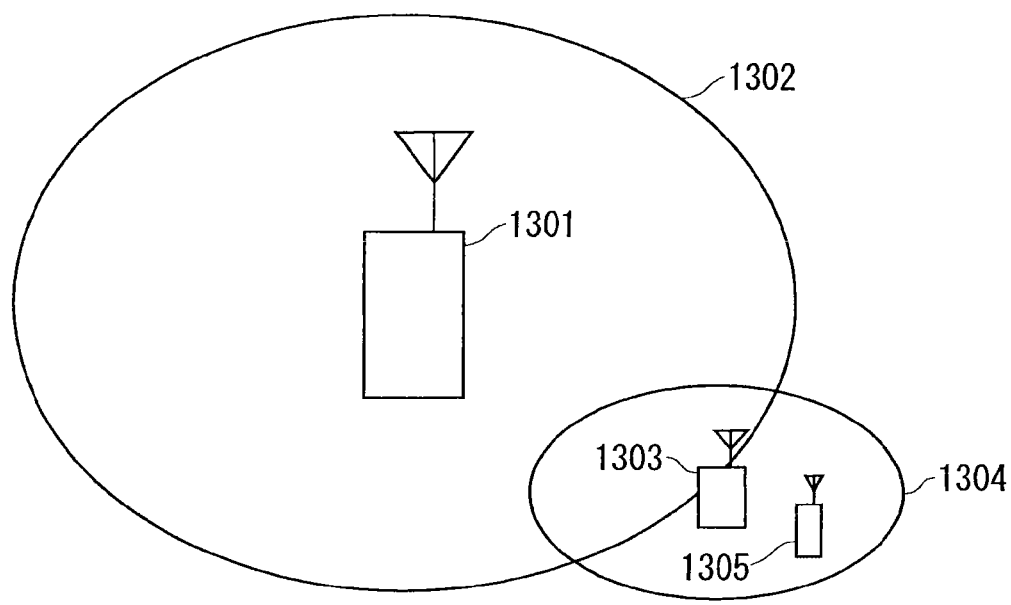
FIG. 13 is a location diagram illustrating a problem of Non-Patent Document 8.

Further, in a case where the method disclosed in Non-Patent Document 8 is applied to the situation of FIG. 13, a problem described below arises. FIG. 13 is a location diagram illustrating the problem of Non-Patent Document 8. A local eNB 1303 is deployed near the boundary of a coverage 1302 of a macro cell 1301, that is, near a cell edge. A user equipment 1305 exists within a coverage 1304 of the local eNB 1303. The user equipment 1305 exists outside the coverage 1302 of the macro cell 1301, that is, out of service of the macro cell 1301. The user equipment 1305 is in an idle state and camps on the local eNB 1303.

The user equipment 1305 being in an idle state does not affect the traffic of the local eNB 1303. Therefore, even in a case where the user equipment 1305 camps on the local eNB 1303, if a state in which a traffic of the local eNB 1303 falls below a given threshold continues for a certain period, the local eNB 1303 can be switched off. In a case where the local eNB 1303 is switched off, the user equipment 1305 is out of service thereof, leading to a problem that the user equipment 1305 cannot receive the service as a mobile communication system.

In a case where the load of an operating base station, which is the macro cell 1301 in FIG. 13, is high, the base station is capable of requesting the base station that has been switched off, which is the local eNB 1303 in FIG. 13, to be switched on. However, the user equipment 1305 is located outside the coverage of the macro cell 1301, and further, is in an idle state. Accordingly, the load of the macro cell 1301 does not become high due to the existence of the user equipment 1305. That is, the local eNB 1303 is not switched on due to the existence of the user equipment 1305. This causes a problem that the situation in which the user equipment 1305 cannot receive the service as a mobile communication system continues.

A solution in the first embodiment is described below. In the present embodiment, the local eNB supports energy saving. Specific examples of the method of achieving support for energy saving are described below. Three specific examples of a trigger to shift from an operation in a normal state to an energy saving operation are disclosed below. The operation of reducing energy consumption is referred to as an energy saving operation, and the state of this operation is referred to as an energy saving operation state. The operation in a normal state is referred to as a normal operation, and the state of this operation is referred to as a normal operation state.

(1) A case where a user equipment being in a connected state with a local eNB does not exist for a predetermined period. Specifically, a case where a user equipment in a connected state does not exist to be served by a local eNB for a certain period, or a case where only a user equipment in an idle state exists to be served by a local eNB for a certain period.

(2) A case where an instruction to turn off the power for the transmission operation and reception operation of a local eNB is provided. Specifically, a case where the power of a local eNB is turned off, specifically, a case where a power switch is turned off. Alternatively, a case where energy saving is turned on, specifically, a case where an energy saving switch is turned on.

(3) A case where a shift to an energy saving operation is instructed by another node. An X2 interface, S1 interface or backhaul link can be used for this instruction.

As a specific example of the energy saving operation, the operation of transmitting a downlink transmission signal being a signal to be transmitted to a user equipment is stopped, and an operation of receiving an uplink transmission signal being a signal to be transmitted from a user equipment is performed. That is, the transmission operation is turned off, whereas the reception operation is turned on. This is different from switch-off disclosed in Non-Patent Document 8 in that the reception operation is turned on. Further, turning-on the reception operation in the energy saving operation enables to use a specific example of a trigger to shift from an energy saving operation to a normal operation, (1) "a case where a local eNB receives uplink transmission from a user equipment", which is described below.

As a specific example of turning off a transmission operation, the transmission of user data and control data is turned off. Specific examples of the control data include control data associated with user data (specifically, such as Ack/Nack), data used in cell search by a user equipment, broadcast information, and paging. If a user equipment in a connected state does not exist to be served, it is not required to transmit the user data and the control data associated with the user data. Meanwhile, even if a user equipment in a connected state does not exist to be served, it is required to transmit the data used for cell search by a user equipment, broadcast information, and paging. Therefore, turning off the transmission of the data used in cell search by a user equipment, broadcast information, and paging in the energy saving operation is effective for reducing energy consumption.

In LTE and LTE-A, it is required to transmit the SS and RS used in cell search by a user equipment, the PBCH and PDCCH used for transmission of broadcast information, and the PDCCH used for transmission of paging, periodically. Accordingly, turning off the transmission of the data used in cell search by a user equipment, broadcast information, and paging is effective for reducing energy consumption.

As a specific example of turning on a reception operation, uplink transmission from a user equipment, specifically, an uplink transmission signal transmitted from a user equipment is received. Two specific examples of a trigger to shift from an energy saving operation to a normal operation are disclosed below.

(1) A case where a local eNB receives uplink transmission from a user equipment.

(2) A case where a local eNB receives a predetermined signal, for example, a paging signal from a backhaul. In this case, the backhaul is not only a backhaul link for a relay node, but also a wired backhaul link for a pico cell or femto cell (HeNB).

This is different from the switching on of a local eNB during an energy saving operation in accordance with the load of an operating base station, which is disclosed in Non-Patent Document 8, in that a shift to a normal operation is performed upon reception of uplink transmission from a user equipment or reception of a paging signal from a backhaul.

Three specific examples of the uplink transmission from a user equipment are disclosed below.

(1) Resources in which uplink transmission is allowed for a user equipment are discrete in time. For this reason, a local eNB does not require continuous reception but only requires discontinuous reception for receiving the uplink transmission signal (hereinafter, also referred to as an "uplink signal") through the energy saving operation. The discontinuous reception operation in an energy saving operation is more effective for reducing energy consumption compared with the continuous reception operation.

(2) The resources in which transmission is allowed have a cycle in time. This does not require the notification of the resources in which frequent transmission to a user equipment is allowed. As a result, radio resources can be effectively used.

(3) Frequency allocation of the resources in which transmission is allowed is determined. This enables to reduce the processing loads of a user equipment and a local eNB.

In LTE and LTE-A, the PRACH can be used for uplink transmission from the user equipment.

As described above, the resources in which uplink transmission is allowed are discrete in time, which requires a reception operation only at that timing in the reception operation in an energy saving operation. That is, it is not required to continuously turn on the reception operation in an energy saving operation. This is effective for reducing energy consumption. This reception operation is also referred to as a discontinuous reception operation at times.

A specific example of the configuration used for the uplink transmission by a user equipment is disclosed below. The configuration used in the uplink transmission is made per local eNB that performs energy saving. This results in that a local eNB is only required to perform discontinuous reception using configuration parameters for uplink transmission of the own cell during energy saving. Accordingly, an energy saving operation with a high degree of freedom can be achieved in a local eNB.

Two specific examples of the method in which a user equipment acquires the configuration used for the uplink transmission by a user equipment are disclosed below.

(1) A user equipment is notified of the configuration used for the uplink transmission from a serving cell.

(2) In a case where a local eNB is a HeNB, when a user equipment is registered with the CSG to which the HeNB belongs, the user equipment is notified of the configuration used for uplink transmission of the HeNB. Specific examples of the notification method include the notification from a network together with the notification of a whitelist that is set by an owner of a HeNB and is notified from the HeNB.

The specific example (1) of the method in which a user equipment acquires the configuration used for uplink transmission is further disclosed below. R3-093387 by 3GPP (hereinafter, referred to as "Non-Patent Document 11") discloses that the RACH configuration is notified between eNBs by means of an X2 interface for a self organized network (SON). Meanwhile, an X2 interface is not supported by the HeNB that is one of local eNBs as described above (see Chapter 4.6.1 of Non-Patent Document 1). This causes a problem that the RACH configuration cannot be notified by the method disclosed in Non-Patent Document 11.

In the first embodiment, a local eNB notifies a neighboring node of the configuration parameter for uplink transmission of the own cell by means of an S1 interface. Disclosed below is a specific example of the method in which a local eNB determines a neighboring node to be notified of the configuration parameter for uplink transmission of the own cell.

A neighboring node to be notified of the configuration parameter for uplink transmission of the own cell by a local eNB is determined based on the measurement results of the surrounding radio environment of the local eNB. Specific examples of the surrounding radio environment include the measurement results of a neighboring cell. Specific examples of the measurement results of a neighboring cell include the reception quality, received power and path loss.

If the reception quality or received power of a certain node is equal to or larger than a certain threshold (or is larger than a threshold) in the measurement results of a surrounding radio environment, a local eNB selects that node as a node to be notified of the configuration parameter for uplink transmission of the own cell. Alternatively, if the path loss of a certain node is smaller (or is equal to or smaller) than a certain threshold in the measurement results of a surrounding radio environment, a local eNB selects that node as a node to be notified of the configuration parameter for uplink transmission of the own cell. One or a plurality of nodes may be notified of the configuration parameter for uplink transmission of the own cell. The selection of a node to be notified of the configuration parameter for uplink transmission of the own cell by the above-mentioned method enables to select a neighboring node. As a result, the local eNB is not required to notify an unnecessary node of the configuration parameter for uplink transmission of the own cell, which reduces the processing load thereof.

The node that has been notified of the configuration parameter for uplink transmission of a local eNB notifies a user equipment being served thereby of that information. Two specific examples of the notification method are disclosed below. (1) The information is notified in the broadcast information. (2) The information is notified by a dedicated signal.

Specific examples of notifying the information with the use of the broadcast information in LTE and LTE-A are disclosed below. The RACH configuration is used. Two specific examples in a case where the RACH configuration is used are disclosed below.

(1) The RACH configuration for a serving cell, that is, for a node that has been notified of a configuration parameter for uplink transmission of a local eNB and the RACH configuration for a local eNB are provided in the current RACH configuration.

(2) The uplink transmission configuration for shifting a local eNB during an energy saving operation to a normal operation is provided apart from the current RACH configuration.

Two specific examples of the configuration parameter for uplink transmission are disclosed below.

(1) Resources in which uplink transmission is allowed. Specific examples of the resources are a time resource and a frequency resource, and time resources, which are the RACH configuration in LTE and LTE-A. Further, specific examples thereof include "RACH-ConfigCommon" and "PRACH-config" (see TS36.331 V9.0.0 by 3GPP (hereinafter, referred to as "Non-Patent Document 12")).

(2) Uplink frequency information. Uplink frequency information available between a local eNB and a user equipment being served thereby. Specific examples of the uplink frequency information include a carrier frequency, a frequency band, and a component carrier. In LTE and LTE-A, they are "freqInfo", "ul-CarrierFreq", and "ul-Bandwidth" (see Non-Patent Document 12).

The component carrier is described below. It is considered in the LTE-A system that frequency bandwidths larger than the frequency bandwidths (transmission bandwidths) of the LTE system are supported (see Chapter 5 of TR36.814 V1.5.0 by 3GPP (hereinafter, referred to as "Non-Patent Document 13"). Therefore, a user equipment supporting LTE-A is considered to simultaneously perform reception on one or a plurality of component carriers (CCs). A user equipment supporting LTE-A is considered to have the capability for carrier aggregation to simultaneously perform reception and transmission on a plurality of component carriers, only perform reception on those, or only transmission on those.

Typically, a user equipment receives downlink transmission of a base station, specifically, a downlink transmission signal transmitted from a base station to synchronize with the frequency of a base station based on the received downlink transmission. This function is referred to as automatic frequency control (AFC). In a case where a user equipment performs uplink transmission to a local eNB during an energy saving operation for shifting the local eNB to a normal operation, a problem described below arises. In the first embodiment, a transmission operation is turned off as the energy saving operation of a local eNB. Accordingly, in a case where a user equipment performs AFC, there is no downlink transmission of a base station, based on which a user equipment performs AFC. This raises the issue about how to execute AFC by a user equipment.

Three specific solutions in the first embodiment are disclosed below.

(1) A user equipment receives downlink transmission (downlink) of a serving cell and executes AFC at the frequency of the downlink transmission. The user equipment sets the frequency of the uplink of the user equipment to the uplink frequency information available between a local eNB and a user equipment being served thereby. The user equipment performs uplink transmission to a local eNB during an energy saving operation with the use of the uplink frequency for shifting the local eNB to a normal operation. This enables a user equipment to execute AFC on a local eNB during an energy saving operation.

(2) A local eNB during an energy saving operation receives downlink transmission (downlink) of a serving cell and executes AFC at the frequency of the downlink transmission. A local eNB sets the frequency of the local eNB for receiving uplink from a user equipment to the uplink frequency available between a local eNB and a user equipment being served thereby. A local eNB receives uplink transmission from a user equipment using this frequency. A local eNB may perform the AFC operation before receiving uplink transmission from a user equipment. Specific examples of the uplink transmission from a user equipment include uplink transmission for shifting a local eNB during an energy saving operation to a normal operation.

(3) (1) and (2) described above are used in combination. In this case, the frequency of a user equipment and the frequency of a local eNB coincide with each other with higher accuracy than the case where (1) or (2) is used singly. This enables to achieve an effect that the communication quality of uplink from a user equipment to a local eNB is improved.

Next, four specific examples of the situation in which a user equipment performs uplink transmission (hereinafter, also referred to as uplink transmission for wakeup) for shifting a local eNB during an energy saving operation to a normal operation are disclosed below.

(1) A case where the reception quality of a serving cell deteriorates or a case where a cell that can serve as a serving cell does not exist. For example, in a case where a local eNB during an energy saving operation exists at the cell edge of a serving cell, the local eNB shifts to a normal operation upon wakeup uplink transmission from a user equipment. Upon this, handover is performed from a serving cell to the local eNB or cell reselection to the local eNB is performed, so that the user equipment is capable of continuously receiving the service of a mobile communication system.

(2) A case where conditions of RACH transmission in a conventional technology are satisfied. As a specific example, a case where TAU transmission or a service request from a user equipment is made (also referred to as a call at times).

(3) Periodically.

(4) A case where a user makes an operation.

A specific example of the judging method in the (1) case where the reception quality of a serving cell deteriorates is disclosed below. Based on the measurement results of a user equipment, in a case where the reception quality (such as received power or SIR) of a serving cell falls below (or may be equal to or smaller than or be smaller than) a threshold (hereinafter, also referred to as a wakeup uplink transmission threshold at times), it is judged that wakeup uplink transmission is performed. Alternatively, based on the measurement results of a user equipment, in a case where the reception quality (such as path loss) of a serving cell exceeds (may be equal to or larger than or be larger than) a threshold (hereinafter, also referred to as a wakeup uplink transmission threshold at times), it is judged that wakeup uplink transmission is performed.

Two specific examples of the method of notifying a user equipment of the wakeup uplink transmission threshold are disclosed below.

(1) A serving cell notifies a user equipment being served thereby of the wakeup uplink transmission threshold. The broadcast information is conceivable as an example of the notification method. This is effective because a user equipment being served by a serving cell can be notified irrespective of a state. In addition, a threshold can be changed easily, which enables to build a flexible mobile communication system. In LTE and LTE-A, the wakeup uplink transmission threshold can be used in combination with a neighboring cell measurement start threshold (Sintrasearch) (see Chapter 5.2.4.2 of Non-Patent Document 3). As a result, parameters can be reduced, and radio resources can be effectively used.

(2) The wakeup uplink transmission threshold is determined in a static manner. This does not require a notification to a user equipment using radio resources, so that radio resources can be effectively used.

Disclosed below are two specific examples of the situation in which, particularly when a local eNB is a HeNB, a user equipment performs uplink transmission (wakeup uplink transmission) for shifting a local eNB during an energy saving operation to a normal operation.

Non-Patent Document 1 discloses that the method of cell selection/reselection to CSG cells is based on an autonomous search function. Non-Patent Document 3 discloses that a user equipment uses an autonomous search function for searching for a CSG cell being a "suitable cell" at a frequency different from a serving frequency. Further, Non-Patent Document 1 discloses that a user equipment supports manual selection of CSG cells. It is disclosed that if the CSG whitelist configured in a user equipment is empty, the autonomous search function of CSG cells by a user equipment is disabled.

(1) In manual selection of a CSG cell. As a specific example, wakeup uplink transmission is performed before the measurement for selection. Accordingly, even in a case where a HeNB performing an energy saving operation exists in the neighborhood of a user equipment, the HeNB is caused to shift to a normal operation. Therefore, it is possible to perform CSG cell selection where the HeNB is included as a target.

(2) While an autonomous search function is in operation, wakeup uplink transmission is performed periodically. Accordingly, even in a case where a HeNB performing an energy saving operation exists in the neighborhood of a user equipment, the HeNB is caused to shift to a normal operation. Therefore, it is possible to perform CSG cell selection where the HeNB is included as a target. Even in a case where the configuration is made as described above, an autonomous search function becomes inoperative in a case where the CSG whitelist configured in the user equipment is empty. Upon this, uplink transmission for releasing an energy saving operation of a HeNB is stopped. Accordingly, an effect that unnecessary uplink transmission is eliminated can be achieved. The CSG whitelist is also referred to as an allowed CSG list (allowed CSG ID list) in some cases.

As described above, conceivable examples of local eNBs include pico eNB (pico cell), node for hotzone cells, HeNB/HNB/CSG cell, relay node, and remote radio head (RRH). A trigger to shift from an energy saving operation to a normal operation may vary from type to type of a local eNB. Alternatively, wakeup uplink transmission may vary from type to type of a local eNB. Still alternatively, a situation in which a user equipment performs uplink transmission (wakeup uplink transmission) for shifting a local eNB during an energy saving operation to a normal operation may vary from type to type of a local eNB.

As a specific example, as to a relay node, the situation in which wakeup uplink transmission is performed may be a case where the reception quality of a serving cell deteriorates. As to a HeNB, the situation in which uplink transmission for wakeup is performed may be such that uplink transmission for wakeup is performed periodically while an autonomous search function is in operation. This enables to perform an optimum energy saving operation per type of a local eNB.

While the first embodiment above has described the case where a serving cell is a macro cell, the present invention can be performed as in the first embodiment if a serving cell is a local eNB, so that similar effects to those of the first embodiment can be achieved.

While the first embodiment has described the case where the node that performs an energy saving operation is a local eNB, the present invention can be performed as in the first embodiment if the node that performs an energy saving operation is a wide-area eNB, where similar effects to those of the first embodiment can be achieved.

The first embodiment can be used in combination with a conventional technology of reducing energy consumption disclosed in, for example, Non-Patent Document 8.

Figure 14:
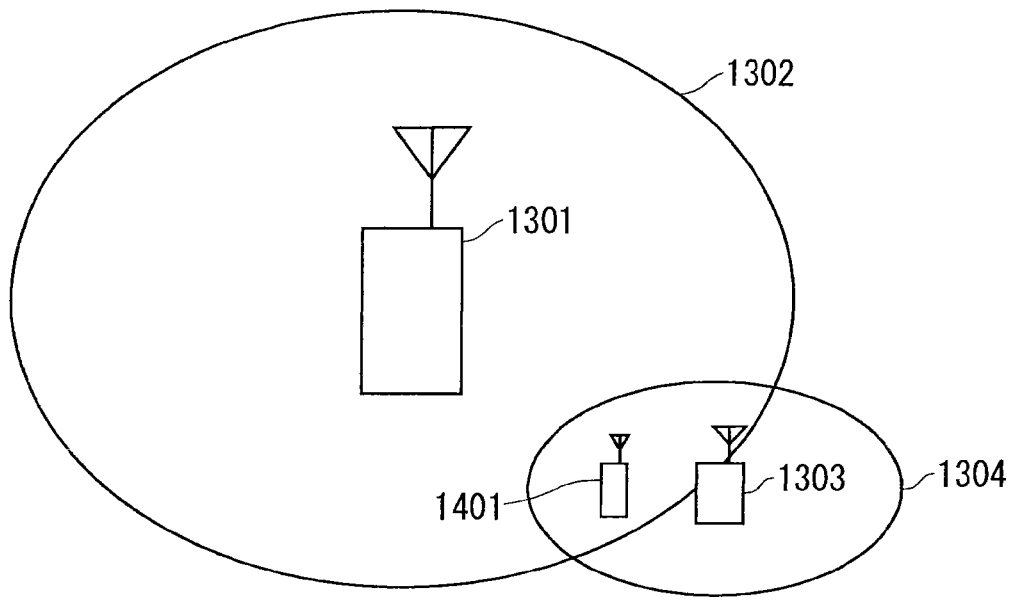
FIG. 14 is a location diagram illustrating a solution of a first embodiment.

A specific operation example in which the first embodiment is used is described with reference to FIG. 14 and FIG. 15. FIG. 14 is a location diagram illustrating a solution of the first embodiment. The portions of FIG. 14 corresponding to those of FIG. 13 are denoted by the same reference numerals, which are not described. A user equipment 1401 exists within the coverage 1302 of the macro cell 1301, that is, exists within the service area of the macro cell 1301.

Next, description is given of a sequence example of a mobile communication system in which the solution of the first embodiment is used with reference to FIG. 15. FIG. 15 illustrates a sequence example of a mobile communication system in a case where the solution of the first embodiment is used. In this operation example, a case where a serving cell is the macro cell 1301 is described.

In Step ST1501, the local eNB 1303 determines a neighboring node to be notified of the configuration parameter for uplink transmission. A specific example of the determining method is as described above. In this operation example, the macro cell 1301 is selected as one of the neighboring nodes to be notified of the configuration parameter for uplink transmission.

In Step ST1502, the local eNB 1303 notifies the macro cell 1301 of the configuration parameter for uplink transmission of the own cell, that is, the local eNB 1303. A specific example of the configuration parameter for uplink transmission is as described above. While a specific example of the uplink transmission is as described above, the PRACH is used as a specific example of the uplink transmission in this operation example. Therefore, the RACH configuration of the local eNB 1303 is used as a specific example of the configuration parameter for uplink transmission. Alternatively, the uplink frequency information available between a local eNB and a user equipment being served thereby may be notified as the configuration parameter for uplink transmission.

In Step ST1503, the local eNB 1303 judges the presence or absence of a trigger to shift from a normal operation to an energy saving operation. A specific example of the shift trigger is as described above. In a case of judging that there is a trigger to shift to an energy saving operation, the local eNB 1303 moves to Step ST1504. In a case of judging that there is no trigger to shift to an energy saving operation, the local eNB 1303 repeats the judgment of Step ST1503.

In Step ST1504, the local eNB 1303 shifts to an energy saving operation. As a specific example of the energy saving operation, the transmission operation is turned off and the reception operation is turned on as described above.

In Step ST1505, the local eNB 1303 starts discontinuous reception. As a specific example, the local eNB 1303 starts discontinuous reception for receiving uplink transmission with the RACH configuration of the local eNB 1303.

The same effect can be obtained if the process of Step ST1502 is performed after the process of Step ST1503, after the process of Step ST1504, or after the process of Step ST1505.

In Step ST1506, the macro cell 1301 being a serving cell notifies user equipments being served thereby of the RACH configuration of the own cell, that is, the macro cell 1301. The user equipments (UEs) being served by the macro cell 1301 include the user equipment 1401.

In Step ST1507, the macro cell 1301 notifies user equipments being served thereby of the RACH configuration of the local eNB 1303 received in Step ST1502. Alternatively, the macro cell 1301 may notify the uplink frequency information available between a local eNB and user equipments being served thereby. The information indicating whether or not the local eNB is in an energy saving operation may be included. The user equipments being served by the macro cell 1301 include the user equipment 1401.

In Step ST1508, the user equipment 1401 judges whether or not to perform uplink transmission for wakeup. A specific example of the situation in which uplink transmission for wakeup is performed is as described above. In this operation example, the situation in which uplink transmission for wakeup is performed is the case where the reception quality of a serving cell deteriorates. As a specific example, the user equipment 1401 judges whether or not the reception quality of the macro cell 1301 being a serving cell (hereinafter, also referred to as "serving cell 1301") falls below the wakeup uplink transmission threshold. In a case where the reception quality of the serving cell 1301 falls below the wakeup uplink transmission threshold, the user equipment 1401 moves to Step ST1509. In a case where the reception quality of the serving cell 1301 does not fall below the wakeup uplink transmission threshold, the user equipment 1401 repeats the judgment of Step ST1508.

In Step ST1509, the user equipment 1401 performs RACH transmission as uplink transmission for wakeup. The user equipment may be allowed to perform uplink transmission to a local eNB that cannot be detected in the measurements of neighboring cells by the user equipment 1401. In the RACH transmission, the user equipment 1401 transmits the RACH with the use of the RACH configuration of the local eNB 1303 that has been received in Step ST1507. Alternatively, the user equipment 1401 may transmit the RACH with the use of the uplink frequency available between a local eNB and user equipments being served thereby that has been received in Step ST1507. Still alternatively, as described above, the user equipment 1401 may perform AFC on a local eNB with the use of downlink transmission of the macro cell 1301 and transmit the RACH.

In Step ST1510, the local eNB 1303 judges the presence or absence of a trigger to shift from an energy saving operation to a normal operation. A specific example of the shift trigger is as described above. In this operation example, a specific example of the shift trigger is the case where the local eNB 1303 receives uplink transmission from the user equipment 1401. The local eNB 1303 judges whether or not it has received the RACH as uplink transmission for wakeup. The local eNB 1303 moves to Step ST1511 in a case of judging that it has received the RACH. The local eNB 1303 repeats the judgment of Step ST1510 in a case of judging that it has not received the RACH.

In Step ST1511, the local eNB 1303 shifts to a normal operation.

The first embodiment described above achieves an effect described below. According to the first embodiment, it is possible to perform an energy saving operation in a local eNB, which reduces energy consumption of an infrastructure in a mobile communication system.

In a conventional technology of Non-Patent Document 8, a reduction in energy consumption of an infrastructure using an X2 interface is defined. The first embodiment discloses the method of reducing energy consumption of an infrastructure in which an X2 interface is not used. This enables to reduce energy consumption also in a HeNB that does not support an X2 interface. It is required to deploy a large number of HeNBs as described above, and thus, a reduction in energy consumption of a HeNB is conducive to a reduction in energy consumption of the entire mobile communication system.

In the first embodiment, a local eNB during an energy saving operation can be shifted to a normal operation without using the load of a network disclosed in a conventional technology of Non-Patent Document 8. That is, a local eNB during an energy saving operation can be shifted to a normal operation irrespective of a position (location) of a user equipment, or irrespective of a state of a user equipment.

Accordingly, also in a location as shown in FIG. 13 that causes a problem in a case where a conventional technology of Non-Patent Document 8 is used, it is possible to turn on the local eNB 1303, that is, to shift the local eNB 1303 to a normal operation. This solves a problem that the user equipment 1305 cannot receive the service as a mobile communication system.

The present embodiment has disclosed that a transmission operation is turned off and the reception operation is turned on as the energy saving operation. This only requires to collectively turn off power supply of a transmission unit of a local eNB but turn on the power supply of only a reception unit during an energy saving operation. Therefore, it becomes easier to design hardware for performing an energy saving operation.

First Modification of First Embodiment

A problem to be solved in a first modification of the first embodiment is described. Even in a case where the solution of the first embodiment is executed, two problems described below arise if a large number of local eNBs exist in the neighborhood of a macro cell.

(1) The configuration parameters for uplink transmission of local eNBs, which are notified from the local eNB to the macro cell, increase. That is, the types of the configuration parameters for uplink transmission of local eNBs, which are notified from the macro cell to user equipments being served thereby, increase. This increases the amount of information of the configuration parameters for uplink transmission of the local eNB, which are notified from the macro cell to user equipments being served thereby. Accordingly, a problem that a large amount of radio resources needs to be used arises.

(2) The types of the configuration parameters for uplink transmission for uplink transmission for wakeup, which is performed by a user equipment, increase. Therefore, a user equipment needs to perform uplink configuration for an amount of the types and perform uplink transmission for the amount of the types. This increases the processing load of a user equipment, causing a problem that the energy consumption of a user equipment increases.

The problem of the first modification of the first embodiment is described again with reference to FIG. 15 and FIG. 16. FIG. 16 is a location diagram illustrating the problem of the first modification of the first embodiment. The portions of FIG. 16 corresponding to those of FIG. 13 and FIG. 14 are denoted by the same reference numerals, which are not described. A plurality of local eNBs, specifically, a local eNB 1601, a local eNB 1603, a local eNB 1605, and a local eNB 1607 are deployed near the boundary of the coverage 1302 of the macro cell 1301, that is, near the cell edge. The local eNB 1601 has a coverage 1602. The local eNB 1603 has a coverage 1604. The local eNB 1605 has a coverage 1606. The local eNB 1607 has a coverage 1608.

A sequence example of a mobile communication system in a case where the first embodiment is executed with the location as shown in FIG. 16 is described with reference to FIG. 15. In Step ST1501, not only the local eNB 1303 but also the local eNB 1601, the local eNB 1603, the local eNB 1605 and the local eNB 1607 select the macro cell 1301 as a neighboring node to be notified of the configuration parameter for uplink transmission.

In Step ST1502, the local eNB 1303 notifies the macro cell 1301 of the configuration parameter for uplink transmission of the local eNB 1303. In Step ST1502, the local eNB 1601 notifies the macro cell 1301 of the configuration parameter for uplink transmission of the local eNB 1601. In Step ST1502, the local eNB 1603 notifies the macro cell 1301 of the configuration parameter for uplink transmission of the local eNB 1603. In Step ST1502, the local eNB 1605 notifies the macro cell 1301 of the configuration parameter for uplink transmission of the local eNB 1605. In Step ST1502, the local eNB 1607 notifies the macro cell 1301 of the configuration parameter for uplink transmission of the local eNB 1607.

In Step ST1507, the macro cell 1301 notifies user equipments (including the user equipment 1401) being served thereby of the RACH configurations of the local eNB 1303, local eNB 1601, local eNB 1603, local eNB 1605, and local eNB 1607 that have been received in Step ST1502. In this manner, the amount of information of the configuration parameters for uplink transmission of local eNBs increases, causing a problem that a large amount of radio resources needs to be used.

In Step ST1508, the user equipment 1401 judges whether or not to perform uplink transmission for wakeup and, in a case of judging to perform uplink transmission for wakeup, performs uplink transmission for wakeup in Step ST1509. The RACH configurations of the local eNB 1303, local eNB 1601, local eNB 1603, local eNB 1605, and local eNB 1607 that have been received in Step ST1507 are used as the configuration parameters for the uplink transmission for wakeup.

In this case, the user equipment 1401 is located within the coverage 1304 of the local eNB 1303 but is not located within the coverage 1602 of the local eNB 1601, the coverage 1604 of the local eNB 1603, the coverage 1606 of the local eNB 1605, and the coverage 1608 of the local eNB 1607. Therefore, it suffices that uplink transmission for wakeup is performed in the location of the user equipment 1401 only with the use of the RACH configuration of the local eNB 1303. This is because the user equipment 1401 cannot receive the service of a mobile communication system from the local eNB 1603 even if the local eNB 1603 shifts from an energy saving operation to a normal operation.

However, the transmission operation is turned off as the energy saving operation of the local eNB, and accordingly, the user equipment 1401 cannot judge of which local eNB that the own user equipment is located within the coverage. This requires the user equipment 1401 to perform uplink transmission for wakeup in Step ST1509 with the use of the RACH configurations of the local eNB 1303, local eNB 1601, local eNB 1603, local eNB 1605, and local eNB 1607 that have been received in Step ST1507. As a result, it is required to perform uplink configuration for an amount of the types (five types in the case of FIG. 16) and perform uplink transmission as many times as the types (five times in the case of FIG. 16). This increases the processing load of the user equipment 1401, causing a problem that energy consumption of the user equipment 1401 increases.

The solution in the first modification of the first embodiment is described below. A part different from the solution of the first embodiment is mainly described. A part that is not described is similar to the first embodiment.

In the present modification, the configuration used for uplink transmission when a user equipment performs uplink transmission for wakeup is used together with the configuration used for uplink transmission of a serving cell. A local eNB performs an energy saving operation based on the configuration used for uplink transmission of a serving cell. A local eNB may perform discontinuous reception during an energy saving operation so as to receive the resources in which transmission is allowed in the configuration used for uplink transmission of the serving cell.

As a result, a serving cell is not required to notify user equipments being served thereby of the configuration parameter for uplink transmission of a local eNB. This enables to effectively use radio resources. In addition, this reduces the processing load of a serving cell. Further, it is possible to reduce the types of configuration parameters for uplink transmission for uplink transmission for wakeup performed by a user equipment. This reduces the processing load of a user equipment and reduces energy consumption of a user equipment.

(A1) and (A2) below are disclosed as two specific examples of the method in which a local eNB acquires the configuration used for uplink transmission (configuration parameter for uplink transmission) of the serving cell.

(A1) Non-Patent Document 11 discloses that the RACH configuration is notified by means of an X2 interface between eNBs for a self organized network (SON). Meanwhile, an X2 interface is not supported in a HeNB that is one of local eNBs as described above (see Chapter 4.6.1 of Non-Patent Document 1). Therefore, a problem that a HeNB cannot be notified of the RACH configuration arises in the method disclosed in Non-Patent Document 11. In the first modification of the first embodiment, a serving cell notifies a neighboring node of the configuration parameter for uplink transmission of the own cell by means of an S1 interface.

(A2) A local eNB measures a surrounding radio environment in initialization, turning-on of power or turning-off of transmission at times. Specific examples of the surrounding radio environment include the measurement results of neighboring cells. In measuring neighboring cells, a local eNB receives the broadcast information, decodes the broadcast information, acquires the configuration used for uplink transmission (configuration parameter for uplink transmission) of a neighboring cell included in the broadcast information, and stores the configuration used for uplink transmission of the neighboring cell. The measurement, reception of the broadcast information, and storage of the configuration used for uplink transmission of a neighboring cell may be performed by a local eNB having the capability to perform an energy saving operation, not by all local eNBs.

(B1) and (B2) below are disclosed as specific examples of the method in which a serving cell determines a neighboring node to be notified of the configuration parameter for uplink transmission of the own cell in a case of using the specific example of the method (A1) in which the local eNB acquires the configuration used for uplink transmission (configuration parameter for uplink transmission) of the serving cell. One or a plurality of nodes may be notified of the configuration parameter for uplink transmission of the own cell. The selection of a node to be notified of the configuration parameter for uplink transmission of the own cell by the above-mentioned method enables to select a neighboring node. This eliminates the need to notify even an unnecessary node of the configuration parameter for uplink transmission of the own cell, whereby the processing load of a serving cell is reduced.

(B1) A neighboring node to be notified of the configuration parameter for uplink transmission of a serving cell is determined based on the measurement results of a surrounding radio environment of the own cell. Specific examples of the surrounding radio environment include the measurement results of a neighboring cell. Specific examples of the measurement results of a neighboring cell include the reception quality, received power and path loss. If the reception quality or received power of a certain node is equal to or larger than a certain threshold (or is larger than a threshold) in the measurement results of a surrounding radio environment, a serving cell selects that node as a node to be notified of the configuration parameter for uplink transmission of the own cell. Alternatively, if the path loss of a certain node is smaller (or is equal to or smaller) than a certain threshold in the measurement results of a surrounding radio environment, a serving cell selects that node as a node to be notified of the configuration parameter for uplink transmission of the own cell.

(B2) A neighboring node to be notified of the configuration parameter for uplink transmission of a serving cell is determined based on the measurement results of a user equipment being served by the own cell. As a specific example, if the reception quality or received power of a certain node is equal to or larger than a certain threshold (or is larger than a threshold), a serving cell selects that node as a node to be notified of the configuration parameter for uplink transmission of the own cell. Alternatively, if the path loss of a certain node is smaller (or is equal to or smaller) than a certain threshold in the measurement results of a surrounding radio environment, a serving cell selects that node as a node to be notified of the configuration parameter for uplink transmission of the own cell.

(C) described below is disclosed as a specific example of the method in which a local eNB determines a neighboring cell for which the local eNB receives the broadcast information, decodes the broadcast information, and stores the configuration used for uplink transmission (configuration parameter for uplink transmission) in a case of using the specific example of the method (A2) in which the local eNB acquires the configuration used for uplink transmission (configuration parameter for uplink transmission).

(C) A neighboring cell is determined based on the measurement results of a surrounding radio environment of the local eNB. Specific examples of the surrounding radio environment include the measurement results of neighboring cells. Specific examples of the measurement results of a neighboring cell include the reception quality, received power and path loss.

If a node has the reception quality or received power equal to or larger than a certain threshold (or larger than a threshold) in the measurement results of a surrounding radio environment, a local eNB selects that cell as a neighboring cell for which the local eNB receives the broadcast information, decodes the broadcast information, and stores the configuration used for uplink transmission (configuration parameter for uplink transmission). Meanwhile, if a node has the path loss smaller than (or equal to or smaller than) a certain threshold in the measurement results of a surrounding radio environment, the local eNB selects that cell as a neighboring cell for which the local eNB receives the broadcast information, decodes the broadcast information, and stores the configuration used for uplink transmission (configuration parameter for uplink transmission).

It may be one or a plurality of neighboring cells for which the local eNB receives the broadcast information, decodes the broadcast information, and stores the configuration used for uplink transmission. The selection of a neighboring cell for which the local eNB receives the broadcast information, decodes the broadcast information, and stores the configuration used for uplink transmission by the above-mentioned method enables to select a neighboring cell. This eliminates the need to unnecessarily receive the broadcast information of a neighboring cell, decode the broadcast information thereof, and store the configuration used for uplink transmission thereof, whereby the processing load of a local eNB is reduced.

Two specific examples of the configuration parameter for uplink transmission are disclosed below.

(1) Resources in which uplink transmission is allowed. Specific examples of the resources are a time resource and a frequency resource, or time resources, which are the RACH configurations in LTE and LTE-A. Further, specific examples thereof include "RACH-ConfigCommon" and "PRACH-config" (see Non-Patent Document 12).

(2) Uplink frequency information. Uplink frequency information available between a serving cell and a user equipment being served thereby. Specific examples of the uplink frequency information include a carrier frequency, a frequency band, and a component carrier. In LTE and LTE-A, they are "freqInfo", "ul-CarrierFreq" and "ul-Bandwidth" (see Non-Patent Document 12).

Three specific examples of the method of performing AFC in the first modification of the first embodiment are disclosed below.

(1) A user equipment receives downlink transmission (downlink) of a serving cell and executes AFC at the frequency of the downlink transmission. The user equipment sets the frequency of the uplink of the user equipment to the uplink frequency information available between a serving cell and a user equipment being served thereby. In order to shift a local eNB during an energy saving operation to a normal operation, the user equipment performs uplink transmission to the local eNB with the use of the frequency of the uplink. This enables a user equipment to perform AFC.

(2) A local eNB during an energy saving operation receives downlink transmission (downlink) of a serving cell and executes AFC at the frequency of the downlink transmission. The local eNB sets the frequency of the local eNB for receiving uplink from a user equipment to the uplink frequency information available between a serving cell and a user equipment being served thereby. The local eNB receives uplink transmission from a user equipment using the frequency. The local eNB may perform the AFC operation before receiving uplink transmission from a user equipment. Specific examples of the uplink transmission from a user equipment include uplink transmission for shifting a local eNB during an energy saving operation to a normal operation.

(3) (1) and (2) described above are used in combination. In this case, the frequency of a user equipment and the frequency of a local eNB coincide with each other with higher accuracy than the case where (1) or (2) is used singly. This enables to achieve an effect that the communication quality of uplink from user equipment to a local eNB is improved.

Next, four specific examples of a situation in which a user equipment performs uplink transmission for wakeup are disclosed below.

(1) A case where the reception quality of a serving cell deteriorates or a case where a cell that can serve as a serving cell does not exist. For example, in a case where a local eNB during an energy saving operation exists at the cell edge of a serving cell, the local eNB shifts to a normal operation upon wakeup uplink transmission from a user equipment. Upon this, handover is performed from a serving cell to the local eNB or cell reselection is performed to the local eNB, so that the user equipment is capable of continuously receiving the service of a mobile communication system.

(2) A case where conditions of RACH transmission in a conventional technology are satisfied. As a specific example, a case where TAU transmission or a service request from a user equipment is made (also referred to as a call at times). The local eNB receives normal uplink transmission from a user equipment being served by a serving cell to the serving cell. The local eNB that has received the uplink transmission judges that a user equipment exists near the own cell, and then shifts from the energy saving operation to the normal operation. Specific examples of the uplink transmission include the PRACH. As a specific example of the judgment, if the reception quality or received power in uplink transmission from a user equipment is equal to or larger than a certain threshold (or is larger than a threshold), a local eNB judges that a user equipment exists near the own cell. Meanwhile, if the path loss in uplink transmission from a user equipment is equal to or smaller than a certain threshold (or is smaller than a threshold), a local eNB judges that a user equipment exists near the own cell.

(3) Periodically.

(4) A case where a user makes an operation.

A specific operation example in which the first modification of the first embodiment is used is described with reference to FIG. 16 and FIG. 17. FIG. 16 being a location diagram illustrating the solution of the first modification of the first embodiment is as described above, which is not described. FIG. 17 illustrates a sequence example of a mobile communication system in a case where the solution of the first modification of the first embodiment is used. The portions of FIG. 17 corresponding to those of FIG. 15 are denoted by the same step numbers, and the processes thereof are not described in detail.

This operation example discloses a case of using the specific example of the method (2) in which a local eNB acquires the configuration used for uplink transmission (configuration parameter for uplink transmission) of a serving cell. While the description is given of the local eNB 1303 as an example of the local eNB, a similar operation is performed for the local eNB 1601, local eNB 1603, local eNB 1605, and local eNB 1607.

In Step ST1701, the local eNB 1303 measures neighboring cells. In Step ST1702, the local eNB 1303 determines a neighboring cell of which configuration parameter for uplink transmission the local eNB 1303 stores. A specific example of the determination method is as follows. In the location shown in FIG. 16, the local eNB 1303 selects the macro cell 1301 as a neighboring cell of which configuration parameter for uplink transmission the local eNB 1303 stores.

In Step ST1703, the local eNB 1303 stores the configuration parameter for uplink transmission of a neighboring cell that has been determined in Step ST1702. In the location shown in FIG. 16, the local eNB 1303 stores the configuration parameter for uplink transmission of the macro cell 1301. Then, the local eNB 1303 performs the processes of Step ST1503 and Step ST1504.

In Step ST1704, the local eNB 1303 starts discontinuous reception. As a specific example, the local eNB 1303 starts discontinuous reception for receiving uplink transmission with the configuration parameter (as a specific example, RACH configuration) for uplink transmission of the macro cell 1301 that has been stored in Step ST1703. Then, the macro cell 1301 performs the process of Step ST1506, and the user equipment 1401 performs the process of Step ST1508.

In Step ST1705, the user equipment 1401 performs RACH transmission. In the RACH transmission, the user equipment 1401 transmits the RACH with the use of the configuration parameter for uplink transmission of the macro cell 1301 that has been stored in Step ST1703. Alternatively, the user equipment 1401 may transmit the RACH with the use of the uplink frequency available between the macro cell 1301 and a user equipment being served thereby, which has been stored in Step ST1703. Next, the local eNB 1303 performs the processes of Step ST1510 and Step ST1511.

While the present modification has described the case where a serving cell is a macro cell, the present invention can be performed as in the first modification of the first embodiment if the serving cell is a local eNB, where similar effects to those of the first modification of the first embodiment can be achieved.

While the present modification has described the case where the node that performs an energy saving operation is a local eNB, the present invention can be performed as in the first modification of the first embodiment if the node that performs an energy saving operation is a wide-area eNB, where similar effects to those of the first modification of the first embodiment can be achieved.

The first modification of the first embodiment can achieve effects described below in addition to the effects of the first embodiment.

Even if a large number of local eNBs exist in the neighborhood of a macro cell, the macro cell does not need to notify user equipments being served thereby of the configuration parameters for uplink transmission of the local eNBs. This enables to effectively use radio resources. In addition, the processing load of a serving cell can be reduced.

The transmission operation is turned off as the energy saving operation of a local eNB, and accordingly, it is possible to reduce the types of the configuration parameters in uplink transmission for uplink transmission for wakeup even in a case where a user equipment cannot judge of which local eNB that the own user equipment is located within the coverage. This reduces the processing load of a user equipment and reduces energy consumption of a user equipment.

Second Modification of First Embodiment

A problem to be solved in a second modification of the first embodiment is described. Even in a case where the solutions of the first embodiment and the first modification of the first embodiment are executed, a problem described below arises if base stations, for example, macro cells are densely deployed.

It is conceivable that the configuration parameters for uplink transmission of macro cells, which are notified from macro cells to a local eNB, will increase. Alternatively, it is conceivable that neighboring cells that store the configuration parameters for uplink transmission, which are selected by the local eNBs, will increase.

The local eNB has no way to acquire that a user equipment which performs uplink transmission for wakeup uses which macro cell to perform uplink transmission for wakeup with the use of the configuration parameter for uplink transmission. Therefore, the local eNB needs to perform an energy saving operation with the use of the plurality of notified configuration parameters for uplink transmission of macro cells or with the use of the plurality of stored configuration parameters for uplink transmission of macro cells. This makes the energy saving operation of a local eNB inefficient, causing a problem that energy consumption is not reduced efficiently.

The above-mentioned problem becomes particularly noticeable in a case where among the configuration parameters for uplink transmission, time resources in which uplink transmission is allowed, or time resources in which uplink transmission is allowed have different cycles. This is because the local eNB during an energy saving operation is required to turn on the reception operation at that time of time for receiving uplink transmission for wakeup in which the plurality of configuration parameters for uplink of macro cells are used.

Figure 18:
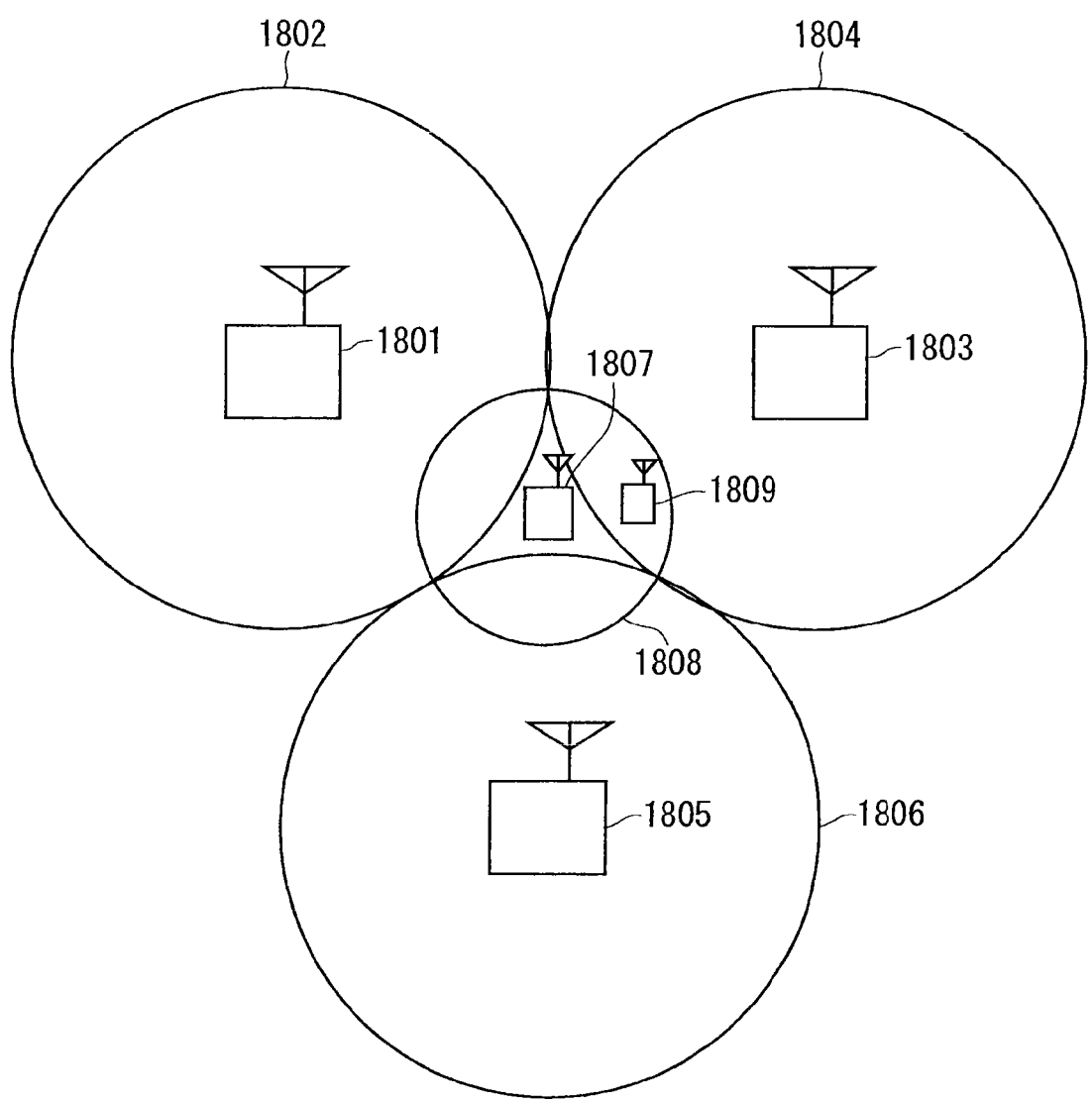
FIG. 18 is a location diagram illustrating a problem of a second modification of the first embodiment.

The problem of the second modification of the first embodiment is described again with reference to FIG. 17 and FIG. 18. FIG. 18 is a location diagram illustrating the problem of the second modification of the first embodiment. A macro cell 1801 has a coverage 1802. A macro cell 1803 has a coverage 1804. A macro cell 1805 has a coverage 1806. A local eNB 1807 has a coverage 1808. The local eNB 1807 is deployed near the cell edges of the macro cell 1801, macro cell 1803, and macro cell 1805. A user equipment 1809 exists within the coverage 1804 of the macro cell 1803.

A sequence example of a mobile communication system in a case where the first modification of the first embodiment is executed in the location as shown in FIG. 18 is described with reference to FIG. 17. In Step ST1702, not only the macro cell 1801, but also the macro cell 1803 and the macro cell 1805 are selected by the local eNB 1807 as neighboring cells of which configuration parameters for uplink transmission the local eNB 1807 stores.

In Step ST1704, the local eNB 1807 starts discontinuous reception. As a specific example, the local eNB 1807 starts discontinuous reception for receiving uplink transmission with the configuration parameters (as a specific example, RACH configurations) for uplink transmission of the macro cell 1801, macro cell 1803, and macro cell 1805 that have been stored in Step ST1703.

It is required to perform an energy saving operation with the use of a plurality of configuration parameters for uplink transmission of macro cells as described above. This makes the energy saving operation of a local eNB inefficient, causing a problem that energy consumption is not reduced efficiently. In this case, the problem becomes particularly noticeable in a case where, for example, the time resource in which uplink transmission is allowed with the configuration parameter for uplink transmission differs among the macro cell 1801, macro cell 1803, and macro cell 1805, or the cycle of the time resource in which uplink transmission is allowed differs thereamong. This is because the local eNB 1807 is required to turn on the reception operation at the different times.

The solution in the second modification of the first embodiment is described below. Parts different from the solution of the first embodiment are mainly described. Parts that are not described are similar to the first embodiment.

The configuration for uplink transmission for wakeup is provided separately. Two specific examples of the method of separately providing such a configuration are disclosed below.

(1) A specific configuration parameter is selected from the existing configuration parameters used for uplink transmission that are determined in accordance with the standards. This configuration is the configuration used for uplink transmission in a case where a user equipment performs uplink transmission for wakeup.

(2) The configuration used for uplink transmission (configuration parameter for uplink transmission) in a case where a user equipment performs uplink transmission for wakeup is newly provided. Hereinafter, this configuration is also referred to as uplink transmission for local eNB wakeup at times. Hereinafter, a signal transmitted based on the configuration of the uplink transmission for local eNB wakeup is also referred to as uplink transmission for local eNB wakeup or RACH for local eNB wakeup at times. One type or a plurality of types of the configurations in uplink transmission for local eNB wakeup may be provided. As a specific example, a new preamble sequence may be provided. As a specific example, a new physical resource on a frequency-time axis may be provided. The new physical resource on a frequency-time axis may be added to "PRACH Configuration Index".

The configuration for uplink transmission for local eNB wakeup is provided separately as described above, whereby the types of configuration parameters for uplink transmission that are used by a user equipment performing uplink transmission for wakeup do not increase even in a case where base stations, for example, macro cells are densely deployed. This eliminates the need to perform an energy saving operation with the use of a large number of configuration parameters for uplink transmission of macro cells. This enables to efficiently perform an energy saving operation, which efficiently reduces energy consumption.

Two specific examples of the method in which a user equipment acquires the configuration for uplink transmission for local eNB wakeup (configuration parameter for uplink transmission) are disclosed below.

(1) The configuration is determined in a static manner. As a specific example, the configuration is determined in accordance with the standards.

(2) Each base station notifies user equipments being served thereby of the configuration for uplink transmission for local eNB wakeup (configuration parameter for uplink transmission) currently used. The two specific examples of the notification method are as follows. (1) The configuration is notified in the broadcast information. (2) The configuration is notified by a dedicated signal.

Figure 19:
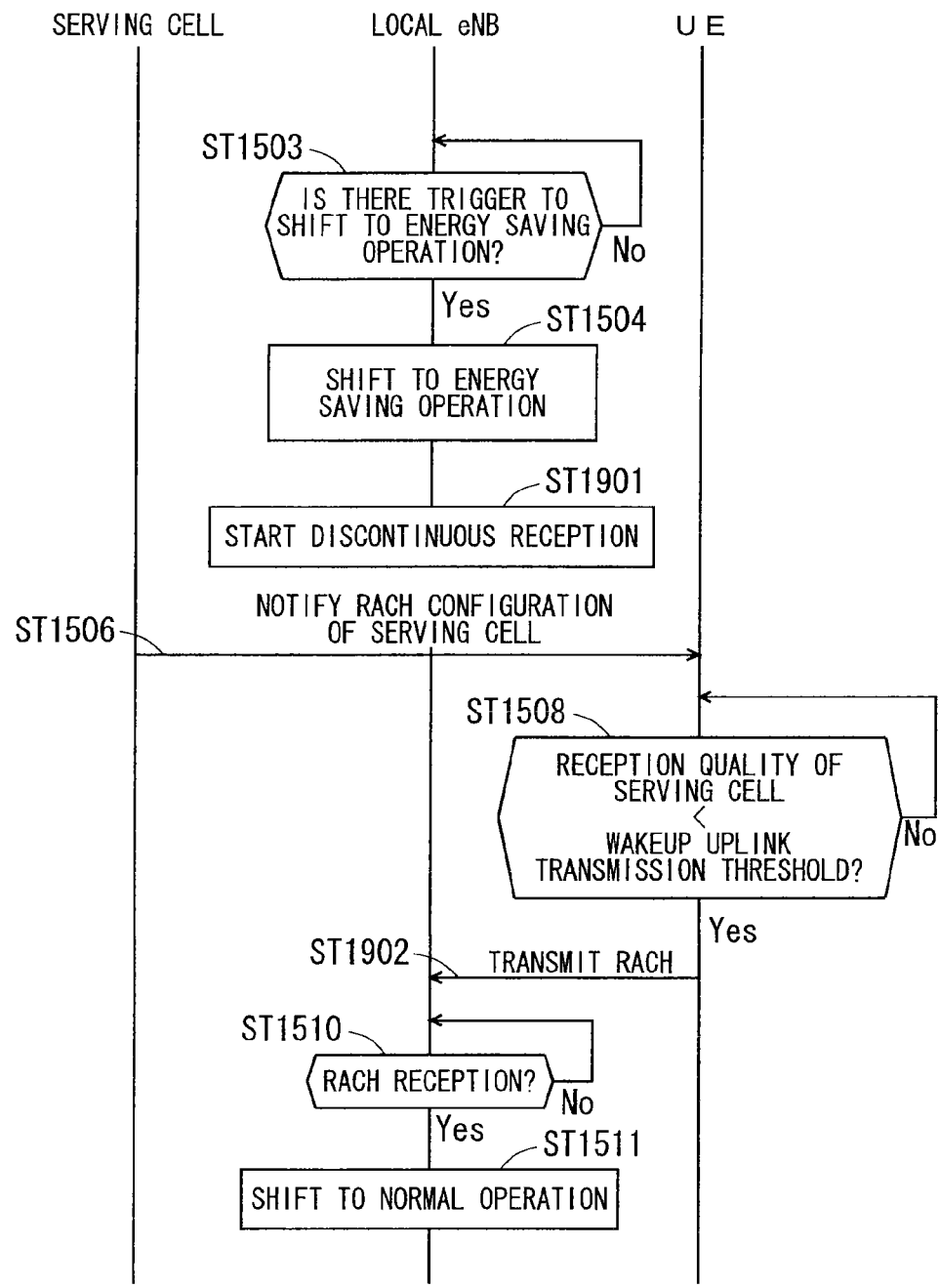
FIG. 19 is a diagram illustrating a sequence example of a mobile communication system in a case where a solution of the second modification of the first embodiment is used.

A specific operation example in which the second modification of the first embodiment is used is described with reference to FIG. 18 and FIG. 19. First, FIG. 18 being a location diagram illustrating the solution in the second modification of the first embodiment is as described above, which is not described. FIG. 19 illustrates a sequence example of a mobile communication system in a case where the solution of the second modification of the first embodiment is used. The portions of FIG. 19 corresponding to those of FIG. 15 are denoted by the same step numbers, and the processes thereof are not described in detail.

This operation example discloses the case where the above-mentioned specific example (1) of the method in which a user equipment acquires the configuration for uplink transmission for local eNB wakeup (configuration parameter for uplink transmission) is used.

The local eNB 1807 performs the processes of Step ST1503 and Step ST1504. Next, in Step ST1901, the local eNB 1807 starts discontinuous reception. As a specific example, the local eNB 1807 starts discontinuous reception for receiving uplink transmission with the configuration for uplink transmission for local eNB wakeup (configuration parameter for uplink transmission) that has been determined in a static manner. Then, the macro cell 1803 being a serving cell performs the process of Step ST1506, and the user equipment 1809 performs the process of Step ST1508.

In Step ST1902, the user equipment 1809 performs RACH transmission on the local eNB 1807. In the RACH transmission, the user equipment 1809 transmits the RACH using the configuration for uplink transmission for local eNB wakeup (configuration parameter for uplink transmission) that has been determined in a static manner. Then, the local eNB 1807 performs the processes of Step ST1510 and Step ST1511.

While the present modification has described the case where a serving cell is a macro cell, the present invention can be performed as in the second modification of the first embodiment if the serving cell is a local eNB, where similar effects to those of the second modification of the first embodiment can be achieved.

While the present modification has described the case where the node that performs an energy saving operation is a local eNB, the present invention can be performed as in the second modification of the first embodiment if the node that performs an energy saving operation is a wide-area eNB, where similar effects to those of the second modification of the first embodiment can be achieved.

The second modification of the first embodiment can achieve effects described below in addition to the effects of the first embodiment and the first modification of the first embodiment.

Even in a case where base stations, for example, macro cells are densely deployed, there is no increase in the types of configuration parameters for uplink transmission used by a user equipment that performs uplink transmission for wakeup.

Further, if a local eNB has no way to acquire a macro cell, within the coverage of which a user equipment that performs uplink transmission for wakeup is located, there is no need to perform an energy saving operation with the use of a large number of configuration parameters for uplink transmission of macro cells. This enables to efficiently perform an energy saving operation and efficiently reduce energy consumption.

Third Modification of First Embodiment

A problem to be solved in a third modification of the first embodiment is described. Even in a case where the solution of the first embodiment is executed, a problem described below arises in a case where a local eNB performing an energy saving operation does not exist in the neighborhood of a user equipment.

If the condition in which a user equipment performs uplink transmission for wakeup is satisfied, which has been disclosed in the first embodiment, the user equipment performs uplink transmission for wakeup even though a local eNB during an energy saving operation does not exist in the neighborhood thereof. Accordingly, the following two problems arise.

(1) Through the uplink transmission, a user equipment performs unnecessary uplink transmission which is performed in the case that a local eNB that shifts from an energy saving operation to a normal operation does not exist. As a result, some radio resources become unnecessary, leading to a problem that unnecessary uplink interference arises.

(2) A user equipment needs to perform unnecessary uplink transmission in which a local eNB that shifts from an energy saving operation to a normal operation does not exist. This causes a problem that the processing load of a user equipment increases and energy is consumed unnecessarily.

A solution in the third modification of the first embodiment is described below. Parts different from the solution of the first embodiment are mainly described. Parts that are not described are similar to the first embodiment.

In a case of judging that a local eNB exists in the neighborhood, a user equipment performs uplink transmission for wakeup. Alternatively, in a case of judging that a local eNB having the capability to execute an energy saving operation exists in the neighborhood, a user equipment performs uplink transmission for wakeup. Still alternatively, in a case of judging that a local eNB performing an energy saving operation, that is, a local eNB in an energy saving operation state exists in the neighborhood, a user equipment performs uplink transmission for wakeup.

As a specific example of the method in which a user equipment judges whether or not a local eNB exists in the neighborhood, there is a method in which a serving cell notifies user equipments being served thereby of the information regarding whether or not a local eNB exists in the neighborhood thereof.

Specific examples of the information regarding whether or not a local eNB exists in the neighborhood include (1) information regarding whether or not a local eNB exists, (2) information indicating that a local eNB exists, and (3) information indicating that a local eNB does not exist. The user equipment that has received any information among (1) to (3) cannot judge whether or not a local eNB is in an energy saving operation but can reduce unnecessary uplink transmission for wakeup from a user equipment that is performed in a case where a local eNB does not exist in the neighborhood.

As a specific example of the method in which a user equipment judges whether or not a local eNB having the capability to execute an energy saving operation exists in the neighborhood, there is the method in which a serving cell notifies user equipments being served thereby of the information regarding whether or not a local eNB having the capability to execute an energy saving operation exists in the neighborhood.

Specific examples of the information regarding whether or not a local eNB having the capability to execute an energy saving operation exists in the neighborhood include (1) information regarding whether or not a local eNB having the capability to execute an energy saving operation exists, (2) information indicating that a local eNB having the capability to execute an energy saving operation exists, and (3) information indicating that a local eNB having the capability to execute an energy saving operation does not exist. The user equipment that has received any information among (1) to (3) cannot judge whether or not a local eNB is in an energy saving operation but can reduce unnecessary uplink transmission for wakeup from a user equipment that is performed in a case where a local eNB having the capability to execute an energy saving operation does not exist in the neighborhood.

As a specific example of the method in which a user equipment judges whether or not a local eNB during an energy saving operation exists in the neighborhood, there is a method in which a serving cell notifies user equipments being served thereby of the information regarding whether or not a local eNB during an energy saving operation exists in the neighborhood.

Specific examples of the information regarding whether or not a local eNB during an energy saving operation exists in the neighborhood include (1) information regarding whether or not a local eNB during an energy saving operation exists, (2) information indicating that a local eNB during an energy saving operation exists, and (3) information indicating that a local eNB during an energy saving operation does not exist. The user equipment that has received any information among (1) to (3) can reduce unnecessary uplink transmission for wakeup from a user equipment that is performed in a case where a local eNB during an energy saving operation does not exist in the neighborhood.

Disclosed below are two specific examples of the method in which a serving cell notifies user equipments being served thereby of the information regarding whether or not a local eNB exists in the neighborhood, the information regarding whether or not a local eNB having the capability to execute an energy saving operation exists in the neighborhood, or the information regarding whether or not a local eNB during an energy saving operation exists in the neighborhood. (1) The information is notified in the broadcast information. (2) The information is notified by a dedicated signal.

In a case where the first embodiment is applied, "user equipment being served thereby is notified of the RACH configuration of the local eNB 1303 that has been received in Step ST1502" in Step ST1507 shown in FIG. 15, so that the user equipment can be notified of the "information regarding whether or not a local eNB during an energy saving operation exists in the neighborhood" as well. The "user equipment being served thereby is notified of the RACH configuration of the local eNB 1303 that has been received in Step ST1502" in Step ST1507, which enables to notify the information indicating that a local eNB during an energy saving operation exists as well.

Disclosed below is a specific example of the method in which a serving cell acquires whether or not a local eNB exists in the neighborhood. The local eNB notifies neighboring cells of its deployment. An S1 interface, X2 interface or backhaul link can be used for this notification. A specific example of the method in which a local eNB determines "a neighboring cell to be notified of the deployment is similar to "the method in which a local eNB determines a neighboring cell that receives the broadcast information, decodes the broadcast information, and stores the configuration used for uplink transmission (configuration parameter for uplink transmission)" of the first modification of the first embodiment, which is not described.

Disclosed below is a specific example of the method in which a serving cell acquires whether or not a local eNB having the capability to execute an energy saving operation exists in the neighborhood. In a case of being deployed, a local eNB notifies neighboring cells of the information regarding whether or not it has the capability to execute an energy saving operation.

Specific examples of the information regarding whether or not a local eNB having the capability to execute an energy saving operation include (1) information regarding whether or not a local eNB has the capability to execute an energy saving operation, (2) information indicating that a local eNB has the capability to execute an energy saving operation, and (3) information indicating that a local eNB does not have the capability to execute an energy saving operation. An S1 interface, X2 interface or backhaul link can be used for the notification of any information among (1) to (3). In a case where a local eNB is deployed, a specific example of the method in which the local eNB determines a neighboring cell to be notified of the information regarding whether or not the local eNB has the capability to execute an energy saving operation is similar to "the method in which a local eNB determines a neighboring cell that receives the broadcast information, decodes the broadcast information, and stores the configuration used for uplink transmission (configuration parameter for uplink transmission)" of the first modification of the first embodiment, which is not described.

(A) and (B) below are disclosed as two specific examples of the method in which a serving cell acquires whether or not a local eNB during an energy saving operation exists in the neighborhood.

(A) A local eNB notifies neighboring cells of the information regarding whether or not it is during an energy saving operation. Specific examples of the information regarding whether or not a local eNB is during an energy saving operation include (1) information indicating the start of an energy saving operation, (2) information indicating that an energy saving operation has ended, (3) information indicating whether or not a local eNB is during an energy saving operation, (4) information indicating that a local eNB is during an energy saving operation, and (5) information indicating that a local eNB is not during an energy saving operation.

Non-Patent Document 9 discloses that when a base station is switched off, other base stations are notified of the switch-off by means of an X2 interface. Meanwhile, an X2 interface is not supported in a HeNB that is one of local eNBs as descried above (see Chapter 4.6.1 of Non-Patent Document 1). Therefore, a problem that a HeNB cannot be notified of switch-off arises in the method disclosed in Non-Patent Document 9. In the third modification of the first embodiment, neighboring nodes are notified of the information regarding whether or not a local eNB is during an energy saving operation by means of an X2 interface or S1 interface.

A specific example of the method in which a local eNB determines a neighboring cell to be notified of the information regarding whether or not it is during an energy saving operation is similar to "the method in which a local eNB determines a neighboring cell that receives the broadcast information, decodes the broadcast information, and stores the configuration used for uplink transmission (configuration parameter for uplink transmission)" of the first modification of the first embodiment, which is not described.

Considered here is a case where, when the first embodiment is applied, the local eNB 1303 judges the presence or absence of a trigger to shift from a normal operation to a energy saving operation in Step ST1503 shown in FIG. 15 described above and, after judging the presence of a trigger, executes the process of Step ST1502 to notify the macro cell 1301 of the configuration parameter for uplink transmission of the local eNB 1303. That is, the case where Step ST1502 is performed after judging "YES" in Step ST1503, after Step ST1504, or after Step ST1505 is considered.

In this case, the "information regarding whether or not the local eNB 1303 is during an energy saving operation" can be notified with the "macro cell 1301 is notified of the configuration parameter for uplink transmission of the local eNB 1303" in Step ST1502. The (1) information indicating the start of an energy saving operation or the (4) information indicating that the local eNB 1303 is during an energy saving operation can be notified with the "macro cell 1301 is notified of the configuration parameter for uplink transmission of the local eNB 1303" in Step ST1502.

(B) There is newly provided a paging signal to a local eNB during an energy saving operation from a serving cell. A serving cell receives a response signal (Ack signal) to the paging signal from a local eNB during an energy saving operation, to thereby acquire that a local eNB during an energy saving operation exists in the neighborhood.

Disclosed below is a specific example of the paging signal from a serving cell to a local eNB during an energy saving operation. A carrier, which is used in a paging signal from a serving cell to a local eNB during an energy saving operation, is disclosed. The paging signal uses the same carrier as the downlink carrier available between a serving cell and a user equipment being served thereby or the same component carrier (CC) as the CC available between a serving cell and a user equipment being served thereby.

Considered here is a case where a local eNB uses the same downlink carrier or the same CC as that of the serving cell in downlink transmission to a user equipment being served thereby. In that case, a local eNB cannot receive a downlink signal from a serving cell due to a transmission signal thereof becoming an interference source (hereinafter, also referred to as self-interference). Meanwhile, the present invention discloses that a local eNB turns off a transmission operation in an energy saving operation. Therefore, for example, the same carrier as the downlink carrier available between a serving cell and a user equipment being served thereby can be used in a paging signal for a local eNB during an energy saving operation.

The same carrier as a normal downlink carrier available between a serving cell and a user equipment being served thereby can be used for a paging signal for a local eNB during an energy saving operation, which enables to newly provide a paging signal for the local eNB during an energy saving operation while suppressing an increase in processing load of the serving cell.

Disclosed below are two specific examples of an identifier (RNTI) used for a local eNB to receive a paging signal from a serving cell to a local eNB during an energy saving operation.

(1) A user equipment uses an identifier for receiving a paging signal from a serving cell.

(2) An identifier is newly provided, which is used for a local eNB to receive a paging signal from a serving cell to a local eNB during an energy saving operation (hereinafter, also referred to as P-RNTI_local eNB). In LTE and LTE-A, a user equipment performs an operation below for receiving a paging channel (PCH) (see Chapter 5.5 of TS36.321 V9.1.0 by 3GPP (hereinafter, referred to as "Non-Patent Document 14")).

In a case where PCH assignment is received on the PDCCH for the paging-RNTI (P-RNTI), a user equipment attempts to decode the PCH mapped on the PDSCH, as indicated by the PDCCH assignment information. Note that the system has one P-RNTI, which is fixed (see Chapter 7.1 of Non-Patent Document 14). Therefore, when an identifier used for a local eNB to receive a paging signal from a serving cell to the local eNB during an energy saving operation is made identical to a conventional identifier (P-RNTI) used for a user equipment to receive a paging signal from a serving cell, even in a case of the same paging signal for a local eNB during an energy saving operation, user equipments being served by the same serving cell need to attempt to decode the PCH.

The P-RNTI_local eNB is provided differently from the P-RNTI, whereby it is possible to prevent user equipments being served by the same serving cell from attempting to decode the PCH in response to a paging signal for a local eNB during an energy saving operation. This prevents an increase in processing load of a user equipment, to thereby prevent an increase in energy consumption. One P-RNTI_local eNB may be provided as a system. Alternatively, the P-RNTI_local eNB may be determined in a static manner as a system. This achieves an effect that the assignment to a local eNB is not required.

A specific example of a transmission timing of a paging signal from a serving cell to a local eNB during an energy saving operation is disclosed below.

(1) Transmission timings are discrete in time. For this reason, a local eNB receives a paging signal for the local eNB during an energy saving operation through the energy saving operation, which does not require continuous reception but requires only discontinuous reception. The discontinuous reception operation in an energy saving operation is more effective for reducing energy consumption compared with the continuous reception operation.

(2) The resources in which transmission is allowed have a cycle in time. This does not require the notification of the resources in which frequent transmission to a local eNB is allowed. The transmission timing of a paging signal from a serving cell to a local eNB during an energy saving operation is made identical to the time resource in which uplink transmission for wakeup is allowed, which leads to further energy saving. The cycle of the transmission timing of a paging signal from a serving cell to a local eNB during an energy saving operation is made identical to the cycle of the time resource in which uplink transmission for wakeup is allowed, which further reduces energy consumption.

Disclosed below is a specific example of the method of transmitting a response signal (Ack signal) to the paging signal by a local eNB during an energy saving operation in response to the paging signal.

A response signal may be notified by means of a backhaul link, S1 interface, or X2 interface.

The response signal uses the same carrier as the uplink carrier available between a user equipment being served by a serving cell and the serving cell or the same CC as the CC available between a user equipment being served by a serving cell and the serving cell. Accordingly, a serving cell is only required to perform a reception operation using one carrier, which achieves an effect that the processing load of the serving cell is reduced. This is effective also in increasing the frequency use efficiency. In the case where the first modification of the first embodiment is used, the uplink frequency information used for uplink transmission for wakeup from a user equipment is identical to the uplink frequency information used in the response signal. This results in that the same frequency is used between the operation of transmitting a response signal by a local eNB and the operation of receiving uplink transmission for wakeup. As a result, self-interference may arise in a local eNB, and the uplink transmission for wakeup may fail due to the deteriorated reception quality. A solution to the problem is described below. The timing of the operation of transmitting a response signal is made different from the timing of the operation of receiving uplink transmission for wakeup. This enables to prevent the occurrence of self-interference in a local eNB.

Next, disclosed below are five specific examples of the situation in which a user equipment performs uplink transmission for wakeup in a case where the user equipment judges that a local eNB exists in the neighborhood, judges that a local eNB having the capability to execute an energy saving operation exists in the neighborhood, or judges that a local eNB during an energy saving operation, that is, a local eNB in an energy saving operation state exists in the neighborhood.

(1) A case where the reception quality of a serving cell deteriorates or a case where a cell that can serve as a serving cell does not exist. For example, in a case where a local eNB during an energy saving operation exists at the cell edge of a serving cell, the local eNB shifts to a normal operation upon wakeup uplink transmission from a user equipment. Upon this, handover is performed from a serving cell to the local eNB or cell reselection is performed to the local eNB, so that the user equipment is capable of continuously receiving the service of a mobile communication system.

(2) A case where the conditions of RACH transmission in a conventional technology are satisfied. As a specific example, a case where TAU transmission or a service request from a user equipment is made (also referred to as a call at times).

(3) Periodically.

(4) A case where a user makes an operation.

(5) A case where, in measuring a neighboring cell for cell selection, in measuring a neighboring cell for cell reselection, or in measuring a neighboring cell for handover, a neighboring cell that applies to the following is detected: a neighboring cell with a local eNB existing in the neighborhood; a neighboring cell with a local eNB having the capability to execute an energy saving operation existing in the neighborhood; or a neighboring cell with a local eNB during an energy saving operation existing in the neighborhood. In this case, it suffices that a user equipment receives and decodes the broadcast information of a neighboring cell in measuring a neighboring cell, to thereby obtain the information regarding whether or not a local eNB exists in the neighborhood, the information regarding whether or not a local eNB having the capability to execute an energy saving operation exists in the neighborhood, or the information regarding whether or not a local eNB during an energy saving operation exists in the neighborhood.

A specific operation example in which the third modification of the first embodiment is used is described with reference to FIG. 14 and FIG. 20. First, FIG. 14 being a location diagram illustrating the solution of the third modification of the first embodiment is as described above, which is not described. FIG. 20 illustrates a sequence example of a mobile communication system in a case where the solution of the third modification of the first embodiment is used. The portions of FIG. 20 corresponding to those of FIG. 15 are denoted by the same step numbers, and the processes thereof are not described in detail.

This operation example describes the case where a user equipment performs uplink transmission for wakeup in a case of judging that a local eNB during an energy saving operation exists in the neighborhood. The method in which a serving cell acquires whether or not a local eNB during an energy saving operation exists in the neighborhood is described regarding the specific example (B).

The local eNB 1303 performs the processes of Step ST1501, Step ST1502, Step ST1503, and Step ST1504. Next, in Step ST2001, the local eNB 1303 starts discontinuous reception. As a specific example, the local eNB 1303 starts discontinuous reception for receiving uplink transmission with the RACH configuration of the local eNB 1303. At the same time, the local eNB 1303 starts discontinuous reception for receiving a paging signal from a serving cell to a local eNB during an energy saving operation. That is, even during an energy saving operation, the local eNB 1303 performs reception at the transmission timing at which both signals are allocated, or with the time resource.

In Step ST2002, the macro cell 1301 being a serving cell transmits, to the local eNB 1303, a paging signal for a local eNB during an energy saving operation.

In Step ST2003, the local eNB 1303 judges whether or not it has received a paging signal to a local eNB during an energy saving operation from the macro cell 1301. In a case where the local eNB 1303 has received a paging signal to the local eNB during an energy saving operation, the local eNB 1303 moves to Step ST2004. In a case where the local eNB 1303 has not received a paging signal to the local eNB during an energy saving operation, the local eNB 1303 repeats the judgment of Step ST2003.

In Step ST2004, the local eNB 1303 transmits, to the macro cell 1301, a response signal (Ack signal) to the paging signal to the local eNB during an energy saving operation.

In Step ST2005, the macro cell 1301 judges whether or not it has received the response signal to the paging signal to the local eNB during an energy saving operation. In a case where the macro cell 1301 has received the response signal, the macro cell 1301 moves to Step ST2006. In a case where the macro cell 1301 has not received the response signal, the macro cell 1301 moves to Step ST2007.

In Step ST2006, the macro cell 1301 judges that a local eNB during an energy saving operation exists in the neighborhood.

In Step ST2007, the macro cell 1301 judges that a local eNB during an energy saving operation does not exist in the neighborhood, and returns to Step ST2002.

In Step ST2008, the macro cell 1301 notifies the user equipment 1401 of the information indicating that a local eNB during an energy saving exists in the neighborhood. Then, the macro cell 1301 performs the processes of Step ST1506 and Step ST1507.

In Step ST2009, the user equipment 1401 judges whether or not a local eNB during an energy saving operation exists in the neighborhood. In a case of judging that such a local eNB exists, the user equipment 1401 moves to Step ST1508. In a case of judging that such a local eNB does not exist, the user equipment 1401 repeats the judgment of Step ST2009. Then, the user equipment 1401 performs the processes of Step ST1508 and Step ST1509, and the local eNB 1303 performs the processes of Step ST1510 and Step ST1511.

In this operation example, in a case where the user equipment 1401 has received the information indicating that a local eNB during an energy saving operation exists in the neighborhood from the macro cell 1301 in Step ST2008, in Step ST2009, the user equipment 1401 judges that a local eNB during an energy saving operation exists in the neighborhood. On the other hand, in a case where the user equipment 1401 has not received the information indicating that a local eNB during an energy saving operation exists in the neighborhood from the macro cell 1301 in Step ST2008, in Step ST2009, the user equipment 1401 judges that a local eNB during an energy saving does not exist in the neighborhood.

While the present modification has described the case where a serving cell is a macro cell, the present invention can be performed as in the third modification of the first embodiment if a serving cell is a local eNB, where similar effects to those of the third modification of the first embodiment can be achieved.

While the present modification has described the case where the node that performs an energy saving operation is a local eNB, the present invention can be performed as in the third modification of the first embodiment if the node that performs an energy saving operation is a wide-area eNB, where similar effects to those of the third modification of the first embodiment can be achieved.

The present modification has mainly described the example combined with the first embodiment, which can be used also in combination with the first modification of the first embodiment and the second modification of the first embodiment.

The third modification of the first embodiment can achieve effects described below in addition to the effects of the first embodiment.

In a case of judging that a local eNB exists in the neighborhood, a user equipment can perform uplink transmission for wakeup. Alternatively, in a case of judging that a local eNB having the capability to execute an energy saving operation exists in the neighborhood, a user equipment can perform uplink transmission for wakeup. Still alternatively, in a case of judging that a local eNB during an energy saving operation exists in the neighborhood, a user equipment can perform uplink transmission for wakeup.

Therefore, uplink transmission for wakeup is performed only in a case where a local eNB exists in the neighborhood, a local eNB having the capability to execute an energy saving operation exists in the neighborhood, or a local eNB during an energy saving operation exists in the neighborhood.

Accordingly, unnecessary uplink transmission can be reduced, such as uplink transmission for wakeup in a case where, for example, a local eNB during an energy saving operation does not exist in the neighborhood. As a result, radio resources can be effectively used, which enables to remove unnecessary interference. This also enables to reduce energy consumption of a user equipment.

Fourth Modification of First Embodiment

A problem to be solved in a fourth modification of the first embodiment is described. In the case where the solution of the first embodiment is executed, a problem below arises in determining the uplink transmission power from a user equipment.

Considered here is the case where the solution of the first embodiment is executed and the PRACH is used for uplink transmission from a user equipment in LTE and LTE-A.

TS36.213 V9.0.1 by 3GPP (hereinafter, referred to as "Non-Patent Document 15") defines the initial transmission power of the PRACH as expressed by Equation (1) below.

$$PPRACH=\min\{Pcmax, PREAMBLE\_RECEIVED\_TARGET\_POWER+PL\} \text{ [dBm]} \quad (1)$$

In Equation (1), "PL" represents a path loss. "Pcmax" of Equation (1) is determined by Equation (2) below, and "PREAMBLE_RECEIVED_TARGET_POWER" of Equation (1) is defined as expressed in Equation (3) below (see Chapter 5.1.3 of Non-Patent Document 14).

$$Pcmax=\min\{Pemax, Pumax\} \quad (2)$$

In Equation (2), "Pemax" is a value that is set per cell and broadcast to a user equipment being served thereby, and "Pumax" is determined from the capability of a user equipment.

$$PREAMBLE\_RECEIVED\_TARGET\_POWER=\text{preamble} \\ \text{InitialReceivedTargetPower+DELTA\_PRE-} \\ \text{AMBLE+(PREAMBLE\_TRANSMISSION\_} \\ \text{COUNTER-1)*powerRampingStep} \quad (3)$$

In Equation (3), "preambleInitialReceivedTargetPower" is a part of the RACH configuration, and "DELTA_PREAMBLE" is determined based on the preamble format (see Chapter 7.6 of Non-Patent Document 14). The preamble format is a part of the RACH configuration. "PREAMBLE_TRANSMISSION_COUNTER" represents how many times the preamble transmission has been performed. "powerRampingStep" is a part of the RACH configuration, and "*" represents multiplication "×" (see Non-Patent Document 12).

In a case where the solution of the first embodiment is executed in LTE and LTE-A, "PL" in Equation (1) and "Pemax" in Equation (2) are undefined in a user equipment, which causes a problem that the user equipment cannot determine the initial transmission power of the PRACH.

R1-094839 by 3GPP (hereinafter, referred to as "Non-Patent Document 16") discloses the following. Disclosed is the technology in which a serving cell notifies a HeNB within its coverage of the coordination information of the own cell via a user equipment being connected with the own cell. It is disclosed in such a case that, based on the measurement value of downlink reception quality of a HeNB by the user equipment, a serving cell notifies the user equipment of the uplink transmission power required for the notification or the user equipment estimates the uplink transmission power.

In the first embodiment, meanwhile, a local eNB during an energy saving operation turns off a transmission operation. That is, a user equipment cannot measure the downlink reception quality of a local eNB during an energy saving operation.

Therefore, in the first embodiment, the uplink transmission power cannot be determined with the technology disclosed in Non-Patent Document 16.

The solution in the fourth modification of the first embodiment is described below. Parts different from the solution of the first embodiment are mainly described. Parts that are not described are similar to the first embodiment.

First, the solution to "Pemax" is disclosed. A local eNB notifies neighboring nodes of "Pemax" of the own cell by means of an S1 interface, similarly to the configuration parameter for uplink transmission of the first embodiment. After that, with the method similar to the method for the configuration parameter for uplink transmission of the first embodiment, a user equipment that transmits the PRACH can acquire "Pemax". A user equipment determines the initial transmission power of the PRACH as uplink transmission for wakeup with the use of the Pemax".

Next, the solution to "PL" is disclosed. A user equipment uses the path loss of a serving cell. This enables a user equipment that transmits the PRACH to establish "PL". The user equipment determines the initial transmission power of the PRACH as uplink transmission for wakeup with the use of this "PL".

While the present modification has described the case where a serving cell is a macro cell, the present invention can be performed as in the fourth modification of the first embodiment if a serving cell is a local eNB, where similar effects to those of the fourth modification of the first embodiment are achieved.

The present modification has also described the case where the node that performs an energy saving operation is a local eNB, the present invention can be performed as in the fourth modification of the first embodiment if the node that performs an energy saving operation is a wide-area eNB, where similar effects to those of the fourth modification of the first embodiment can be achieved.

The present modification has mainly described the example combined with the first embodiment, which can be used in combination with the first modification of the first embodiment, the second modification of the first embodiment, and the third modification of the first embodiment.

The fourth modification of the first embodiment can achieve effects described below in addition to the effects of the first embodiment. In LTE and LTE-A, a user equipment can determine the initial transmission power of the PRACH even in a case where the solution of the first embodiment is executed and the PRACH is used for uplink transmission from a user equipment.

Fifth Modification of First Embodiment

A problem to be solved in a fifth modification of the first embodiment is described. Even in the case where the solution of the fourth modification of the first embodiment is executed, a problem described below arises.

In the fourth modification of the first embodiment, a user equipment uses the path loss of a serving cell as a demonstration in determining the initial transmission power of the PRACH. Accordingly, the initial transmission power of the PRACH becomes unnecessarily large depending on the location where a user equipment exists, so that an energy saving operation of a local eNB of which coverage the user equipment is outside is released. This causes a problem that energy consumption of a local eNB is not reduced efficiently. Further, the initial transmission power of the PRACH becomes unnecessarily large depending on a location where a user equipment exists, causing a problem that unnecessary uplink interference arises.

The problem of the fifth modification of the first embodiment is described again with reference to FIG. 21. FIG. 21 is a location diagram illustrating the problem of the fifth modification of the first embodiment. The portions of FIG. 21 corresponding to those of FIG. 13 are denoted by the same reference numerals, which are not described.

Considered here is the case where a user equipment 2101 exists at a location A. The case where the user equipment 2101 transmits the PRACH as uplink transmission for wakeup is considered. The user equipment 2101 uses the path loss of a serving cell as a demonstration in determining the initial transmission power of the PRACH. The path loss of the serving cell (macro cell) 1301 for the user equipment 2101 positioned at the location A is measured based on a downlink signal 2102 from the serving cell 1301 to the user equipment 2101. "PL" is added in Equation (1) for obtaining the initial transmission power of the PRACH, which has been disclosed in the fourth modification of the first embodiment. This is because a user equipment located farther from the serving cell has larger path loss "PL", and accordingly, the uplink signal to the serving cell from the same position similarly requires large transmission power as well.

The path loss of the serving cell (macro cell) 1301 for the user equipment 2101 positioned at the location A is PL_A. In this case, this "PL_A" is also added to the PRACH initial transmission power as uplink transmission for wakeup of the user equipment 2101. Accordingly, conceptually, the uplink signal power for wakeup is equal in amount to the uplink transmission power from the location A to the macro cell 1301, as indicated by a PRACH 2103. This enables the local eNB 1303 to receive the PRACH 2103 as the uplink signal for wakeup transmitted from the user equipment 2101 positioned at the location A. The location A is outside the coverage 1304 of the local eNB 1303. This means that, even if the local eNB 1303 releases the energy saving operation, the user equipment 2101 cannot receive the service of a mobile communication system via the local eNB 1303. As a result, releasing of the energy saving operation that is unnecessary in a local eNB occurs, causing a problem that energy consumption is not reduced efficiently.

Considered here is the case where a user equipment 2104 exists at a location B. The case where the user equipment 2104 transmits the PRACH as uplink transmission for wakeup is considered. The user equipment 2104 uses the path loss of a serving cell as a demonstration in determining the initial transmission power of the PRACH. The path loss of the serving cell (macro cell) 1301 for the user equipment 2104 positioned at the location B is measured based on a downlink signal 2105 from the serving cell 1301 to the user equipment 2104.

The path loss of the serving cell (macro cell) 1301 for the user equipment 2104 positioned at the location B is PL_B.

In this case, this "PL_B" is also added to the PRACH initial transmission power as uplink transmission for wakeup of the user equipment 2104. Accordingly, conceptually, the uplink signal power for wakeup is equal in amount to the uplink transmission power from the location B to the macro cell 1301, as indicated by a PRACH 2106. This enables the local eNB 1303 to receive the PRACH 2106 as the uplink signal for wakeup transmitted from the user equipment 2104 positioned at the location B. However, approximately the transmission power of a PRACH 2107 as an uplink signal for wakeup is sufficient for enabling the local eNB 1303 to receive the PRACH 2106. As a result, the initial transmission power of the PRACH becomes unnecessarily large, causing a problem that unnecessary uplink interference arises.

A solution in the fifth modification of the first embodiment is described below. A part different from the solution of the fourth modification of the first embodiment is mainly described. A part that is not described is similar to the fourth modification of the first embodiment.

A fixed value is set as the value of "PL" used in determining the initial transmission power of the PRACH as uplink transmission for wakeup. Specific examples of the value include a value necessary and sufficient (neither excessively large nor excessively small) for being received by a local eNB in the case where the PRACH as uplink transmission for wakeup is transmitted from the cell edge of the local eNB. Two specific examples of the value are disclosed below.

(1) A value is determined in a static manner. As a specific example, a value is determined in accordance with the standards.

(2) A value is determined per local eNB. Each local eNB notifies a serving cell of a value as a configuration parameter for uplink transmission. Each base station notifies user equipments being served thereby of a value. Two specific examples of the notification method are disclosed below. (1) A value is notified in the broadcast information. (2) A value is notified by a dedicated signal.

FIG. 22 is a conceptual diagram in a case where the solution of the fifth modification of the first embodiment is used. The portions of FIG. 22 corresponding to those of FIG. 13 and FIG. 21 are denoted by the same reference numerals, which are not described.

A case where the user equipment 2101 exists at the location A is considered. In the case of transmitting the PRACH as uplink transmission for wakeup, the user equipment 2101 uses a fixed value as "PL" for determining the initial transmission power of the PRACH. Considered here is the case where the fixed value is a value necessary and sufficient (neither excessively large nor excessively small) for being received by a local eNB in a case where the PRACH as uplink transmission for wakeup is transmitted from a cell edge of a local eNB. In this case, the fixed value "PL" is also added to the PRACH initial transmission power as uplink transmission for wakeup of the user equipment 2101. Accordingly, conceptually, this results in as indicated by a PRACH 2201 as an uplink signal for wakeup of FIG. 22. Therefore, the local eNB 1303 cannot receive the PRACH 2201 as an uplink signal for wakeup transmitted from the user equipment 2101 positioned at the location A.

The location A is out of the coverage 1304 of the local eNB 1303. Therefore, even if the local eNB 1303 releases an energy saving operation, the user equipment 2101 cannot receive the service of a mobile communication system via the local eNB 1303. According to the present modification, a local eNB does not unnecessarily release an energy saving operation of the local eNB, which solves a problem that energy consumption is not reduced efficiently.

A case where the user equipment 2104 exists at the location B is considered. In the case of transmitting the PRACH as uplink transmission for wakeup, the user equipment 2104 uses a fixed value as "PL" in determining the initial transmission power of the PRACH. In this case, the fixed value "PL" is also added to the PRACH initial transmission power as uplink transmission for wakeup of the user equipment 2104. Accordingly, conceptually, this results in as indicated by a PRACH 2202 as an uplink signal for wakeup of FIG. 22. Therefore, the local eNB 1303 can receive the PRACH 2202 as an uplink signal for wakeup transmitted from the user equipment 2104 positioned at the location B.

The transmission power of the PRACH 2202 as an uplink signal for wakeup does not differ from the transmission power of the PRACH 2107 as an uplink signal for wakeup, which is sufficient for being received by the local eNB 1303. This prevents the initial transmission power of the PRACH from becoming unnecessarily large, solving the problem that unnecessary uplink interference occurs.

While the present modification has described the case where a serving cell is a macro cell, the present invention can be performed as in the fifth modification of the first embodiment if a serving cell is a local eNB, where similar effects to those of the fifth modification of the first embodiment can be achieved.

The present modification has also described the case where the node that performs an energy saving operation is a local eNB, the present invention can be performed as in the fifth modification of the first embodiment if the node that performs an energy saving operation is a wide-area eNB, where similar effects to those of the fifth modification of the first embodiment can be achieved.

The present modification has mainly described the example combined with the fourth modification of the first embodiment, which can be used in combination with the first embodiment, the first modification of the first embodiment, the second modification of the first embodiment, and the third modification of the first embodiment.

The fifth modification of the first embodiment can achieve effects described below in addition to the effects of the fourth modification of the first embodiment. It is possible to prevent the initial transmission power of the PRACH as uplink transmission for wakeup from becoming unnecessarily large. This prevents a local eNB from unnecessarily releasing an energy saving operation, which efficiently reduces energy consumption. Further, it is possible to prevent an occurrence of unnecessary interference.

Sixth Modification of First Embodiment

A problem to be solved in a sixth modification of the first embodiment is described. The problem described below arises even in a case where the first embodiment is used.

Figure 23:
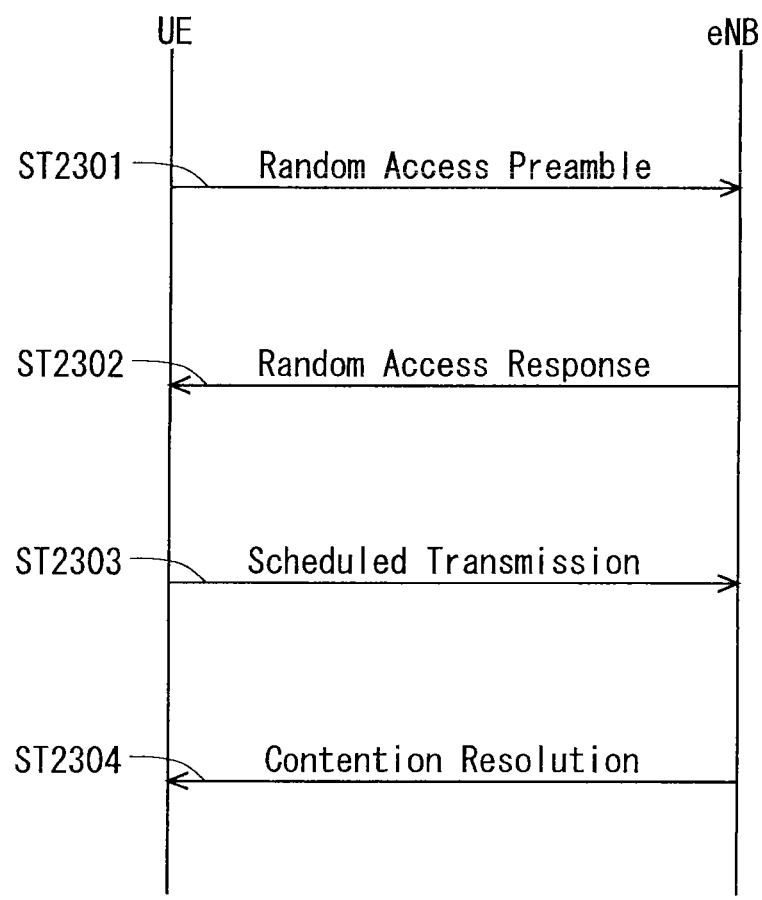
FIG. 23 is a sequence diagram of a mobile communication system, which illustrates a random access procedure disclosed in Non-Patent Document 15.

Non-Patent Document 15 (Chapter 6.1) discloses a random access procedure. The procedure is described with reference to FIG. 23. FIG. 23 is a sequence diagram of a mobile communication system, which illustrates the random access procedure disclosed in Non-Patent Document 15.

In Step ST2301, a user equipment (UE) transmits a random access preamble to a base station (eNB) with the PRACH. The initial transmission power of the PRACH is as described in, for example, the fourth modification of the first embodiment.

In Step ST2302, the base station that has received the random access preamble transmits a random access response to the user equipment with the PDCCH. The user equipment needs to receive the PDCCH using the random access RNTI (RA-RNTI) for checking whether the random access response is included. The RA-RNTI is an identifier used for a user equipment to receive the random access response.

In Step ST2303, the user equipment that has received the random access response transmits scheduled transmission to the base station using the PUSCH allocated to the random access response.

In Step ST2304, the base station that has received the scheduled transmission transmits a contention resolution to a user equipment. As described above, the base station needs to receive the PDCCH using the RA-RNTI for judging whether or not the base station has received the PRACH.

The local eNB during an energy saving operation receives the PRACH as uplink transmission for wakeup from the user equipment and shifts to a normal operation to start downlink transmission. However, time is required for the user equipment to perform the search operation, for example, the operation shown in FIG. 12, to thereby detect the local eNB. This causes a problem that the user equipment is highly likely to judge the reception of a random access response from the local eNB in Step ST2302 of FIG. 23 as a failure.

The serving cell for the user equipment is a cell different from the local eNB. The user equipment cannot receive the PDCCH from two different base stations. Therefore, in order to receive the PDCCH on which the random access response from the local eNB is mapped, a user equipment needs to execute handover or cell reselection. A user equipment needs to execute handover or cell reselection at the time when it is not confirmed that a local eNB during energy saving exists in the neighborhood, or even if such a local eNB exists in the neighborhood, it is not confirmed that the PRACH as uplink transmission for wakeup is received successively and the local eNB shifts to a normal operation. As described above, an unnecessary handover process or unnecessary cell reselection process of a user equipment occurs.

A solution in the sixth modification of the first embodiment is described below. Parts different from the solution of the first embodiment are mainly described. Parts that are not described are similar to the first embodiment.

A user equipment that has transmitted the PRACH as uplink transmission for wakeup is not required to receive a random access response. A base station does not transmit the random access response with the use of the PDCCH in a case where it has received the PRACH as uplink transmission for wakeup.

A base station is configured to distinguish the PRACH as uplink transmission for wakeup from a conventional PRACH for enabling the above-mentioned judgment. Specifically, an indicator showing the PRACH as uplink transmission for wakeup is provided in the random access preamble. This enables, in receiving a random access preamble in Step ST2301 of FIG. 23, the base station to make the above-mentioned distinction and perform the process of avoiding the transmission of a random access response.

Figure 24:
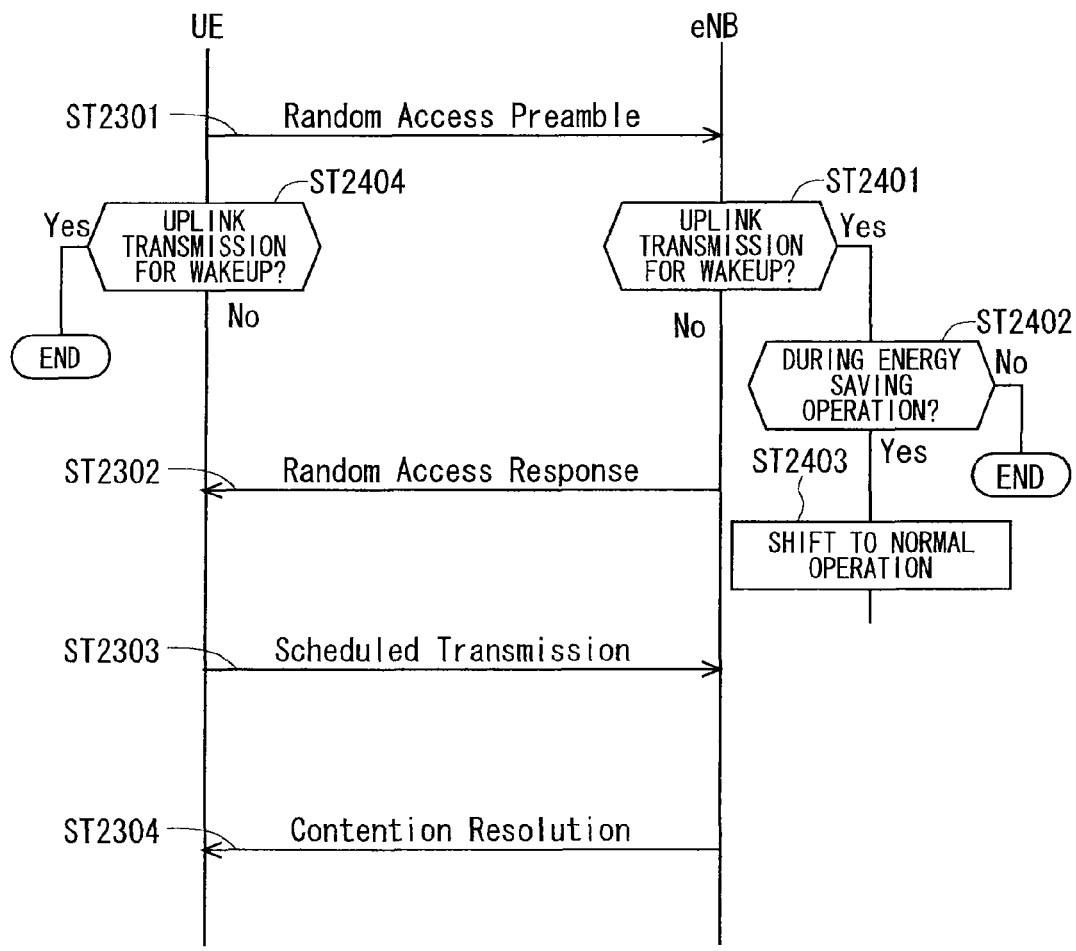
FIG. 24 is a diagram illustrating a sequence example of a mobile communication system in a case where a solution of a sixth modification of the first embodiment is used.

FIG. 24 shows a sequence example of a mobile communication system in a case where the solution of the sixth modification of the first embodiment is used. The portions of FIG. 24 corresponding to those of FIG. 23 are denoted by the same step numbers, which are not described in detail.

In Step ST2301, a user equipment transmits a random access preamble to a base station with the use of the PRACH. In Step ST2401, the base station that has received the random access preamble judges whether or not the random access preamble is uplink transmission for wakeup.

In a case of judging that the random access preamble is an uplink signal for wakeup, the base station moves to Step ST2402. In a case of judging that the random access preamble is not an uplink signal for wakeup, the base station moves to Step ST2302. In Step ST2302, the base station transmits the random access response to the user equipment with the use of the PDCCH.

As a specific example of judging the process in Step ST2401, if an indicator showing the PRACH as uplink transmission for wakeup is mapped in the random access preamble, the random access preamble is judged as uplink transmission for wakeup. On the other hand, if the indicator showing the PRACH as uplink transmission for wakeup is not mapped in the random access preamble, the random access preamble is not judged as an uplink transmission signal for wakeup.

In Step ST2402, the base station judges whether or not to be during an energy saving operation. In a case of judging to be during an energy saving operation, the base station moves to Step ST2403. In a case of judging not to be during an energy saving operation, the base station ends the process.

In Step ST2403, the base station during an energy saving operation shifts to a normal operation.

In Step ST2404, the user equipment that has transmitted the random access preamble judges whether or not the random access preamble is uplink transmission for wakeup. In a case of judging that the random access preamble is an uplink signal for wakeup, the user equipment ends the process. In a case of judging that the random access preamble is not an uplink signal for wakeup, the user equipment moves to Step ST2303. In Step ST2303, the user equipment transmits scheduled transmission to the base station with the use of the PUSCH allocated to the random access response. In Step ST2304, the base station transmits a contention resolution to the user equipment.

The present modification has mainly described the example combined with the first embodiment, which can be used in combination with the first modification of the first embodiment, the second modification of the first embodiment, the third modification of the first embodiment, the fourth modification of the first embodiment, and the fifth modification of the first embodiment.

The sixth modification of the first embodiment can achieve effects described below in addition to the effects of the first embodiment. The user equipment that has transmitted the PRACH as uplink transmission for wakeup is not required to receive the PDCCH on which a random access response is mapped. As a result, the user equipment that has transmitted the PRACH as uplink transmission for wakeup does not judge a failure in receiving a random access response. Further, it is not required to receive the PDCCH from a cell different from the serving cell, which reduces an unnecessary handover process and an unnecessary cell reselection process.

The base station that has received the PRACH as uplink transmission for wakeup can reduce the transmission of a random access response. This reduces the processing load of the base station and enables effective use of radio resources.

Seventh Modification of First Embodiment

A problem to be solved in a seventh modification of the first embodiment is described. A problem described below arises even in a case where the sixth modification of the first embodiment is used.

The preamble is repeatedly transmitted until it is normally received by a base station. However, if the user equipment that has transmitted the PRACH as uplink transmission for wakeup is not required to receive a random access response, the user equipment cannot judge whether or not the PRACH has been normally received by the base station. This causes a problem that a preamble transmission operation becomes uncertain.

Along with this, a problem described below arises in determining uplink transmission power even in a case where the fourth modification of the first embodiment or the fifth modification of the first embodiment is used. There arises a problem that "PREAMBLE_TRANSMISSION_COUNTER" indicating how many times preamble transmission has been performed becomes uncertain. The problem that a user equipment cannot determine the initial transmission power of the PRACH arises again.

A solution in the seventh modification of the first embodiment is described below. Parts different from the solutions of the first embodiment and the fourth modification of the first embodiment, or the first embodiment and the fifth modification of the first embodiment are mainly described. Parts that are not described are similar to the first embodiment and the fourth modification of the first embodiment, or the first embodiment and the fifth modification of the first embodiment.

In determining the initial transmission power of the PRACH as uplink transmission for wakeup, the PRACH is repeatedly transmitted as many times as a fixed value. The repetitive transmission may be stopped in a case where a user equipment measures neighboring cells and detects a new local eNB.

In a case where the PRACH is transmitted as many times as a fixed value in determining the initial transmission power of the PRACH as uplink transmission for wakeup, a user equipment automatically transmits the PRACH again up to the number of times of PRACH transmission.

The present modification has mainly described the example combined with the first embodiment and the fourth modification of the first embodiment, or the first embodiment and the fifth modification of the first embodiment, which can be used in combination with the first modification of the first embodiment, the second modification of the first embodiment, and the third modification of the first embodiment.

The seventh modification of the first embodiment achieves effects described below in addition to the effects of the first embodiment, the fourth modification of the first embodiment, and the fifth modification of the first embodiment. Also in a case where the user equipment that has transmitted the PRACH as uplink transmission for wakeup is not required to receive a random access response, the user equipment can establish the operation of transmitting the PRACH and further determine the initial transmission power.

Eighth Modification of First Embodiment

A problem to be solved in an eighth modification of the first embodiment is described. A problem described below arises even in a case where the solution of the first embodiment is executed.

Considered here is the case where a local eNB shifts from an energy saving operation to a normal operation upon the execution of the first embodiment. As a result of the shift in this manner, a user equipment is located within the coverage of that local eNB, to thereby enter the idle station normally.

It is assumed, however, that the user equipment does not shift to the connected state. In that case, the local eNB detects a trigger to shift from a normal operation to an energy saving operation and shifts to the energy saving operation again. This causes the use equipment to be out of the coverage of the local eNB, leading to a problem that the user equipment is outside the coverage and cannot receive the service of a mobile communication system in a case where other neighboring cell does not exist.

Four solutions in the eighth modification of the first embodiment are disclosed below. Parts different from the solution of the first embodiment are mainly described. Parts that are not described are similar to the first embodiment.

(1) Uplink transmission for wakeup is performed with the use of the configuration for uplink transmission of a local eNB. In a case where a local eNB shifts to an energy saving operation, a user equipment being normally in an idle state when the local eNB is in a normal operation is assumed here. The local eNB during a normal operation serves as a serving cell for the user equipment. As the local eNB shifts to the energy saving operation, the reception quality of a serving cell in the user equipment deteriorates. Accordingly, the condition in which the user equipment performs uplink transmission for wakeup is satisfied, whereby the user equipment performs uplink transmission for wakeup. The local eNB that has received the uplink transmission for wakeup shifts from an energy saving operation to a normal operation.

(2) In a case of becoming outside the coverage after camping on a local eNB, a user equipment performs uplink transmission for wakeup. This is effective in a case where the user equipment becomes outside the coverage because a local eNB during being camped on has shifted to an energy saving operation. The user equipment may perform the uplink transmission for wakeup only in a case where the local eNB has the capability to execute an energy saving operation. In a case where the local eNB does not have that capability, the situation in which the user equipment becomes outside the coverage because the local eNB during being camped on shifts to an energy saving operation does not occur. This prevents a user equipment from performing unnecessary uplink transmission, leading to effects that radio resources are effectively used, uplink interference is reduced, and a user equipment reduces energy consumption.

(3) A local eNB that has received uplink transmission for wakeup performs a normal operation for a certain time interval (T_a). A user equipment performs uplink transmission for wakeup periodically (T_b). If T_a≥T_b, the local eNB can be prevented from shifting to an energy saving operation again when a user equipment exists in the range in which an uplink signal for wakeup can be received.

(4) Even in a case where a trigger to shift from a normal operation to an energy saving operation exists, a local eNB checks whether or not a user equipment in an idle state exists to be served thereby before shifting from a normal operation to an energy saving operation. In a case where a user equipment in an idle state exists to be served thereby, the local eNB continues a normal operation. On the other hand, in a case where a user equipment in an idle state does not exist to be served thereby, the local eNB shifts to an energy saving operation. This prevents the local eNB from shifting to an energy saving operation in a case where a user equipment in an idle state exists to be served thereby. This judgment may be applied to the specific example described in the first embodiment as the trigger to shift from a normal operation to an energy saving operation, (1) "a case where a user equipment in a connected state does not exist to be served by a local eNB for a certain period, or a case where only a user equipment in an idle state exists to be served by a local eNB for a certain period".

Disclosed below is a specific example of the method of checking whether or not a user equipment in an idle state exists to be served by a local eNB. All user equipments being served by a local eNB are paged. If a user equipment that responds to the paging exists, the local eNB judges that a user equipment in a connected state or a user equipment in an idle state exists to be served thereby. Meanwhile, if a user equipment that responds to the paging does not exist, the local eNB judges that neither user equipment in a connected state nor user equipment in an idle state exists to be served thereby.

A specific example of simultaneous paging is disclosed below. A simultaneous paging signal is newly provided for user equipments being served by a local eNB. An identifier used in simultaneous paging (hereinafter, also referred to as P-RNTI_simultaneous) for user equipments being served by a local eNB is newly provided. The effects described below are achieved by newly providing P-RNTI_simultaneous apart from conventional P-RNTI. In the conventional method, a user equipment that has received P-RNTI needs to attempt to decode the PCH for checking whether paging is for the own user equipment. On the other hand, the user equipment that has received P-RNTI_simultaneous recognizes that paging is for all user equipments. Accordingly, the user equipment is not required to decode the PCH and check whether paging is for the own user equipment, and can respond to the paging. This alleviates the processing load of a user equipment and prevents a control delay.

The technology of simultaneous paging for user equipments being served by a local eNB can be used not only in local eNBs but also in all types of eNBs.

While the present modification has described the case where a serving cell is a macro cell, the present invention can be performed as in the eighth modification of the first embodiment if the serving cell is a local eNB, where similar effects to those of the eighth modification of the first embodiment can be achieved.

While the present modification has described the case where the node that performs an energy saving operation is a local eNB, the present invention can be performed as in the eighth modification of the first embodiment if the node that performs an energy saving operation is a wide-area eNB, where similar effects to those of the eighth modification of the first embodiment can be achieved.

The present modification has mainly described the example combined with the first embodiment, which can be used in combination with the first modification of the first embodiment, the second modification of the first embodiment, the third modification of the first embodiment, the fourth modification of the first embodiment, the fifth modification of the first embodiment, the sixth modification of the first embodiment, and the seventh modification of the first embodiment.

The eighth modification of the first embodiment can achieve effects described below in addition to the effects of the first embodiment. It is possible to prevent a situation in which a local eNB shifts to an energy saving operation regardless of a user equipment being in idle state to be served thereby and the user equipment becomes out of service.

Ninth Modification of First Embodiment

A ninth modification of the first embodiment discloses below another solution to the problem of the eighth modification of the first embodiment.

A local eNB transmits, even in an energy saving operation, a signal or channel necessary for measurement of a user equipment for a certain period. This enables the user equipment to check the existence of the local eNB even if the local eNB is in an energy saving operation. Three specific examples of the signal or channel required for measurement are disclosed below, which include (1) SS, (2) PBCH, and (3) RS.

Two specific examples of a certain period are disclosed below.

(1) Transmission is performed periodically. Transmission is performed by specifying values of the cycle and transmission period. A specific example of the method of specifying those values is disclosed below. The values are determined in a static manner. Alternatively, the values are determined by a local eNB per se. Still alternatively, the values are instructed by an entity of higher layer by means of an S1 interface or X2 interface.

(2) Transmission is performed during a specified period. The start of transmission and the end of transmission are instructed. Alternatively, the start of transmission and the end of transmission are instructed and, after the transmission period expires, transmission is stopped automatically. A specific example of the method of specifying values is disclosed below. The values are determined by a local eNB per se. Alternatively, the values are instructed by an entity of higher layer by means of an S1 interface or X2 interface.

While the present modification has described the case where the node that performs an energy saving operation is a local eNB, the present invention can be performed as in the ninth modification of the first embodiment if the node that performs an energy saving operation is a wide-area eNB, where similar effects to those of the ninth modification of the first embodiment can be achieved.

The present modification has mainly described the example combined with the first embodiment, which can be used in combination with the first modification of the first embodiment, the second modification of the first embodiment, the third modification of the first embodiment, the fourth modification of the first embodiment, the fifth modification of the first embodiment, the sixth modification of the first embodiment, and the seventh modification of the first embodiment.

The ninth modification of the first embodiment can achieve effects described below in addition to the effects of the first embodiment. A user equipment that exists in the coverage of a local eNB is capable of measuring the reception quality of the local eNB if the local eNB shifts to an energy saving operation. This enables the user equipment to acquire the existence of a local eNB during an energy saving operation. Therefore, the user equipment can be prevented from becoming out of service. In addition, the user equipment can be prevented from performing unnecessary cell reselection. Further, based on the above, it is possible to perform uplink transmission disclosed in, for example, the first embodiment. Accordingly, it is possible to accurately transmit uplink transmission for shifting a local eNB performing an energy saving operation to a normal operation without no waste.

Tenth Modification of First Embodiment

A tenth modification of the first embodiment discloses below an energy saving operation for further reducing energy consumption, in addition to the effects of the first embodiment.

In a case where a user equipment exists within a tracking area (TA) to which a local eNB belongs, the local eNB performs the energy saving operation disclosed in the first embodiment. Meanwhile, in a case where a user equipment does not exist within the tracking area (TA) to which a local eNB belongs, the eNB turns off the power. As a result, in a case where a trigger to shift from an energy saving operation to a normal operation does not occur, even the reception operation can be turned off, which further reduces energy consumption. This is because, in a case where a user equipment does not exist within the tracking area to which the local eNB belongs, (1) a user equipment that may perform uplink transmission for wakeup does not exist in the neighborhood of the local eNB, and (2) there is no likelihood that the local eNB will receive a paging signal via a backhaul. Therefore, in a case where a user equipment does not exist within the tracking area to which the local eNB belongs, it could be said that a trigger to shift from an energy saving operation to a normal operation does not occur.

Figure 25:
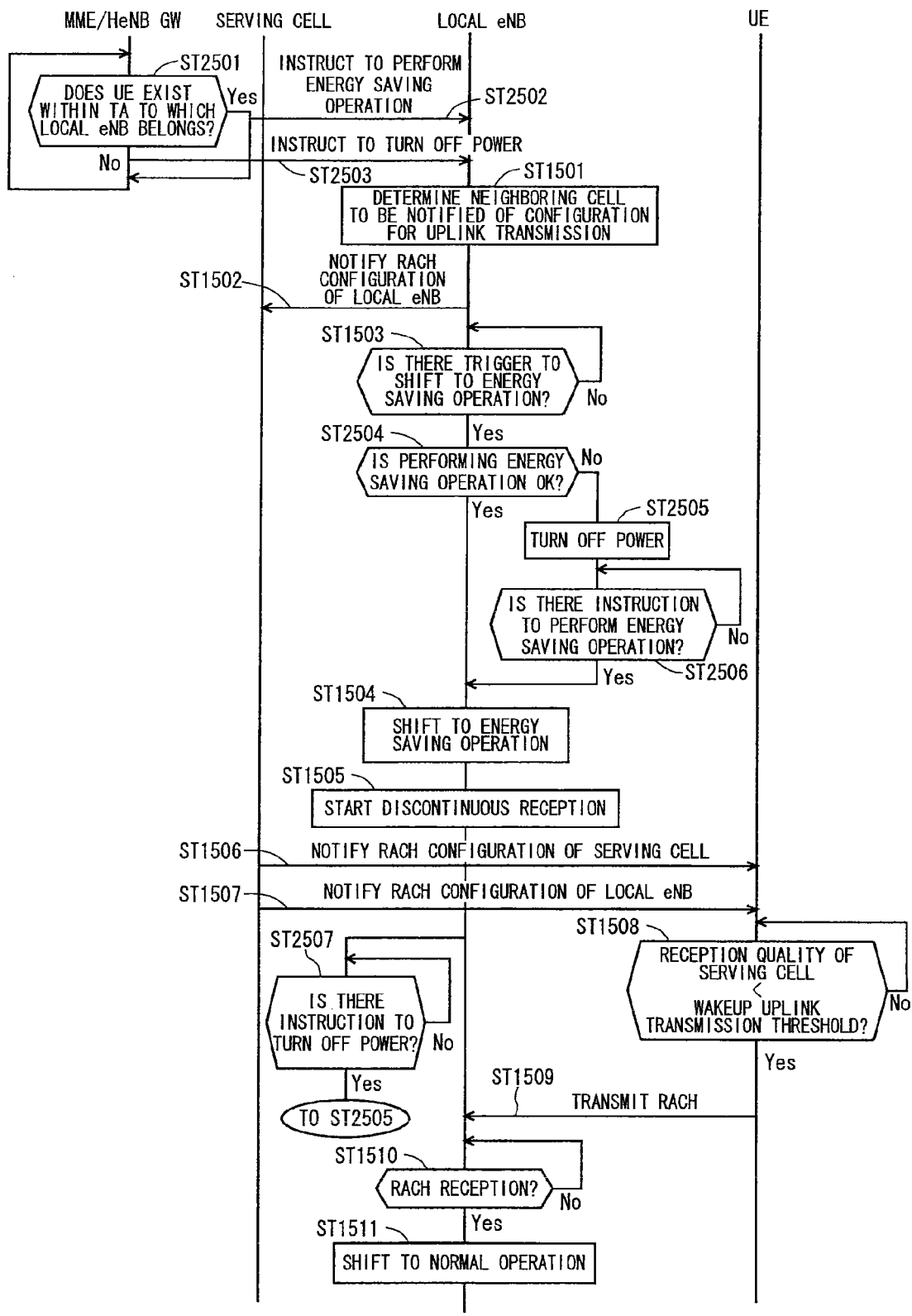
FIG. 25 is a diagram illustrating a sequence example of a mobile communication system in a case where a solution of a tenth modification of the first embodiment is used.

FIG. 25 illustrates a sequence example of a mobile communication system in a case where a solution of the tenth modification of the first embodiment is used. The portions of FIG. 25 corresponding to those of FIG. 15 are denoted by the same step numbers, and the processes thereof are not described in detail.

In Step ST2501, an MME judges whether or not a user equipment exists within a tracking area to which a local eNB belongs. A user equipment performs tracking area update in a case where a tracking area to which the own user equipment belongs changes, and thus, the judgment of Step ST2501 can be executed without complicating a conventional technology. In a case of judging that a user equipment exists in Step ST2501, the MME moves to Step ST2502, or in a case of judging that a user equipment does not exist in Step ST2501, the MME moves to Step ST2503.

In Step ST2502, the MME instructs the local eNB to perform an energy saving operation by means of an S1 interface or X2 interface. Alternatively, the MME may instruct the energy saving operation via the HeNBGW. The instruction to perform an energy saving operation may be an instruction to turn off the transmission operation and turn on the reception operation. Alternatively, it may be an instruction to turn off the transmission operation and turn on the discontinuous reception. After that, the MME returns to the judgment of Step ST2501.

In Step ST2503, the MME instructs the local eNB to turn off the power by means of an S1 interface or X2 interface. Alternatively, the MME may instruct to turn off the power via the HeNBGW. The instruction to turn off the power may be an instruction to turn off the transmission operation and turn off the reception operation. Still alternatively, the instruction may be an instruction to turn off the transmission operation and turn off the discontinuous reception. After that, the MME returns to the judgment of Step ST2501. The local eNB that has received the instruction to turn off the power in Step ST2503 performs the processes of Step ST1501, Step ST1502 and Step ST1503 and, after that, moves to Step ST2504.

In Step ST2504, the local eNB judges whether or not to perform an energy saving operation. A specific example of the judgment in Step ST2504 is disclosed below. In a case where the local eNB has received the instruction to perform the energy saving operation, the local eNB judges to perform an energy saving operation. In a case where the local eNB has not received the instruction to perform an energy saving operation, the local eNB judges not to perform an energy saving operation. In a case where the local eNB has received the instruction to turn off the power, the local eNB judges not to perform an energy saving operation. In a case where the local eNB has not received the instruction to turn off the power, the local eNB judges to perform an energy saving operation. In a case where the local eNB judges to perform an energy saving operation, the local eNB moves to Step ST1504. In a case where the local eNB judges not to perform an energy saving operation, the local eNB moves to Step ST2505.

In Step ST2505, the local eNB turns off the power. As a specific example, the local eNB turns off the transmission operation and turns on the reception operation. Alternatively, the local eNB turns off the transmission operation and turns off the discontinuous reception.

In Step ST2506, the local eNB judges whether or not it has received an instruction to perform an energy saving operation. In a case of judging that it has received the instruction, the local eNB moves to Step ST1504, or in a case of judging that is has not received the instruction, the local eNB repeats the process of Step ST2506. After performing the processes of Step ST1504 and Step ST1505, the local eNB moves to Step ST2507.

In Step ST2507, the local eNB judges whether or not it has received the instruction to turn off the power. In a case of judging that it has received the instruction, the local eNB moves to Step ST2505, or in a case of judging that is has not received the instruction, repeats the process of Step ST2507.

While the present modification has described the case where a serving cell is a macro cell, the present invention can be performed as in the tenth modification of the first embodiment even if the serving cell is a local eNB, where similar effects to those of the tenth modification of the first embodiment can be achieved.

While the present modification has described the case where the node that performs an energy saving operation is a local eNB, the present invention can be performed as in the tenth modification of the first embodiment even if the node that performs an energy saving operation is a wide-area eNB, where similar effects to those of the tenth modification of the first embodiment can be achieved.

The present modification has mainly described the example combined with the first embodiment, which can be used in combination with the first modification of the first embodiment, the second modification of the first embodiment, the third modification of the first embodiment, the fourth modification of the first embodiment, the fifth modification of the first embodiment, the sixth modification of the first embodiment, the seventh modification of the first embodiment, the eighth modification of the first embodiment, and the ninth modification of the first embodiment.

The tenth modification of the first embodiment can achieve effects described below in addition to the effects of the first embodiment. In a case where the trigger to shift from an energy saving operation to a normal operation does not occur, it is possible to turn off the reception operation as well. On the other hand, in a case where there may occur a trigger to shift from an energy saving operation to a normal operation, a shift to the energy saving operation is enabled, which enables to turn on the reception operation. Accordingly, energy consumption can be reduced further while keeping the effects of the first embodiment.

Eleventh Modification of First Embodiment

A problem to be solved in an eleventh modification of the first embodiment is described. A problem described below arises even in a case where the solution of the first embodiment is executed.

A HeNB is deployed by an owner irrespective of the positions at which other cell is deployed. Therefore, a HeNB may be deployed in a place where the reception quality of the other cell is good. The deployment of a HeNB in the neighborhood of the other cell is conceivable as a specific example. In a case where the other cell is a serving cell in such a location, the reception quality of the serving cell does not deteriorate in the neighborhood of the HeNB deployed in the neighborhood of the other cell. For example, in a case where the reception quality of the serving cell is judged as a trigger to transmit uplink transmission for wakeup, a situation in which a user equipment performs uplink transmission for wakeup does not occur. Accordingly, in a case where a HeNB is deployed in the neighborhood of other cell, there arises a problem that the HeNB cannot shift from an energy saving operation to a normal operation in uplink transmission for wakeup from a user equipment.

Figures 26, 27:
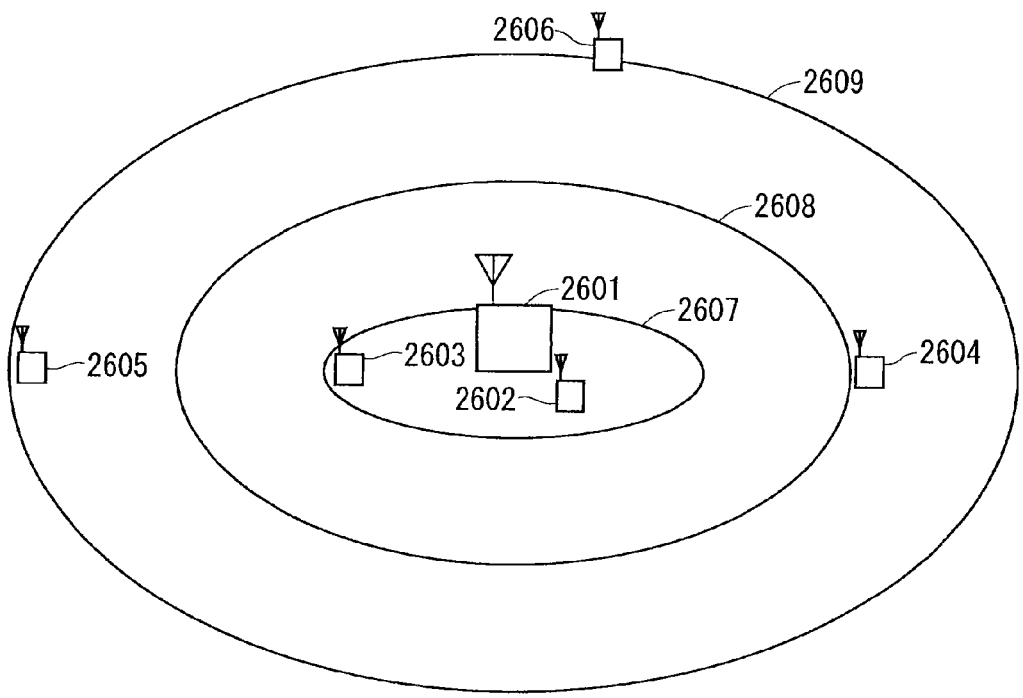
FIG. 26 is a location diagram illustrating a problem of an eleventh modification of the first embodiment.
FIG. 27 shows a specific example of information of path loss of a solution of the eleventh modification of the first embodiment.

FIG. 26 is a location diagram illustrating the problem of the eleventh modification of the first embodiment. A macro cell 2601 has a coverage 2609. The path loss from the macro cell 2601 is, for example, "9" in the neighborhood of the coverage 2609. A HeNB 2602 is deployed in the neighborhood of the path loss, for example, "1" from the macro cell 2601. A HeNB 2603 is deployed in the neighborhood of the path loss, for example, "2" from the macro cell 2601. A HeNB 2604 is deployed in the neighborhood of the path loss, for example, "7" from the macro cell 2601. A HeNB 2605 is deployed in the neighborhood of the path loss, for example, "8" from the macro cell 2601. A HeNB 2606 is deployed in the neighborhood of the path loss, for example, "9" from the macro cell 2601. A solid line 2607 of FIG. 26 indicates the location with a path loss "3" from the macro cell 2601. A solid line 2608 of FIG. 26 indicates the location with a path loss "6" from the macro cell 2601. A solid line 2609 of FIG. 26 indicates the location with a path loss "9" from the macro cell 2601.

Considered here is a case where the value "9" of a path loss is used as a wakeup uplink transmission threshold as the method of judging the deterioration in reception quality of the serving cell using (1) a case where the reception quality of the serving cell deteriorates is used as a specific example of a situation in which uplink transmission for wakeup is performed in the first embodiment. In a case where a user equipment transmits the uplink signal for wakeup under the above-mentioned conditions, in the location as shown in FIG. 26, only the HeNB 2606 may shift to a normal operation by the uplink signal power for wakeup. There is no likelihood that the HeNB 2602, HeNB 2603, HeNB 2604 and HeNB 2605 will shift to the normal operation by the uplink signal for wakeup. This is because the HeNB 2602, HeNB 2603, HeNB 2604 and HeNB 2605 are located within the place where the path loss from the macro cell 2601 is smaller than the threshold "9". Accordingly, a user equipment does not reach the situation to perform uplink transmission for wakeup in the vicinities of the HeNB 2602, HeNB 2603, HeNB 2604 and HeNB 2605.

In a case where, for example, a HeNB is deployed in a house of an owner of a user equipment, the means in which the HeNB shifts from an energy saving operation to a normal operation without the process by a user when the owner returns home is important in terms of the construction of a user-friendly system. This means is necessary even if a user equipment is in an idle state.

As described above, Non-Patent Document 8 describes the technology using an X2 interface, which is not applicable to a HeNB. Further, a user equipment in an idle state is not taken into consideration in Non-Patent Document 8.

The solution in the eleventh modification of the first embodiment is described below. Parts different from the solution of the first embodiment are mainly described. Parts that are not described are similar to the first embodiment.

A serving cell notifies user equipments being served thereby of the information indicating the existence of a HeNB and the information of the path loss for the location in which the HeNB exists. In a case where the reception quality of the serving cell becomes the path loss indicating that a HeNB exists, the user equipment that has received the information performs uplink transmission for wakeup. This enables the HeNB to shift to a normal operation in a case where the user equipment exists in the neighborhood of the HeNB.

Further, in a case a user equipment that has received the information is registered with any CSG (whitelist is not empty), the user equipment may perform uplink transmission for wakeup when the reception quality of the serving cell becomes the path loss indicating the existence of a HeNB. Alternatively, in a case where the user equipment that has received the information is not registered with any CSG (whitelist is empty), the user equipment may not perform uplink transmission for wakeup even if the reception quality of a serving cell becomes the path loss indicating the existence of a HeNB.

Specific examples of the information indicating the existence of a HeNB and the information of the path loss for the location in which the HeNB exists are described below. FIG. 27 shows a specific example of the information of the path loss in the solution of the eleventh modification of the first embodiment.

(1) A path loss in which a HeNB exists. In the case of the location shown in FIG. 26, information is as shown in part (1) of FIG. 27. A user equipment can transmit a wakeup uplink signal in accordance with the path loss, which reduces unnecessary uplink transmission.

(2) The range of a path loss and whether or not a HeNB exists within the range thereof. In the case of the location shown in FIG. 26, information is as shown in part (2) of FIG. 27. Irrespective of the number of HeNBs to be deployed, an amount of the information indicating the existence of a HeNB and the information of a path loss for the location in which the HeNB exists is constant. In the case where HeNBs to be deployed increase, the amount of information can be reduced more compared with the above-mentioned method (1). This enables to effectively use radio resources. The division of path loss range is determined in a static manner such that, for example, an index 1 indicates being equal to or larger than zero and smaller than three, an index 2 indicates being equal to or larger than three and smaller than six, and an index 3 indicates being equal to or larger than six, which leads to a further reduction in amount of information.

While the present modification has described the case where a serving cell is a macro cell, the present invention can be performed as in the eleventh modification of the first embodiment if the serving cell is a local eNB, where similar effects to those of the eleventh modification of the first embodiment can be achieved.

The present modification has mainly described the example combined with the first embodiment, which can be used in combination with the first modification of the first embodiment, the second modification of the first embodiment, the third modification of the first embodiment, the fourth modification of the first embodiment, the fifth modification of the first embodiment, the sixth modification of the first embodiment, the seventh modification of the first embodiment, eighth modification of the first embodiment, the ninth modification of the first embodiment, and the tenth modification of the first embodiment.

The eleventh modification of the first embodiment can achieve effects described below in addition to the effects of the first embodiment. Similar effects to those of the first embodiment can be achieved also in a HeNB that may be deployed in the place where the reception quality of other cell is sufficient.

Twelfth Modification of First Embodiment

A problem to be solved in a twelfth modification of the first embodiment is described. Even in a case where the solution of the first embodiment is executed, a problem described below arises when a local eNB is a HeNB that operates in a closed access mode.

With the use of the first embodiment, the uplink transmission for wakeup from a user equipment is received, whereby the HeNB shifts from an energy saving operation to a normal operation. Meanwhile, the user equipment is not registered with the CSG to which the HeNB belongs. In this case, there arises a problem that even if the HeNB enters a normal operation, the user equipment cannot access the HeNB as well as cannot camp thereon. In addition, the energy saving operation of a HeNB is released unnecessarily, leading to a problem that energy consumption is not reduced efficiently.

Three solutions in the twelfth modification of the first embodiment are disclosed below. Parts different from the solution of the first embodiment are mainly described. Parts that are not described are similar to the first embodiment.

(1) In a case of shifting from an energy saving operation to a normal operation, a HeNB does not operate in a closed access mode but operates in an open access mode or a hybrid access mode. As a result, even if a user equipment that has performed uplink transmission for wakeup is not registered with the CSG to which the HeNB belongs, the user equipment is capable of accessing the HeNB and camping thereon.

(2) A HeNB judges whether or not a user equipment that has performed wakeup uplink transmission is registered with the CSG to which the own HeNB belongs and, if the user equipment is registered, the HeNB shifts from an energy saving operation to a normal operation. If the user equipment is not registered, the HeNB continues an energy saving operation. This reduces the unnecessary release of an energy saving operation by a HeNB.

(3) A HeNB judges whether or not a user equipment that has performed wakeup uplink transmission is registered with the CSG to which the own HeNB belongs and, in a case where the user equipment is registered, shifts from an energy saving operation to a normal operation by entering a closed access mode or allowing a closed access mode. In a case where the user equipment is not registered, the HeNB shifts to a normal operation by entering an open access mode or a hybrid access mode or prohibiting a closed access mode.

Disclosed below is a specific example of the method in which a HeNB judges whether or not a user equipment that has performed wakeup uplink transmission is registered with a CSG to which the own HeNB belongs. The identification information of a user equipment (such as UE-ID) is included in a wakeup uplink signal from the user equipment. The HeNB judges whether or not the user equipment is registered with the CSG to which the own HeNB belongs based on the identification information of the user equipment. This judgment may be performed by inquiring of a home subscriber server (HSS). The HSS is a subscriber information database in a mobile communication network of 3GPP, which is an entity that manages authentication information and the location information.

The present modification has mainly described the example combined with the first embodiment, which can be used in combination with the first modification of the first embodiment, the second modification of the first embodiment, the third modification of the first embodiment, the fourth modification of the first embodiment, the fifth modification of the first embodiment, the sixth modification of the first embodiment, the seventh modification of the first embodiment, the eighth modification of the first embodiment, the ninth modification of the first embodiment, the tenth modification of the first embodiment, and the eleventh modification of the first embodiment.

The twelfth modification of the first embodiment can achieve the effect described below in addition to the effects of the first embodiment. By receiving uplink transmission for wakeup from the user equipment, it is possible to prevent the occurrence of a situation in which, even though a HeNB shifts from an energy saving operation to a normal operation, the user equipment cannot access the HeNB or cannot camp thereon on the ground that the user equipment is not registered with the CSG to which the HeNB belongs. This reduces energy consumption efficiently.

Thirteenth Modification of First Embodiment

A problem to be solved in a thirteenth modification of the first embodiment is described. Even if the solution of the first embodiment is executed, a problem described below arises in a case of an isolated cell where a local eNB does not exist within the coverage of any cell.

In the first embodiment, a user equipment executes AFC using the downlink transmission of a serving cell in a case of performing uplink transmission for wakeup. In the case of an isolated cell, however, a problem that the AFC cannot be executed arises. If AFC cannot be executed, a difference between frequencies is caused between a user equipment and a local eNB. This deteriorates the reception quality.

Two solutions in the thirteenth modification of the first embodiment are disclosed below. Parts different from the solution of the first embodiment are mainly described. Parts that are not described are similar to the first embodiment.

(1) A user equipment performs uplink transmission for wakeup if the condition for performing uplink transmission for wakeup is satisfied. A specific example of the uplink transmission for wakeup is disclosed below. A user equipment transmits a predetermined signal in a predetermined frequency-time domain. A local eNB measures the received power in a predetermined frequency-time domain and, in a case where the received power exceeds a given threshold, shifts from an energy saving operation to a normal operation.

As a specific example of the predetermined frequency-time domain, a frequency domain is given more latitude. The latitude given to a frequency prevents the influence when a difference between the frequencies arises. The predetermined frequency-time domain may be determined in a static manner.

Specific examples of the predetermined signal include a random signal and a PN signal.

(2) A local eNB does not shift to an energy saving operation in a case of judging that the own cell is an isolated cell. On the other hand, the local eNB executes the energy saving operation of the first embodiment in a case of judging that the own cell is not an isolated cell.

A specific example of the method of judging that the own cell is an isolated cell is disclosed below. A local eNB measures a surrounding radio environment in initialization, turning-on of the power, or turning-off of the transmission power at times. Specific examples of the surrounding radio environment include the reception quality of a neighboring cell. If the reception quality or received power of all of the neighboring cells is equal to or smaller than a threshold (or is smaller than a threshold), a local eNB judges that the own cell is an isolated cell. Meanwhile, if the path loss of all of the neighboring cells is larger (or is equal to or larger) than a threshold, a local eNB judges that the own cell is an isolated cell.

While the present modification has described the case where the node that performs an energy saving operation is a local eNB, the present invention can be performed as in the thirteenth modification of the first embodiment even if the node that performs an energy saving operation is a wide-area eNB, where similar effects to those of the thirteenth modification of the first embodiment can be achieved.

The present modification has mainly described the example combined with the first embodiment, which can be used in combination with the first modification of the first embodiment, the second modification of the first embodiment, the third modification of the first embodiment, the fourth modification of the first embodiment, the fifth modification of the first embodiment, the sixth modification of the first embodiment, the seventh modification of the first embodiment, the eighth modification of the first embodiment, the ninth modification of the first embodiment, the tenth modification of the first embodiment, the eleventh modification of the first embodiment, and the twelfth modification of the first embodiment.

The thirteenth modification of the first embodiment can achieve an effect that a problem of an isolated cell can be solved, in addition to the effects of the first embodiment.

While the invention has been shown and described in detail, the foregoing description is in all aspects illustrative and not restrictive. It is therefore understood that numerous modifications and variations can be devised without departing from the scope of the invention.

DESCRIPTION OF REFERENCE SYMBOLS

1301, 1801, 1803, 1805, 2601 macro cell, 1302, 1304, 1602, 1604, 1606, 1608, 1802, 1804, 1806, 1808, 2609 coverage, 1303, 1601, 1603, 1605, 1607, 1807 local eNB, 1401, 1809, 2101, 2104 user equipment, 2602, 2603, 2604, 2605, 2606 HeNB.

The invention claimed is:

1. A mobile communication system comprising:
a local base station device; and
a user equipment device configured to perform radio communication with at least said local base station device, wherein
upon predetermined shift conditions being satisfied, said local base station device shifts from a normal operation state to an energy saving operation state, said local base station device performing a transmission operation for transmitting downlink transmission signals to said user equipment device and a reception operation for receiving uplink transmission signals transmitted from said user equipment device in said normal operation state and stopping the transmission operation for at least part of the downlink transmission signals and performing said reception operation in said energy saving operation state, upon the local base station device in said energy saving operation state receiving said uplink transmission signals transmitted from said user equipment device, said local base station device shifts from said energy saving operation state to said normal operation state, and the mobile communication system further comprising a communication device configured to perform radio communication or wire communication with said local base station device, wherein said shift conditions include at least one of conditions that:
  (a) said user equipment device being in a connected state with said local base station device does not exist for a predetermined period;
  (b) an instruction to shift from said normal operation state to said energy saving operation state is provided by a base station device other than said local base station device or a communication device.

2. A mobile communication system comprising:
a local base station device; and
a user equipment device configured to perform radio communication with at least said local base station device, wherein
upon predetermined shift conditions being satisfied, said local base station device shifts from a normal operation state to an energy saving operation state, said local base station device performing a transmission operation for transmitting downlink transmission signals to said user equipment device and a reception operation for receiving uplink transmission signals transmitted from said user equipment device in said normal operation state and stopping the transmission operation for at least part of the downlink transmission signals and performing said reception operation in said energy saving operation state, and upon the local base station device in said energy saving operation state receiving said uplink transmission signals transmitted from said user equipment device, said local base station device shifts from said energy saving operation state to said normal operation state, wherein said local base station device notifies a neighboring node of configuration parameters for uplink transmission needed by the user equipment device to perform uplink transmission to said local base station device during the energy saving operation state and said user equipment device obtains the needed configuration parameters from the neighboring node.

3. The mobile communication system according to claim 2, wherein said configuration parameters are based on measurement results of the surrounding radio environment of the local base station device.

4. The mobile communication system according to claim 3, wherein said measurement results of the surrounding radio environment include the measurement results of reception quality of a neighboring cell.

5. The mobile communication system according to claim 3, wherein said measurement results of the surrounding radio environment include the measurement results of received power of a neighboring cell.

6. The mobile communication system according to claim 3, wherein said measurement results of the surrounding radio environment include the measurement results of path loss of a neighboring cell.

* * * * *